United States Patent
Cook

(10) Patent No.: US 7,111,052 B1
(45) Date of Patent: Sep. 19, 2006

(54) NETWORK SHELL

(75) Inventor: Fred S. Cook, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 09/576,300

(22) Filed: May 23, 2000

Related U.S. Application Data

(63) Continuation of application No. 09/556,276, filed on Apr. 24, 2000.

(51) Int. Cl.
*G06F 15/16* (2006.01)
*G06F 3/00* (2006.01)

(52) U.S. Cl. .............. 709/219; 709/203; 707/737; 707/744; 707/747

(58) Field of Classification Search .......... 709/249, 709/219, 225, 227, 237, 238, 236, 203; 715/737, 715/744, 745, 747
See application file for complete search history.

(56) References Cited

U.S. PATENT DOCUMENTS

| | | | | |
|---|---|---|---|---|
| 5,812,784 A | * | 9/1998 | Watson et al. | 709/227 |
| 5,875,327 A | * | 2/1999 | Brandt et al. | 713/1 |
| 5,933,599 A | * | 8/1999 | Nolan | 345/734 |
| 5,941,947 A | * | 8/1999 | Brown et al. | 709/225 |
| 5,948,064 A | * | 9/1999 | Bertram et al. | 709/225 |
| 6,061,795 A | * | 5/2000 | Dircks et al. | 709/217 |
| 6,092,199 A | * | 7/2000 | Dutcher et al. | 713/201 |
| 6,195,707 B1 | * | 2/2001 | Minh | 709/245 |
| 6,205,476 B1 | * | 3/2001 | Hayes, Jr. | 709/220 |
| 6,233,618 B1 | * | 5/2001 | Shannon | 709/229 |
| 6,240,443 B1 | * | 5/2001 | Suzuki et al. | 709/204 |
| 6,430,607 B1 | * | 8/2002 | Kavner | 709/217 |
| 6,434,619 B1 | * | 8/2002 | Lim et al. | 709/229 |
| 6,446,071 B1 | * | 9/2002 | Callaway et al. | 707/10 |
| 6,578,021 B1 | * | 6/2003 | Barillaud | 706/20 |
| 6,643,685 B1 | * | 11/2003 | Millard | 709/206 |
| 6,651,095 B1 | * | 11/2003 | Barlock et al. | 709/223 |
| 6,845,451 B1 | * | 1/2005 | Anand et al. | 713/201 |
| 2005/0027797 A1 | * | 2/2005 | San Andres et al. | 709/203 |

* cited by examiner

*Primary Examiner*—Ario Etienne
*Assistant Examiner*—Gregory G. Todd

(57) ABSTRACT

An access communication system provides access between a user system and a plurality of communication networks. The plurality of communication networks provide services to a user in the user system. An access communication system includes a database system and an access server that is connected to the user system and the plurality of communication networks. The access server receives an alias selection from a user for a network shell that includes alias selections associated with actions. The access server then processes the alias selection to execute an action associated with the alias selection.

12 Claims, 63 Drawing Sheets

| USER ID | PASSWORD | NAME | ACCOUNT NUMBER | SERVICES | ADDRESS | BILLING CODE | CLASS | GROUP | SHELL | MACROS |
|---------|----------|------|----------------|----------|---------|--------------|-------|-------|-------|--------|
|         |          |      |                |          |         |              |       |       |       |        |
|         |          |      |                |          |         |              |       |       |       |        |

FIG. 7

NETWORK SHELL

RELATED APPLICATIONS

This application is a continuation of prior application Ser. No. 09/556,276, entitled "Access Communication System", filed Apr. 24, 2000, currently pending, and incorporated by reference into this application.

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communication networks, and in particular, to an access communication system that provides access to multiple service provider systems. More particularly, this invention relates to a system that processes an alias selection to execute an action associated with the alias selection.

2. Description of the Prior Art

Communication networks have seen dramatic development over the past several years so that today, there are multiple diverse communication networks providing services. The current technical challenge is to develop interfaces between the networks to provide seamless service across multiple networks. Unfortunately, today's interfaces lack the ability to offer the user with easy access to services from multiple systems. These interfaces do not customize operations for the user.

FIG. 1 illustrates the conventional public telephone network. User telephones and computers are connected to local switches. The local switches are coupled to a local database. The user places calls through the local switch. The local switch processes the called number to provide an end-point connection or access to other networks. The local switch may connect the call to another telephone in the local calling area. In a Local Number Portability (LNP) situation, the local switch exchanges information with the local database to obtain the appropriate routing number for a ported call. The local switch may also connect the call to an Internet Service Provider. If a Digital Subscriber Line (DSL) is used, DSL equipment may be used to bypass the local switch. The local switch may also connect the call to a long distance switch. To provide access to the long distance switch, the local switch first exchanges information with the local database. The local database identifies the long distance network for either the user or the dialed number.

The long distance switch processes the called number to route the call to another system or network. Prior to routing, the long distance switch validates the call by checking the caller's number. The long distance switch may also exchange information with the long distance database to provide special call-handling. One example is a calling card call, where the long distance database validates an account number for billing the call. Another example is a toll-free call, where the long distance database processes external information customized by the called party to route the call. Toll-free routing information includes items such as time and date, caller location, and call center status. Many long distance calls are simply routed through the long distance network to another local network for call completion. Other calls are routed from the long distance network to a call center. Call centers offer a concentration of call-handling capabilities for operations, such as order entry, customer service, and promotions. Call centers include automatic call distribution equipment to route calls to the appropriate destination within the call center.

Both local and long distance networks exchange calls with mobile switches. The mobile switches are connected to base stations that communicate over the air with wireless telephones. When a mobile user places a call, the mobile switches exchanges information with a mobile database to validate the mobile caller. The call is then routed to another mobile caller, the telephone network, or to an ISP. When a mobile caller moves around, their wireless phone logs-in with the physically proximate mobile network, and that mobile network updates the mobile user's location in the mobile databases. When a call is placed to that mobile user, their home mobile switch obtains a routing number from the mobile databases to route the call to the mobile network currently in communication with the mobile user.

FIG. 2 illustrates a conventional data network that transfers packets of user data to a destination based on address information carried in the packets. Users are connected to Local Area Networks (LANs) that are connected to Wide Area Networks (WANs). A common LAN is an Ethernet system. A common WAN is an intranet. WANs are interconnected by data networks, such as IP, T1, frame relay, or Asynchronous Transfer Mode (ATM). WANs are connected to the Internet through ISPs. WANs are connected to the public telephone network through telephony gateways. A common telephony gateway is a Private Branch Exchange (PBX).

FIG. 3 illustrates a conventional ISP. The public telephone network is coupled to a telephony interface that converts between telephony analog and digital protocols and the Internet Protocol (EP). Some telephony interfaces also handle DSL traffic that may already use EP. The telephony interface transfers EP traffic through an access server and firewall to a router. Some ISPs combine the firewall and the access server into one system. Also, the position of the firewall may vary, and traffic shapers may be present. The router exchanges EP traffic with the Internet.

In operation, the user calls the ISP over the telephone network and logs-in at the access server. The access server collects and forwards the user name and password to the ISP database. The ISP database validates the user name and password and returns an EP address to the access server. The IP address is for the user's terminal connection. Using the EP address, the user may communicate through the firewall to the router for transmissions to an IP address. The user now has Internet access through the router and exchanges packets with various Internet servers.

EP addresses are referred to as network addresses and include a network ID and a host ID. Network IDs are unique across the Internet and host IDs are unique within a given network. EP addresses are lengthy numerical codes, so to simplify things for the user, service addresses are available that are easier to remember. The service addresses are often the name of the business followed by ".com". Domain Name Service (DNS) is hosted by servers on the Internet and translate between service addresses and network addresses. The browser in the user computer accesses the DNS to obtain the desired network address.

FIG. 4 illustrates conventional network access. A current proposal for communication network access is provided by the Telecommunication Information Network Architecture Consortium (TINA-C). TINA-C proposes the use of agents in the user domain and the service provider domain. The service provider domain could be a telephone network, data network, or ISP. The agents negotiate access service rights. Once the service is negotiated, the user receives the service from the service provider network during a service session. Unfortunately, the access session occurs between the user domain and a particular service provider domain. At present, the service provider domain provides limited access capability beyond simply handing off communications to another network based on a called number or network address. As a result, the ability to customize services for a particular user across multiple service providers is inadequate.

SUMMARY OF THE INVENTION

The inventions solve the above problems by providing access between a user system and a plurality of communication networks. The plurality of communication networks provide services to a user in the user system. An access communication system includes a database system and an access server that is connected to the user system and the plurality of communication networks.

In one aspect of the inventions for user access profile inheritance, the database system receives an update request from the access server to update a user access profile through inheritance. The database system then processes the update request to inherit user profile information from a user profile data structure. The database system updates the user access profile with the user profile information.

In another aspect of the inventions for network shells, the access server receives an alias selection from a user for a network shell that includes alias selections associated with actions. The access server then processes the alias selection to execute an action associated with the alias selection.

In another aspect of the inventions for service based directory, the access server transmits a list of services to a user system. The access server then receives a selection from the list of services. The access server processes the selection to generate an instruction to provide the service related to the selection.

In another aspect of the inventions for user access profile mobility, the database system receives user information. The database system then processes the user information to determine if a user access profile is local within a local database system. The database system generates and transmits a request to retrieve a user access profile from a second database system external to the local database system in response to the determination that the user access profile is not local.

In another aspect of the inventions for service, user, and device sessions, the access communication system establishes a connection between a network device and the access server. The access communication system then generates a device session including a device session ID based on the network device. The access communication system generates and transmits a logon query for the network device. The access communication system receives and processes a logon reply from the network device to generate a user session including a user session ID based on the user. The access communication system receives and processes a request for the service to generate a service session including a service session ID based on the service. The service may generate and transmit a logon query for the user. The access communication system links the device session, user session, and the service session using the device session ID, the user session ID, and the service session ID.

In another aspect of the inventions for service capability firewall, the access server receives information including a named function request for a service provider. The access server processes the information to check if the named function request is valid for the service provider and the service. If valid, the access server determines if a private destination address exists for the named function request. The access server replaces the named function request with the private destination address in response to the determination that the private destination address exists for the named function request. The access server then transmits the information with the private destination address to the service provider.

In another aspect of the inventions for prepaid access and bank card access, the database system receives information identifying a billing code for a user. The database system then processes the billing code to determine if the user is allowed to use the access system. The database system provides access to the access system in response to the determination that the user is allowed to use the access system.

In another aspect of the inventions for global authentication and access card, the database system receives a user logon. The database system then processes the user logon to determine if the user is allowed access to the access communication system based on a local database system. The database system then provides access to the access communication system to the user in response to the determination that the user is allowed access based on the local database system. The database system then generates an authorization query for a second database system external to the local database system in response to the determination that the user is not allowed access based on the local database system. The database system receives and processes an authorization response indicating whether the user is allowed to use the access system from the second database system. The database system then provides access to the access communication system to the user in response to the authorization response that allows the user to use the access communication system.

In another aspect of the inventions for user based proxy and subscriber based proxy, the database system includes a user proxy. The user proxy receives a request for the service from the user system. The user proxy then transmits the request for the service to a service provider. The user proxy exchanges user information between the user system and the service provider.

In another aspect of the inventions for dynamic proxy, the database system includes a proxy. The proxy receives a service/protocol request for a new service or protocol. The proxy processes the service/protocol request to generate a handler request to obtain a handler for the new service or protocol. The proxy then receives and executes the handler for the new service or protocol.

In another aspect of the inventions for access execution environment, the database system receives and processes a logon reply into an access execution environment for a user. The database system retrieves programs for the user into the access execution environment. The database system executes the programs for the user in the access execution environment.

In another aspect of the inventions for domain name scoping and inband domain name service lookup, the access server receives information including an alias from the user system. The access server determines if the alias exists in a cache including aliases and alias translations for the user. The access server changes the information based on the cached alias translation.

In another aspect of the inventions for inline access service triggering, the access server receives information. The access server then processes the information to determine if the information is allowed to pass. The access server changes access logic based on the information in response to the determination that the information is not allowed to pass. The access server changes the filters of the access server based on the information in response to the determination that the information is not allowed to pass.

In another aspect of the inventions for access service triggering, the access server receives information. The access server processes the information to determine if the information is allowed to pass. The access server then generates a request from a database system in response to the determination that the information is not allowed to pass. The access server receives a reply including access logic from the database system. The access server changes filters of the access server based on the access logic.

In another aspect of the inventions for personal URL, the database system receives information including a user alias. The database system processes the information to determine if a user alias translation including a current network address for the user alias exists. The database system then modifies the information with the current network address using the user alias translation.

In another aspect of the inventions for predictive caching, the access server receives a request for data. The access server then determines if the data exists in a user cache wherein the user cache contains cached data based on the user's predictive patterns. The access server retrieves the data from the user cache in response to the determination that the data exists in the user cache. The access server transmits the request for data for the service provider in response to the determination that the data does not exist in the user cache.

In another aspect of the inventions for user controlled caching, the access server receives a request for data. The access server determines if the data exists in a user cache wherein the user cache contains cached data based on a user's script of commands. The access server retrieves the data from the user cache in response to the determination that the data exists in the user cache. The access server then transmits the request for data for the service provider in response to the determination that the data does not exist in the user cache.

In another aspect of the inventions for service usage audit, the access server receives an audit message into a database system. The access server processes the audit message to store the audit message in the database system.

In another aspect of the inventions for switching access by a user, switching access by a service provider, and dynamic access control, the database system receives a request. The database system processes the request to determine if the switching of the access is allowed. The database system then generates an instruction to switch access in response to the determination that the switching is allowed.

In another aspect of the inventions for network failover, network busy forwarding, time-out, busy flag, forwarding, and network endpoint availability management, the access server receives information for a destination network device. The access server determines if the destination network device is available. The access server performs an action in response to the determination that the destination network device is unavailable.

In another aspect of the inventions for scheduled alias translation, the access server receives information including an alias. The access server processes the information to determine whether an alias translation exists based on an alias translation schedule. The access server then modifies the information based on the alias translation in response to the determination the alias translation exists.

In another aspect of the inventions for service capability monitor, the database system receives information from an access server during a service session. The database system determines a current state of the service session based on the information. The database system determines a state transition based on the current state and a map of state transitions of the service. The database system determines whether the state transition is valid for the service session.

BRIEF DESCRIPTION OF THE DRAWINGS

The same reference number represents the same element on all drawings.

FIG. 7 illustrates a table for a user access profile in an example of the invention.

DETAILED DESCRIPTION OF THE PREFERRED EMBODIMENT

Figure 1:
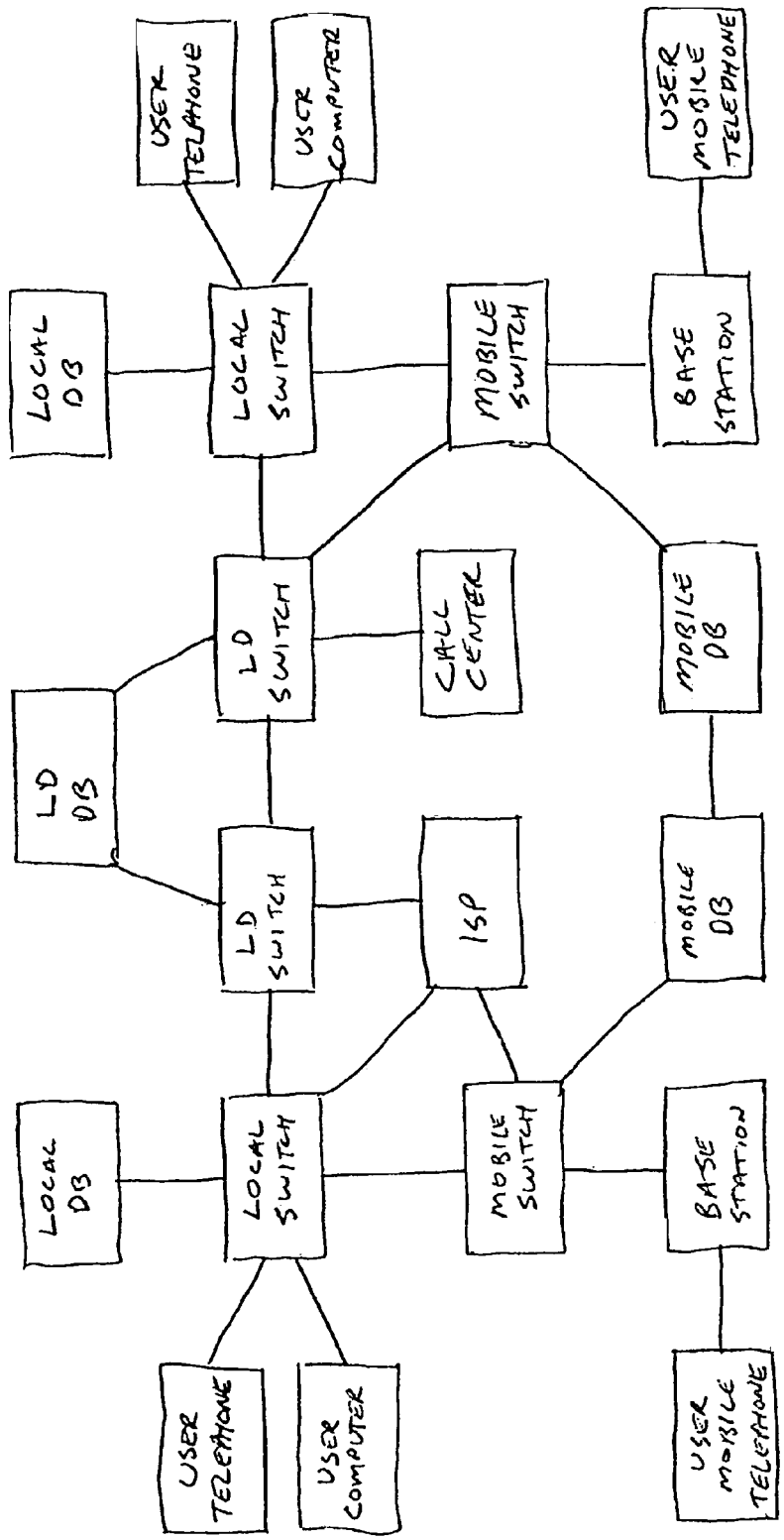
FIG. 1 illustrates a public telephone network in the prior art.
Figure 2:
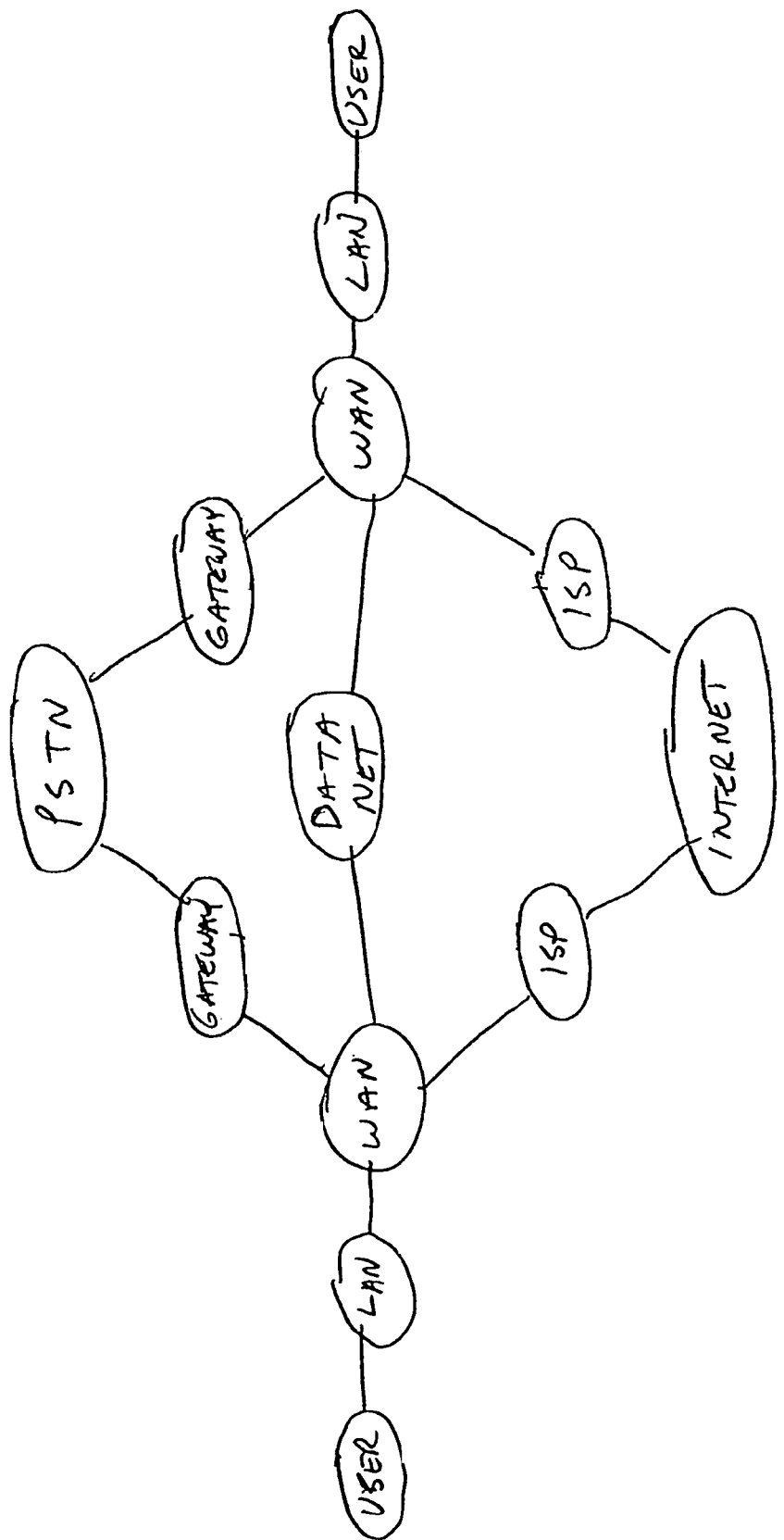
FIG. 2 illustrates a data network in the prior art.
Figure 3:
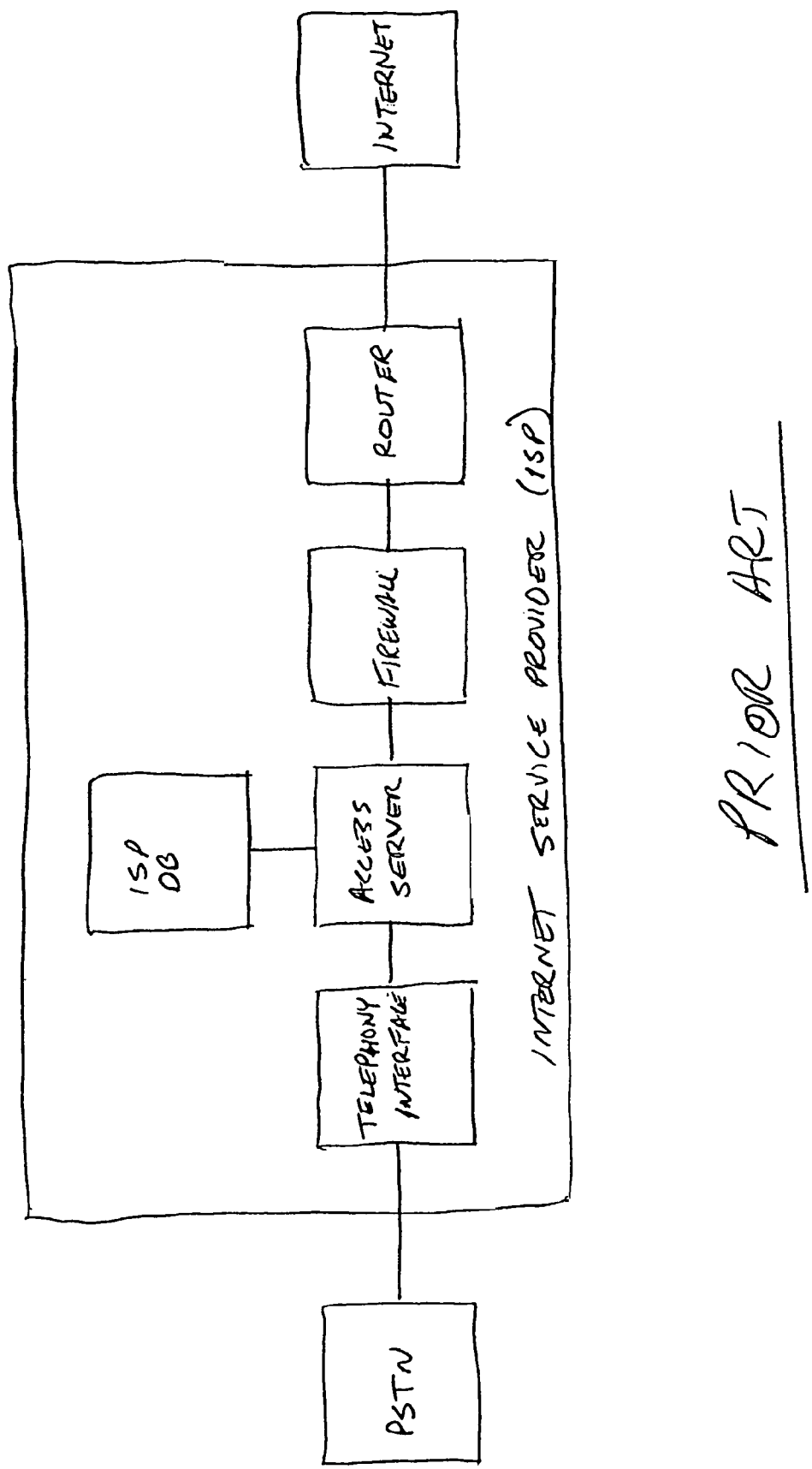
FIG. 3 illustrates an Internet Service Provider in the prior art.
Figure 4:
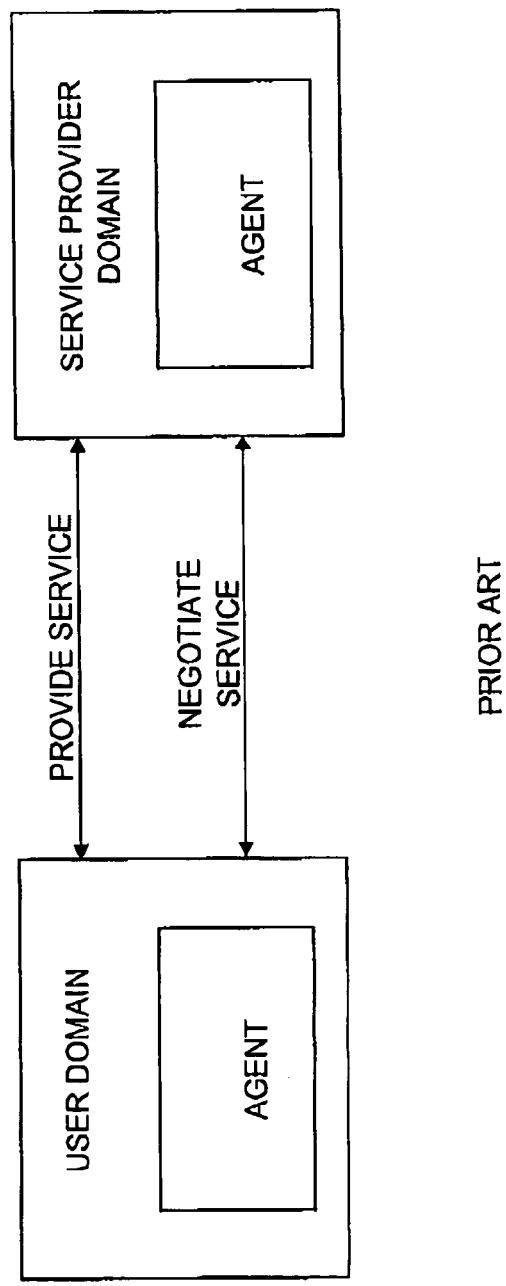
FIG. 4 illustrates conventional network access.
Figure 5:
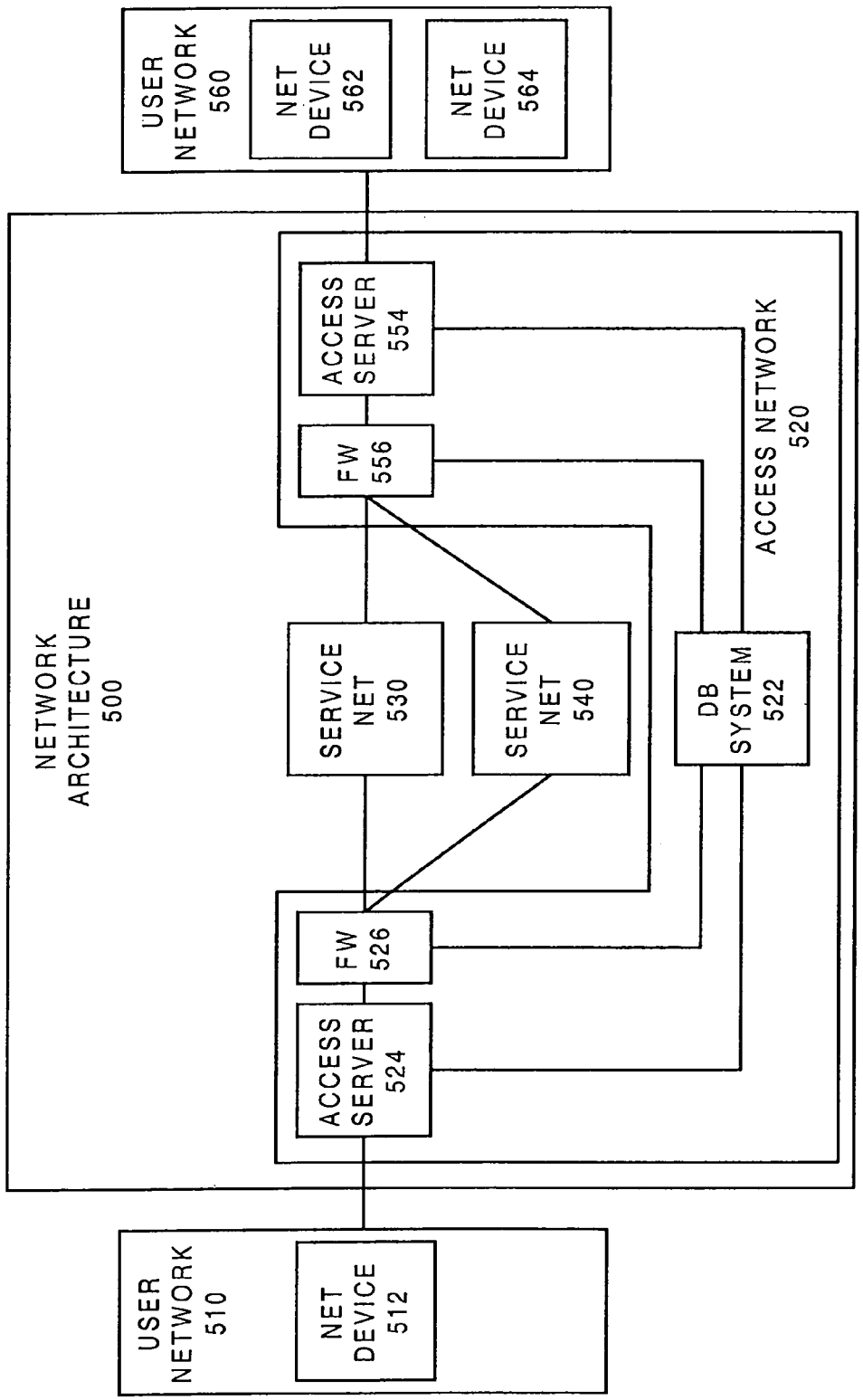
FIG. 5 illustrates a network architecture in an example of the invention.
Figure 6:
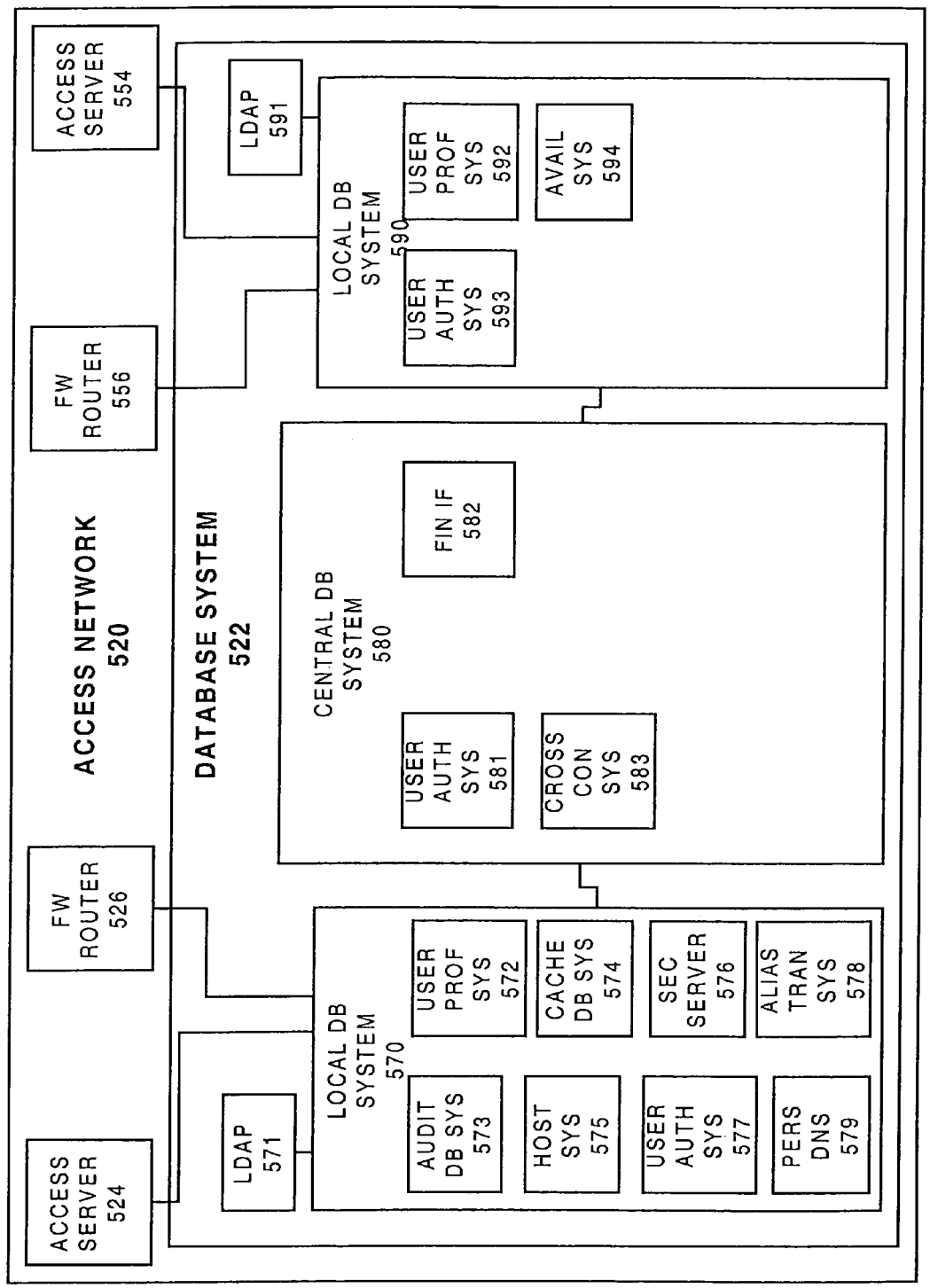
FIG. 6 illustrates an access network in an example of the invention.

Communication Network Architecture—FIGS. 5 and 6

The following description and associated figures discuss specific examples intended to teach the present invention to those skilled in the art. Those skilled in the art will appreciate numerous variations from these examples that do not depart from the scope of the invention. Those skilled in the art will also appreciate that various features described below could be combined in various ways to form multiple variations of the invention.

FIG. 5 illustrates a network architecture 500 in an example of the invention. The network architecture 500 comprises a service network 530, a service network 540, and an access network 520. The access network 520 comprises a database system 522, an access server 524, a firewall/router 526, a firewall/router 556, and an access server 554. A user network 510 includes a network device 512. The user network 510 is connected to the access server 524. The access server 524 is connected to the firewall/router 526 and the database system 522. The firewall/router 526 is connected to the service network 530, the service network 540, and the database system 522. The firewall/router 556 is connected to the service network 530, the service network 540, the database system 522, and the access server 554. The access server 554 is connected to the database system 522 and the user network 560. The user network 560 comprises a network device 562 and a network device 564.

The access network 520 provides an interface between the user network 510 and 560 and the service networks 530 and 540. The interface function provides user access profiles, security, switching, and caching. The user network 510 and 560 could be a residential or business communication system that includes network devices. A network device 512, 562, and 564 could be any device configured to exchange data or information with the access network 520. Some examples of network devices are wireless and wireline telephones, computers, modems, servers, and/or data terminals, along with associated interconnections and network interfaces. For illustrative purposes in the examples below, a user interacts with the network device 512 to access services provided by the network architecture 500 and the user network 560. The user network 510 could also be a communication destination for other users. In these cases, the access network 520 provides destination performance monitoring and control. The example of a user interacting with the network device 562 and 564 to access services provided by the network architecture 500 and the user network 510 is not discussed below for the sake of clarity.

The access server 524 and the database system 522 could be adapted from components used in current ISPs, and the access network 520 could be integrated into these ISP components. The database system 522 houses user access profiles for the users in the user networks 510 and 560 with external access rights. The user access profiles provide a data clearinghouse for user-related information for security, service options, current state, and customized macros. The service networks 530 and 540 could be voice or data systems, such as the public telephone network, Internet, public data networks, and private data networks.

When a user requests access to services, the access network 520 processes the user access profile for the user. The access network 520 performs security measures to validate the user. The access network 520 then binds the user to a terminal and to a service. This user-terminal-service binding correlates the user's capabilities in the user access profile with the capabilities of the user's current terminal and the current capabilities of the service provider. The access network 520 activates a network shell for the user and the user's terminal. The network shell is an interface that is customized for the user and the terminal. The user invokes services using the network shell.

The user access profile may contain several macros that can be as simple as address translations or as complex as lengthy computer programs. The user's network shell provides access to the user's macros. The user access profile also stores caching instructions. The caching instructions control the collection and storage of information within the access network 520 for immediate access by the user.

FIG. 6 depicts an access network in an example of the invention. The access network 520 comprises the database system 522, the access server 524, the firewall/router 526, the firewall/router 556, and the access server 554. The database system 522 comprises a local database system 570, a Lightweight Directory Access Protocol (LDAP) interface system 571, a central database system 580, a local database system 590, and an LDAP interface system 591. The local database system comprises a user profile system 572, an audit database system 573, a cache database system 574, a host system 575, a security server 576, a user authorization system 577, an alias translation system 578, and a personal DNS system 579. The central database system 580 comprises a user authorization system 581, a financial interface 582, and a cross connect system 583. The local database system 590 comprises a user profile system 592, a user authorization system 593, and an availability system 594.

The access server 524 and the firewall/router 526 are connected to the local database system 570. The local database system 570 is connected to the central database system 580 and the LDAP interface system 571. The central database system 580 is connected to the local database system 590. The local database system 590 is connected to the firewall/router 556, the access server 554, and the LDAP interface system 591.

An access provider is an entity that provides access to users who use communications services. A typical access provider comprises an access server, a firewall/router, and a local database system. The systems within the local database system 570 could be included within the local database system 590. Also, the systems within the local database system 590 could be included within the local database system 570. As discussed above, the user is accessing the network architecture through the user network 510. The duplication of systems in the local database system 570 and the local database system 590 is excluded for the purposes of clarity. A service provider is an entity that provides communication services to users who are accessing the service through an access provider.

Network User Access Profile—FIGS. 5, 6, 7, 8, 9, 10, 11, and 12

User Access Profile Inheritance

The user access profile is stored in the access network 520 and controls user access to services. The user access profile is any information or data associated with controlling user access to a service such as role identification, authorization, billing information and access preferences.

FIG. 7 depicts table for a user access profile in an example of the invention. A user access profile includes access information for the user, billing information, and preferences for access. Access information is any information or data related to providing the user access to the network architecture 500. Some examples of access information are user ID, password, name, account number, user alias, current network address, switching allowed flag, and other security information. Access information also include a list of services that the user has subscribed to or is allowed access to. In one embodiment, access information includes a cache of information that the user has accessed previously. Some examples of billing information are address and billing code including bank card numbers or prepaid account codes. Preferences for access allow the user to save choices or preferences to customize their access to the network architecture 400. Some examples of preferences for access are file formats and Quality of Service values. The user access profile may also include usage information such as time of day access, day of week, usages per day, usages per week, and usages per month.

Users typically set up their user access profiles when signing up for the access to the network architecture 500. In one embodiment, users create the user access profile through an inheritance process. Through the inheritance process, the user selects user profile information from other user access profiles in the network architecture 500. The user may inherit user profile information from user profile data structures such as templates, other user access profiles, the user's group or class, or other networks that the user is set up in. A user profile data structure is any user profile information to be retrieved when inheriting a user access profile.

Figure 8:
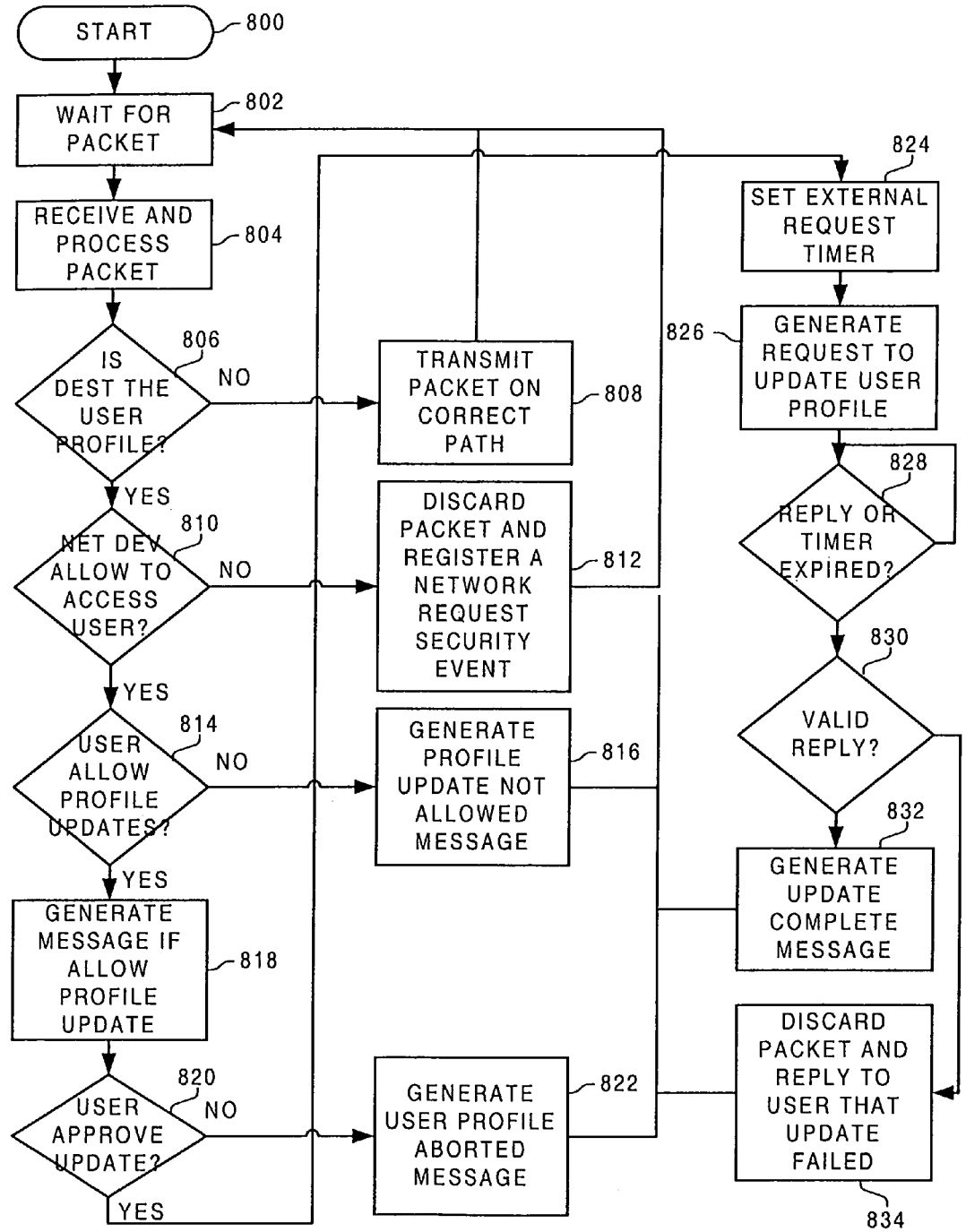
FIG. 8 illustrates a flowchart for an access server for inheriting a user access profile in an example of the invention.

In a prior solution, a command interpreter in a single computer operating system shell environment allows a user to customize the interpretation of command strings. The user may inherit portions of other user's shell environment by adding the other user's shell attributes. User access profiles are typically stored in the access provider's database. FIG. 5 and FIG. 8 disclose one embodiment for inheriting user access profiles in an example of the invention. The user access profile is created through an inheritance process where the user is able to select capabilities, macros, functions, methods, and data to inherit from other profiles. In this embodiment, users inherit user access profiles from classes, groups, or provider recommendations. Features of user access profiles such as alias translation could then be implemented with new users rapidly. The inheritance of user access profiles also simplifies the configuration of users. In one example, a user initiates the user access profile inheritance by clicking a button on a website. Also, when user requests a new service, the service provider automatically inherits the user access profile for the user so the user is able to use the requested service.

FIG. 8 depicts a flowchart for the access server 524 for inheriting a user access profile in an example of the invention. FIG. 8 begins in step 800. In step 802, the access server 524 waits for the next packet. The access server 524 then receives and processes the packet from the network device 562 in step 804. The access server 524 then checks if the destination is the user access profile in step 806. If the destination is not the user access profile, the access server 524 transmits the packet on the correct path in step 808 before returning to step 802. If the destination is the user access profile, the access server 524 then checks if the network device 562 is allowed access to the user access profile in step 1110. If the network device 512 is not allowed access to the user access profile, the access server 524 discards the packet and registers a network request security event in step 812 before returning to step 802.

If the network device 512 is allowed access to the user access profile, the access server 524 then checks if the user is allowed to update their user access profile in step 814. If the user is not allowed updates to their user access profile, the access server 524 generates and transmits a profile update not allowed message to the network device 512 in step 816 before returning to step 802. If the user is allowed updates to their user access profile, the access server 524 generates and transmits a user access profile update permission message asking if the user wishes to update the user access profile to the network device 512 in step 818. The access server 524 then checks if the user approved the user access profile update in step 820. If the user does not approve, the access server 524 generates and transmits a user access profile aborted message to the network device 512 in step 822 before returning to step 802.

If the user approves the user access profile update, the access server 524 sets an external request timer in step 824. The access server 524 then generates and transmits a user access profile update request to the database system 522 in step 826. A user access profile update request could be any signaling, message, or indication to update the user access profile. The access server 524 then checks if a reply was received or the external request timer expired in step 828. If the reply was not received and the external request timer did not expire, the access server 524 returns to step 828. If the reply was received or the external request timer did expire, the access server 524 checks if the reply was valid in step 830. If the reply was valid, the access server 524 generates an update complete message in step 832 before returning to step 802. If the reply was not valid, the access server 524 discards the packet and replies to the network device 512 that the user access profile update failed in step 834 before returning to step 802.

Figure 9:
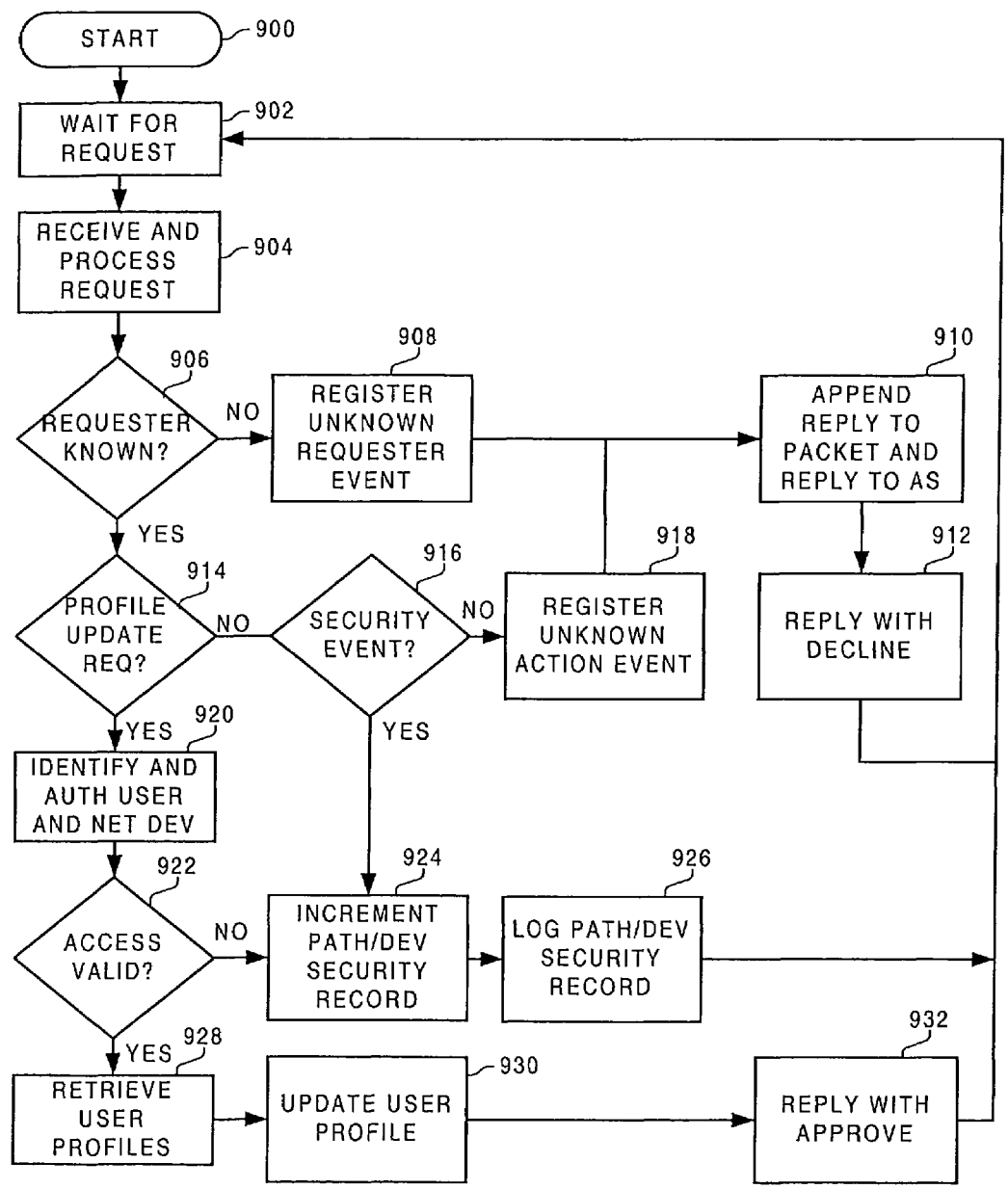
FIG. 9 illustrates a flowchart for a database system for inheriting a user access profile in an example of the invention.

FIG. 9 depicts a flow chart for the database system 522 for inheriting a user access profile in an example of the invention. FIG. 9 begins in step 900. In step 902, the database system 522 waits for a request. The database system 522 then receives and processes the request from the access server 524 in step 904. In step 906, the database system 522 then checks if the access server requester is known. If the access server requester is not known, the database system 522 then registers an unknown requester event in step 912. The database system 522 appends the reply to the packet and transmits the reply to the access server 524 in step 910. The database system replies with a decline message to the access server 524 in step 912 before returning to step 902.

If the requester is known, the database system 522 then checks whether the request is a user access profile update request in step 914. If the request is not a user access profile update request, the database system 522 checks if the request is a security event in step 916. If the request is not a security event, the database system 522 then registers an unknown action event in step 918 before returning to step 910. If the request is a security event, the database system 522 increments a path/device security record in step 924. The database system then logs the path/device security record in step 926 before returning to step 902.

If the request is a user access profile update request, the database system 522 identifies and authenticates the user and the network device 512 in step 920. The database system 522 then checks if the access is valid in step 922. If the access is invalid, the database system 522 returns to step 924. If the access is valid, the database system 522 retrieves the user access profile information from a user profile data structure in step 928. The retrieval of user access profile information may be based on any information in the user access profile such as group or class or selections of inheritance user access profile presented to the user. The group or classes could be any logical grouping of user based on similar interests or situations such as work, family, and geographic location. The database system 522 then updates the user access profile in step 930 based on the user access profile information retrieved in step 928 and the user's selections for updating. The database system 522 then replies with an approve message to the access server 524 in step 932 before returning to step 902. In one embodiment of the invention, the database system 522 uses the user access profile system 572 to perform the operations disclosed in FIG. 9 and stores the user access profile in the user access profile system 572.

Network Shell

Figure 10:
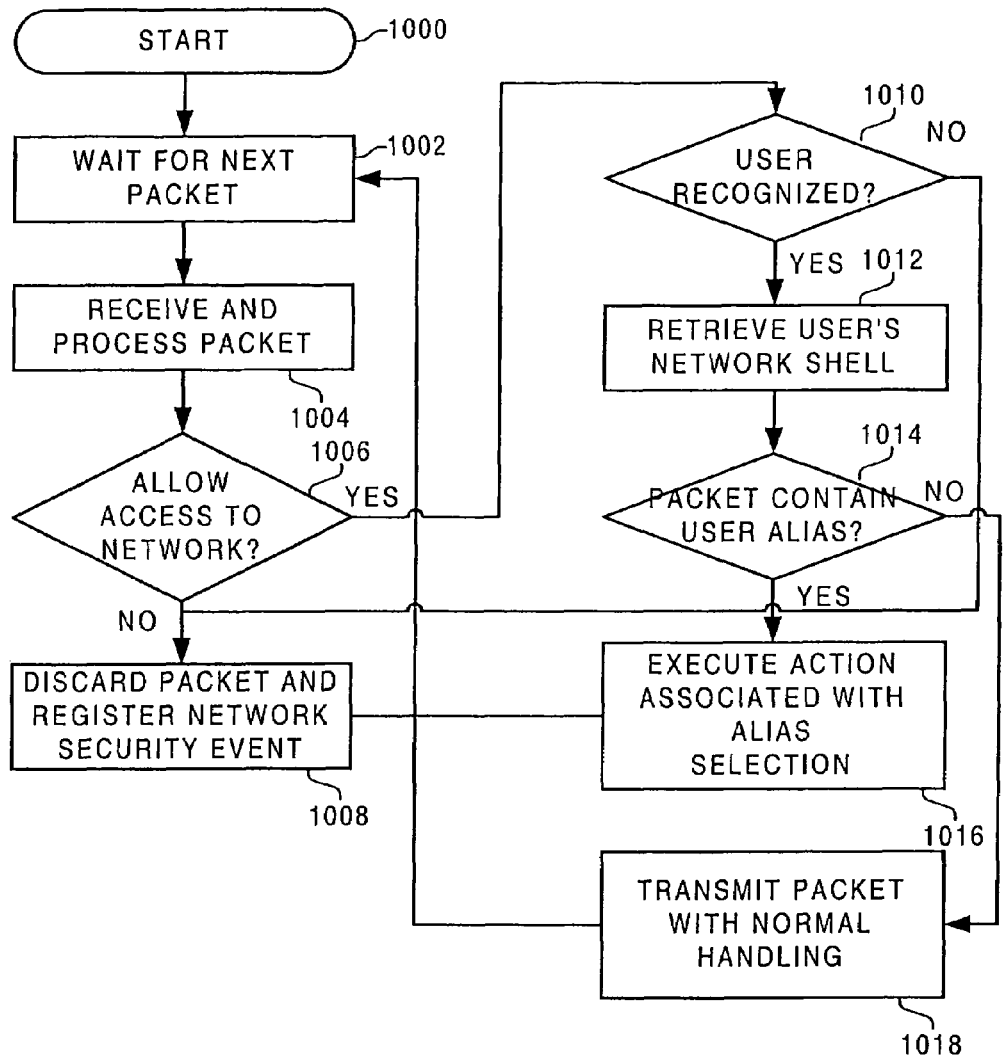
FIG. 10 illustrates a flowchart of an access server for executing a network shell in an example of the invention.
Figure 11:
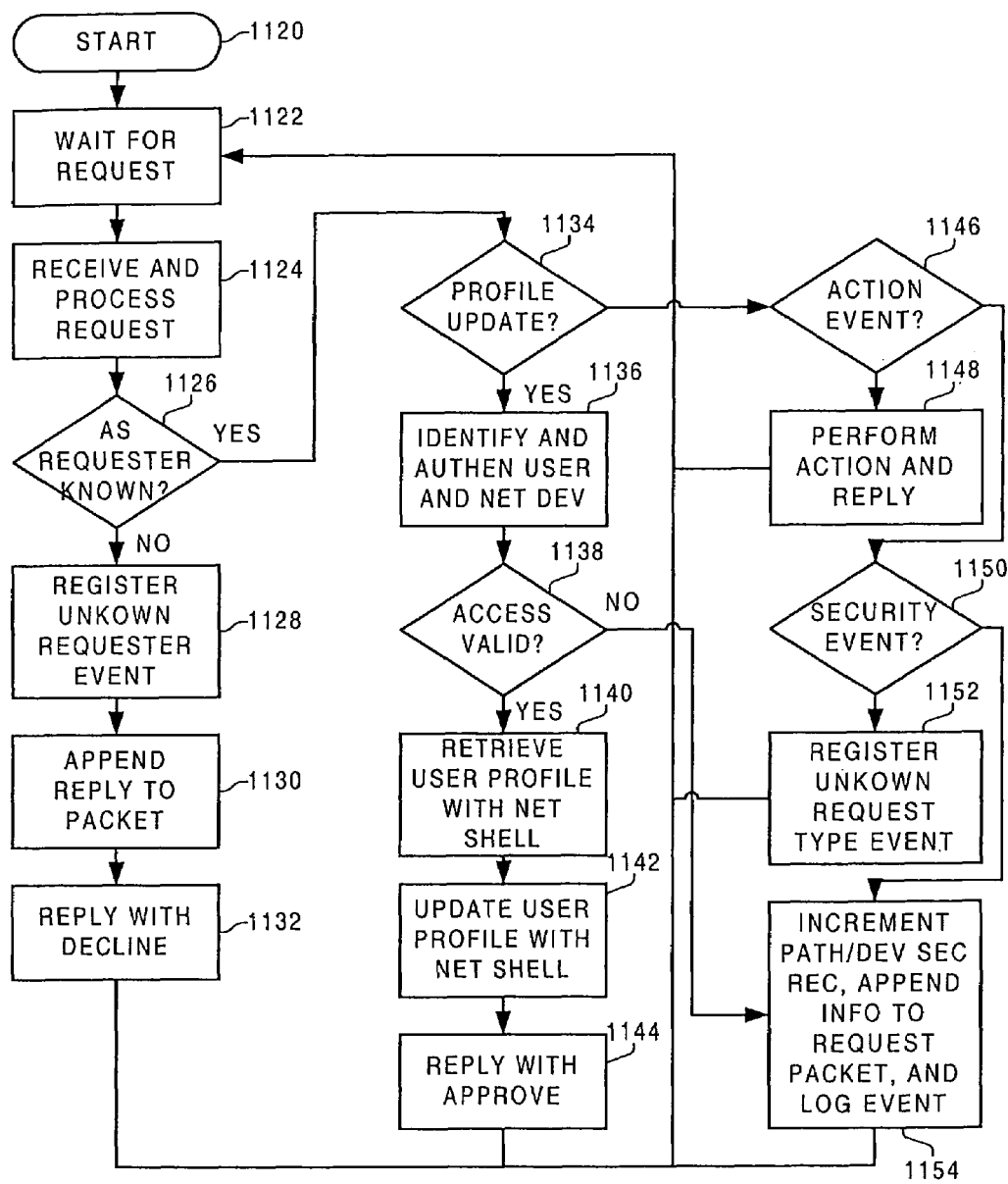
FIG. 11 illustrates a flowchart of a database system for updating a network shell in an example of the invention.

The user access profile includes data to provide a customized network shell to the user. The network shell is a user interface to the access network that is linked to programs, methods, macros, or service. Typically, configuration of the network shell is graphically presented to the user on a display. For example, the network shell appears as a list of alias selections that are associated with actions such as a program or macro for resources or services. An alias selection is any information that is associated with an action to be executed when the alias selection is selected. In another example, the alias selections are graphically presented as icons that relate to actions to be executed. The network shell overlays the standard DNS offered in IP networks, which reduces alias translation delays and required user keystrokes. In prior solutions, a command interpreter in an operating system shell environment allows a user to customize the interpretation of command strings, or a DNS translates "alias" values to addresses. FIGS. 5, 10, and 11 show one embodiment for network shells in an example of the invention.

FIG. 10 depicts a flowchart of an access server for executing a network shell in an example of the invention. FIG. 10 begins in step 1000. In step 1002, the access server 524 waits for the next packet. The user selects an alias selection from the network shell graphically presented. In another embodiment, the user enters an alias value by a non-graphical means. Alternatively, the network shell is not presented to the user. The network device 512 transmits a packet including the alias selection to the access server 524. In step 1004, the access server 524 receives and processes the packet from the network device 512 and processes the packet. The access server 524 then checks if the network device 512 is allowed access to the network architecture 500. If the network device 512 is not allowed access to the network architecture 500, the access server 524 discards the packet and registers a network security event in step 1008 before returning to step 1002.

If the network device 512 is allowed access to the network architecture 500, the access server 524 checks if the user is recognized in step 1010. If the user is not recognized, the access server 524 returns to step 1008. If the user is recognized, the access server 524 retrieves the user's network shell in step 1012. In some embodiments, the user's network shell is retrieved from the user access profile in the access database 522 prior to presenting the network shell to the user. In step 1014, the access server 524 checks if the packet from the network device 512 includes an alias selection from the user's network shell. In one embodiment, specialized hardware is used to scan for aliases just as IP addresses are currently scanned for. If the packet does not include an alias selection from the user's network shell, the access server 524 proceeds to step 1018. If the packet does include the alias selection from the user's network shell, the access server 524 executes the action associated with the alias selection in step 1016 before returning to step 1002. In step 1018, the access server 524 processes the packet with the normal handling before returning to step 1002.

FIG. 11 depicts a flowchart of a database system for updating a network shell in an example of the invention. FIG. 11 begins in step 1120. In step 1122, the database system 522 waits for a request. The database system 522 then receives and processes the request from the access server 524 in step 1124. The database system 522 then checks if the access server requester is known in step 1126. If the access server requester is not known, the database system 522 registers an unknown requester event in step 1128. The database system 522 then appends the reply to the packet and transmits the packet to the access server 524 in step 1130. In step 1132, the database system 522 replies with a decline message to the access server 524 before returning to step 1122.

If the access server requester is known, the database system 522 checks if the request is a profile update for the network shell in step 1134. If the request is a profile update for the network shell, the database system 522 identifies and authenticates the user and the network device 512 in step 1136. The database system 522 then checks whether the access is valid in step 1138. If the access is invalid, the database system proceeds to step 1154. If the access is valid, the database system 522 retrieves the user access profile in step 1140. The database system 522 then updates the user access profile with the network shell with the user's alias selections and the associated programs, macros, functions or methods in step 1142. The database system 522 then replies with an approve message in step 1144 before returning to step 1122.

If the request is not a profile update, the database system 522 checks if the request is an action event in step 1146. If the request is an action event, the database system 522 performs the action and replies in step 1148 before returning to step 1122. If the request is not an action event, the database system 522 checks if the request is a security event in step 1150. If the request is not a security event, the database system 522 registers an unknown request type event in step 1152 before returning to step 1122. If the request is a security event, the database system 522 proceeds to step 1154. In step 1154, the database system increments a path/device security record. The database system 522 then appends the requester information to the packet and logs the event before returning to step 1122. In one embodiment of the invention, the database system 522 uses the user access profile system 572 to perform the operations disclosed in FIG. 11 and stores the user access profile in the user access profile system 572.

Service Based Directory

Figure 12:
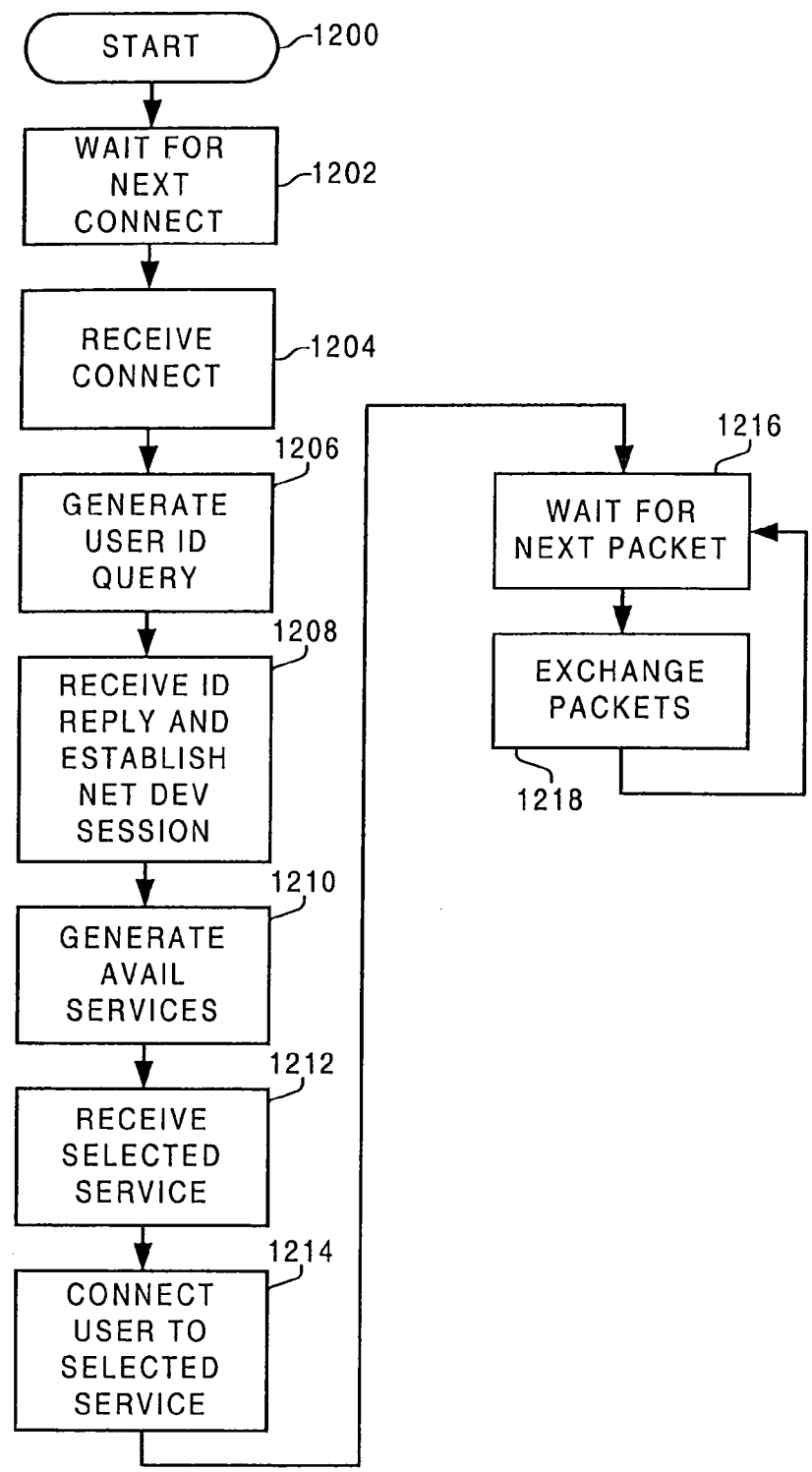
FIG. 12 illustrates a flowchart for the services based directory in an example of the invention.

In prior systems, the RADIUS server provided the user with selections for transport modes. However, the user was not able to select available network based services. FIGS. 5 and 12 disclose one embodiment for a service based directory in an example of the invention. In this embodiment, access providers provide a list of services that the user can select. With the list of services, the access providers have the ability to advertise specific services to users. The list of services may be generated based on the user access profile to make the list user specific. Once the user makes the selection, the access server 524 connects the user to the service network such as Intranet, Internet, or private dedicated network that provides the selected service.

FIG. 12 depicts a flowchart for the services based directory in an example of the invention. FIG. 12 begins in step 1200. In step 1202, the access server 524 waits for the next connection from a network device in the user network 510. The access server 524 then receives a connection from the network device 512 in step 1204. Once the connection is established, the access server 524 generates and transmits a user ID query to the network device 512 in step 1206. The access server 524 then receives an ID reply and establishes a network device session in step 1208.

The access server 524 then generates an available services reply including a list of services in 1210. In one embodiment, the access server 524 generates the available services reply based upon information in the user access profile. The access server 524 receives a selected service reply from the network device 512 in step 1212. The access server 524 then connects the network device 512 to the selected service provider in step 1214. The access server 524 waits for the next packet in step 1214. The access server 524 then exchanges packets between the network device 524 and the selected service provider in step 1218.

Access Network User Binding—FIGS. 5, 13, 14, 15, and 16

User Access Profile Mobility

Figure 13:
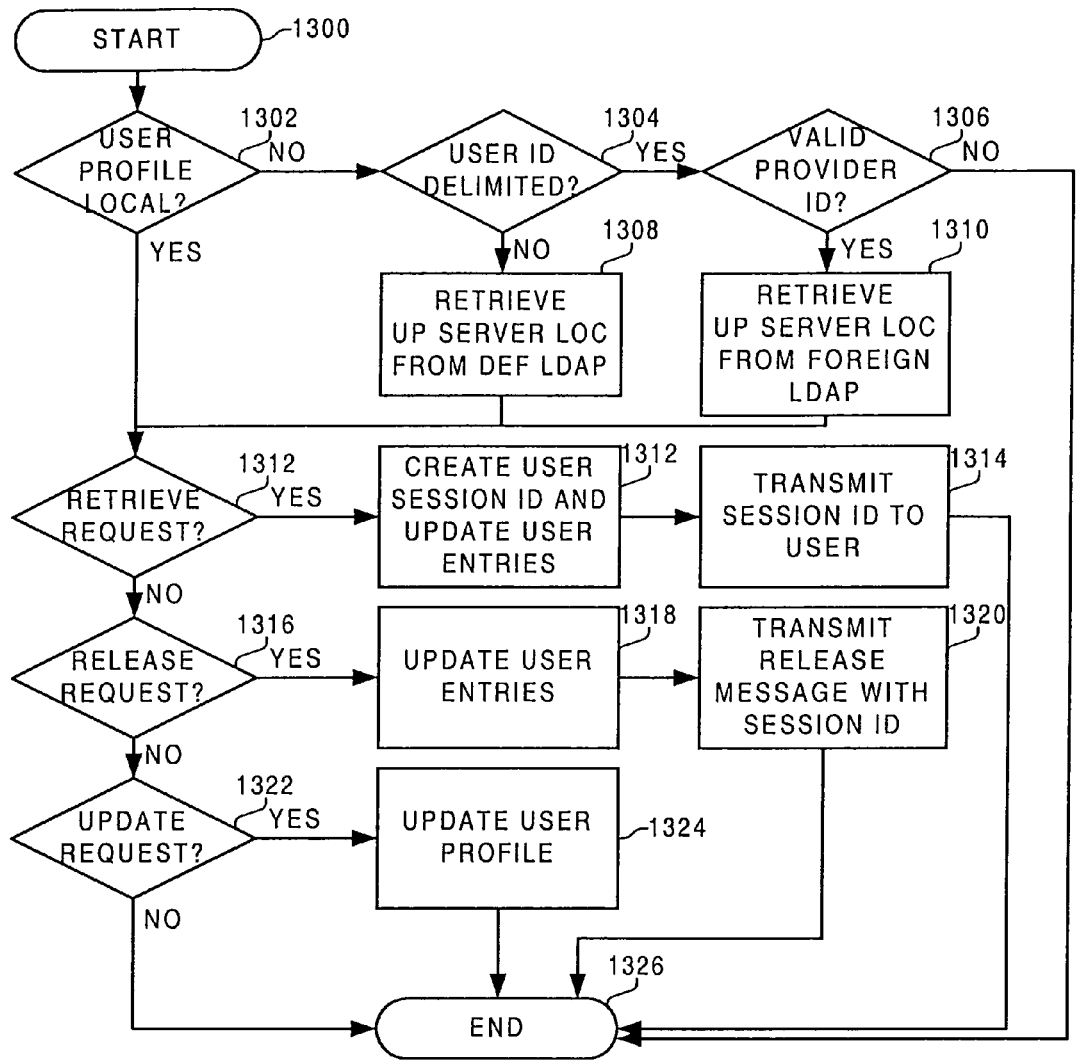
FIG. 13 illustrates a flowchart of user access profile mobility in an example of the invention.

Users may access their user access profile from any network device connected to the network architecture 500. In a prior solution, a command interpreter in an operating system shell environment allows a user to customize the interpretation of command strings. In this environment, the access network identifies the user and the terminal device interface, which provides user mobility. The access network then executes customized actions for the user. FIGS. 5 and 13 show one embodiment of the invention for user access profile mobility. This embodiment provides user mobility in a distributed data network environment.

FIG. 13 depicts a flowchart of user access profile mobility in an example of the invention. FIG. 13 begins at step 1300. A user at the network device 512 signs on the access network 520 with their user ID. The network device 512 transmits user information with the user ID to the access server 524. In this embodiment, the user information is in the form of a packet. In step 1302, the access server 524 receives and processes the packet to check if the user access profile is local within the local database system 570. A user access profile is local within the local database system 570 when the user access profile is located in the local database system 570. If the user access profile is local, the access server 524 proceeds to step 1312.

If the user access profile is not local within the local database system 570, the access server 524 checks if the user ID is delimited with a provider ID in step 1304. One example of a user ID delimited with a provider ID includes a user's name and a provider ID separated by a delimiter such as joesmith@accessp.net. If the user ID is not delimited, the access server 524 retrieves the location of the default user access profile system using a default Lightweight Directory Access Protocol (LDAP) interface system 571 in step 1308 before proceeding to step 1312.

If the user ID is delimited, the access server 524 checks if the provider ID is valid in step 1306. If the provider ID is not valid, the access server 524 registers an invalid profile request security event before terminating at step 1326. If the provider ID is valid, the access server 524 uses the provider ID to retrieve the location of the local database system 590 from a foreign LDAP interface system 591 before proceeding to step 1312.

In step 1312, the access server 524 checks if the packet is a retrieve request for the user access profile. If the packet is a retrieve request, the access server 524 generates and transmits a request to retrieve the user access profile from the local database system 570 for local user access profiles or from the local database system 590 for foreign user access profiles. The access server 524 then creates the user session ID and updates the user entries of the user access profile with the user ID and date/time updated in step 1312. The access server 524 then transmits a reply message with the session ID and the location of the LDAP server in step 1314 before terminating at step 1326.

If the packet is not a retrieve request, the access server 524 checks if the packet is a release request in step 1316. If the packet is a release request, the access server 524 retrieves the user access profile from the local database system 570 for local user access profiles or from the local database system 590 for foreign user access profiles. The access server 524 then updates the user session ID and updates the user entries of the user access profile with the user ID and date/time updated in step 1318. The access server 524 then transmits a reply message with the session ID in step 1320 before terminating at step 1326.

If the packet is not a release request, the access server 524 checks if the packet is an update request in step 1322. If the packet is not an update request, the access server 524 registers an invalid profile request security event before terminating at step 1326. If the packet is an update request, the access server 524 retrieves the user access profile from the local database system 570 for local user access profiles or from the local database system 590 for foreign user access profiles. The access server 524 then updates the user access profile with the information in the packet in step 1324. The access server 524 then transmits a complete message to the user network 510 to signify the profile update is complete before terminating at step 1326. In one embodiment, the local database system 570 uses the user access profile system 572 to retrieve and store the local user access profiles and the local database system 590 uses the user access profile system 592 to retrieve and store the foreign user access profiles.

User, Device, and Service Sessions

Access network providers provide user and device sessions in addition to service sessions to distinguish users when providing communication services. A user session is the information associated with a user accessing a network. A device session is the information associated with a device being used to access a network. A service session is the information associated with a service being provided over a network. Service providers distinguish users instead of access devices or links. This allows multiple users to share a single access device with each user receiving their own customized or preferred services. Advantageously, service providers establish service access rights and restrictions such as preventing adult content for younger viewers or sharing an access device for business and personal use. Also, user, device, and service sessions allow a service provider to group multiple service providers to provide a composite of services to the user similar to a contractor/sub-contractor relationship.

Figure 14:
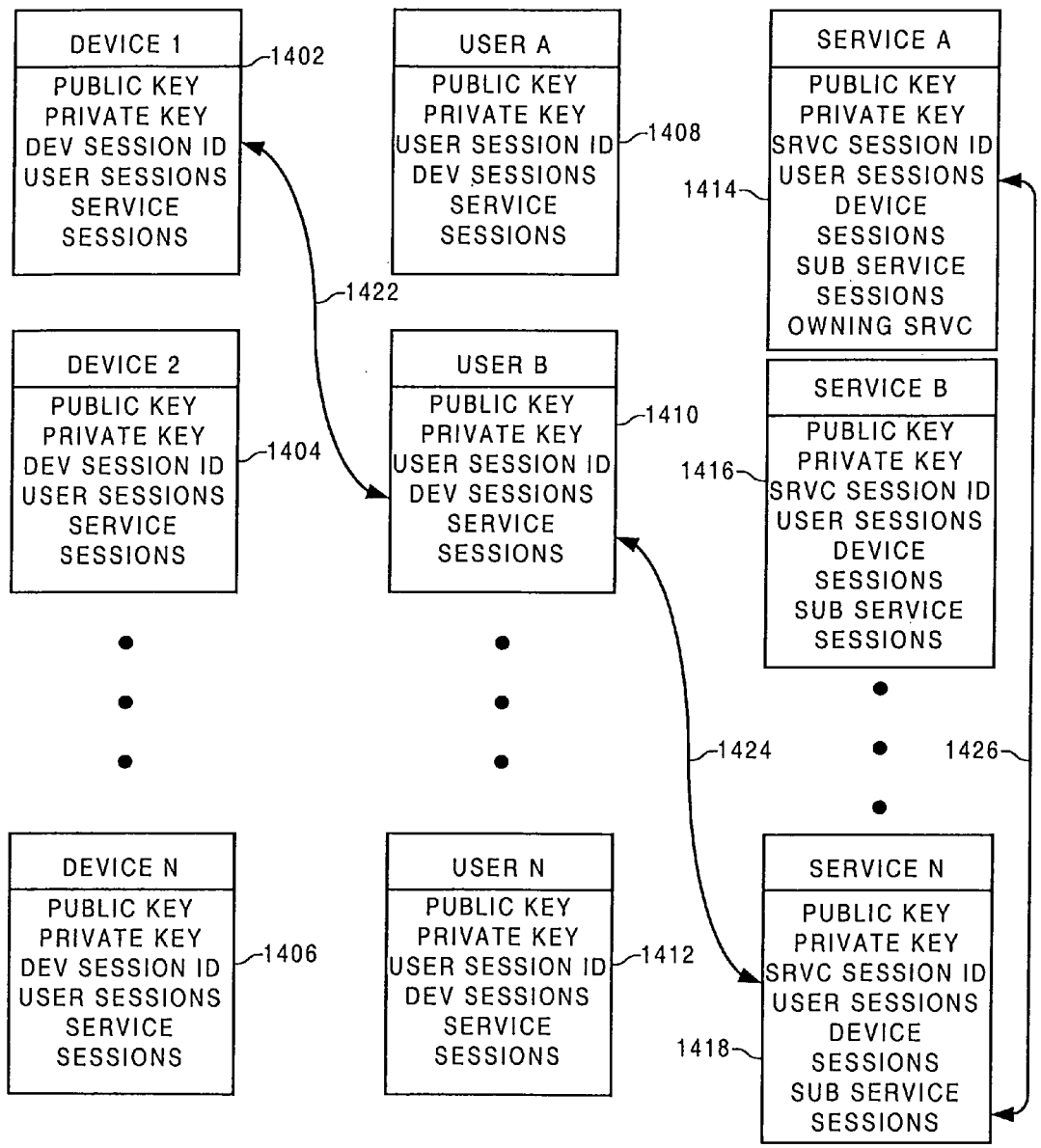
FIG. 14 illustrates a logical view of device, user, and service sessions in an example of the invention.

FIGS. 5, 14, 15, and 16 disclose one embodiment for device, user, and service sessions in an example of the invention. FIG. 14 depicts a logical view of device, user, and service sessions in an example of the invention. Devices 1402, 1404, and 1406 are comprised of session type specific information and session links. Session type specific information include public keys, private keys, and session ID. Session links include user sessions, device sessions, and service sessions. The public keys and private keys are for encryption and decryption of messages. Session ID identifies the session ID for the device. User sessions are user sessions that the device is logically linked to. Service sessions are the service sessions the device is logically linked to. Users 1408, 1410, and 1412 are comprised of public keys, private keys, session ID, device sessions, and service sessions. Session ID identifies the session ID for the user. Device sessions are the device sessions the user is logically linked to. Service sessions are the service sessions the user is logically linked to. Services 1414, 1416, and 1418 are comprised of public keys, private keys, session ID, users sessions, device sessions, and sub service sessions. Session ID identifies the session ID for the service. User sessions are the user sessions the service is logically linked to. Device sessions are the device sessions the service is logically linked to. Sub service sessions are the service sessions the service is logically linked to.

In one example, device 1402 is linked to user B 1410 via a link 1422. User B is also linked to service N 1418 via a link 1424. Device 1402 contains the user information in the user session fields for user B 1410 and the service information in the service session fields for service N. User B 1410 contains the device information in the device session fields for device 1402 and the service information in the service session fields for service N 1418. Service N 1418 contains the device information in the device session fields for device 1402 and the user information in the user session fields for user B 1410. Service N 1418 is also linked to service A 1414 via a link 1426. Service N 1418 contains additional service information in the service session fields for service A 1414. Service A 1414 contains the composite service information in the service session fields for service N 1418. Service A 1414 also includes an owning service which is a reference to the service that owns service A.

Figure 15:
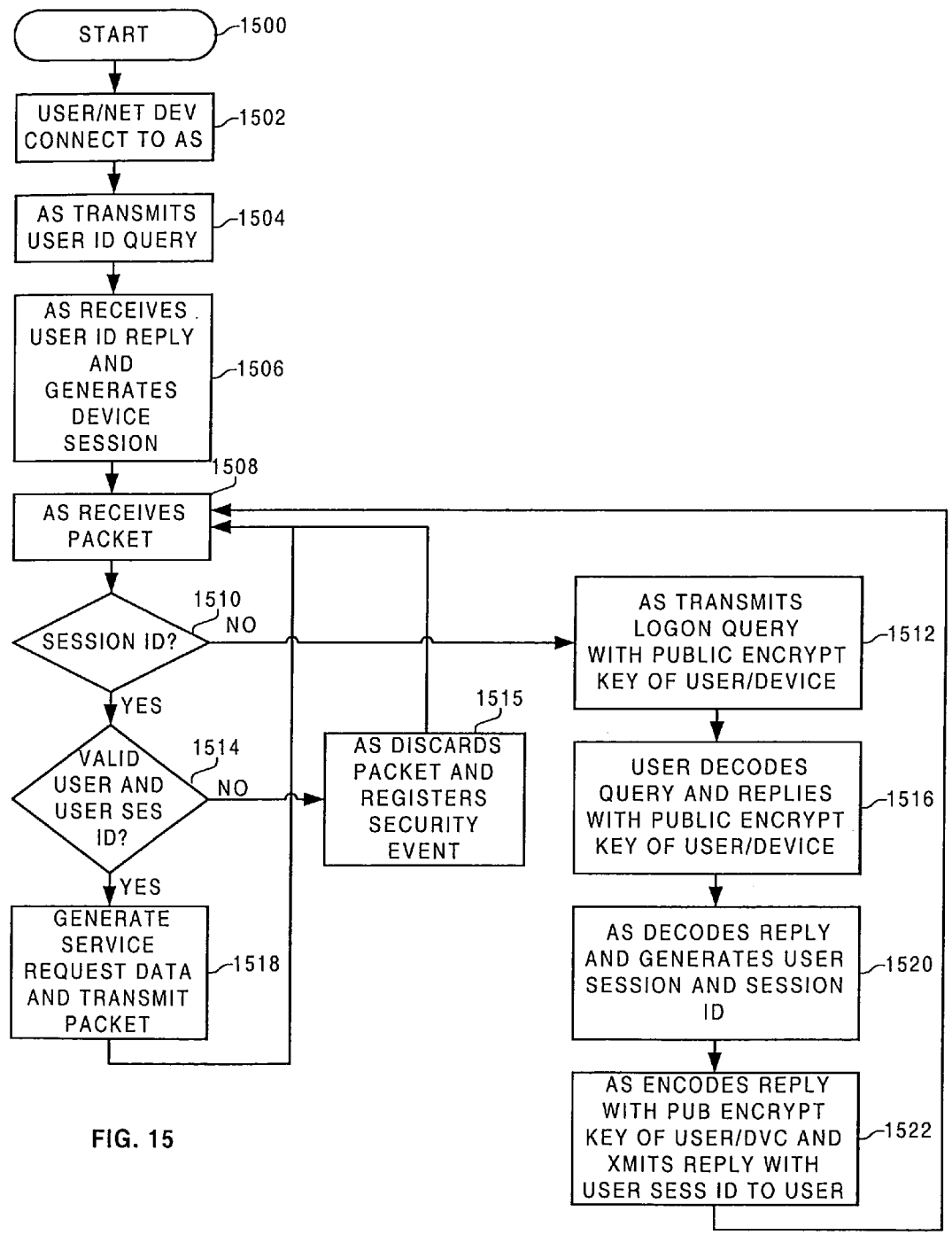
FIG. 15 illustrates a flowchart for a user based session in an example of the invention.

FIG. 15 depicts a flowchart for a user based session in an example of the invention. FIG. 15 begins in step 1500. In step 1502, the network device 512 establishes a connection with the access server 524. The access server 524 generates and transmits a user ID query to the user network 510 in step 1504. In step 1506, the network device 512 receives the user ID query and transmits a user ID reply to the access server 524. The access server 524 receives and processes the user ID reply to generate a device session. The network device 512 then transmits a packet to the access server 524. The access server 524 then receives the packet in step 1508. In step 1510, the access server 524 processes the packet to check if the packet includes a user session ID.

If the packet does not include the user session ID, the access server 524 transmits a logon query encrypted by the network device's 512 public encryption key 1402 to the network device 512 in step 1512. The network device 512 decodes the logon query with its public encryption key and transmits a logon reply encrypted with its public encryption key in step 1516. The access server 524 then decodes the logon reply with the private encryption key and checks if the user ID is valid. If the user is valid, the access server 524 generates a user session and a session ID in step 1520. In some embodiments, the user session ID is the original IP address. The access server 524 then encrypts with the public encryption key and transmits a complete reply with the user session ID to the network device 512 in step 1522 before returning to step 1508.

If the packet does include the user session ID, the access server 524 checks if the user and user session ID are valid in step 1514. If the user or user session ID is not valid, the access server 524 discards the packet and registers a security event in step 1515 before returning to step 1508. If the user and user session ID are valid, the access server 524 generates a service request with the user session ID and the service session ID if available. The access server 524 encrypts the service request with the public encryption key where appropriate. The access server 524 transmits the packet including the service request in step 1518 before returning to step 1508.

Figure 16:
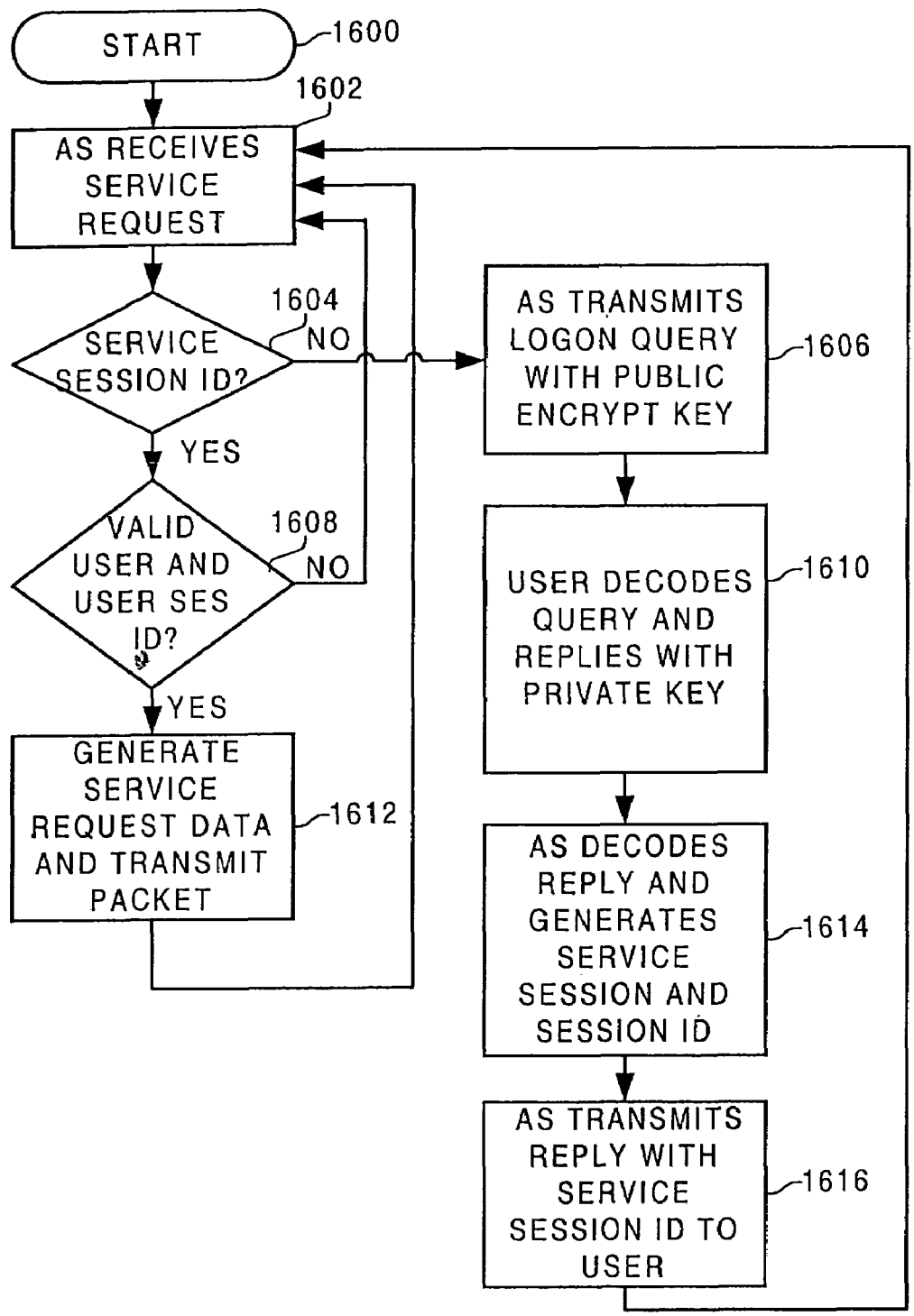
FIG. 16 illustrates a flowchart for a service based session in an example of the invention.

FIG. 16 depicts a flowchart for a service based session in an example of the invention. FIG. 16 begins in step 1600. The network device 512 transmits a service request to the access server 524. The access server 524 then receives the service request in step 1602. In step 1604, the access server 524 checks if the service request includes a service session ID.

If the service request does not include the service session ID, the access server 524 transmits a service ID query encrypted with the public encryption key to the network device 512 in step 1606. The network device 512 decodes the service ID query with its private key and transmits a service reply encrypted with the service public encryption key to the access server 524 in step 1610. The access server 524 then decodes the service reply with the service private encryption key and checks if the user is valid. If the user is valid, the access server 524 generates a service session and a session ID in step 1614. The access server 554 then transmits a complete reply with the service session ID to the network device 512 in step 1616 before returning to step 1602.

If the packet does include the service session ID, the access server 524 checks if the user and service session ID are valid in step 1608. In one embodiment, the service session ID is the destination EP address. If the user or service session ID is not valid, the access server 524 discards the packet and registers a security event before returning to step 1602. If the user and service session ID is valid, the access server 524 updates the service request with the user session ID and the service session ID. The access server 524 encrypts the service request with the service public encryption key where appropriate. The access server 524 transmits the service request with the user session ID and the service session ED in step 1612 before returning to step 1602.

Figure 17:
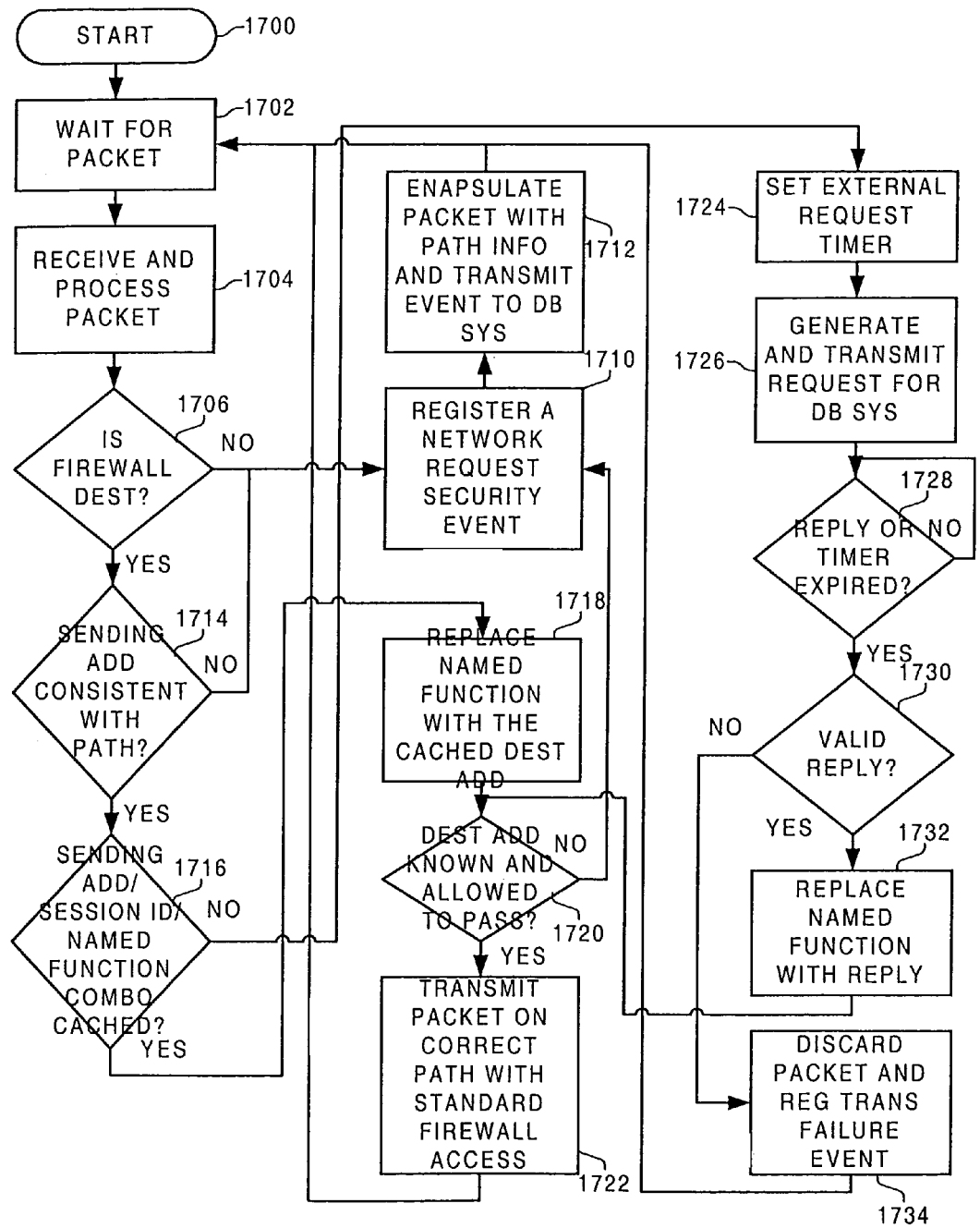
FIG. 17 illustrates a flowchart for a firewall/router for service capability firewall in an example of the invention.
Figure 18:
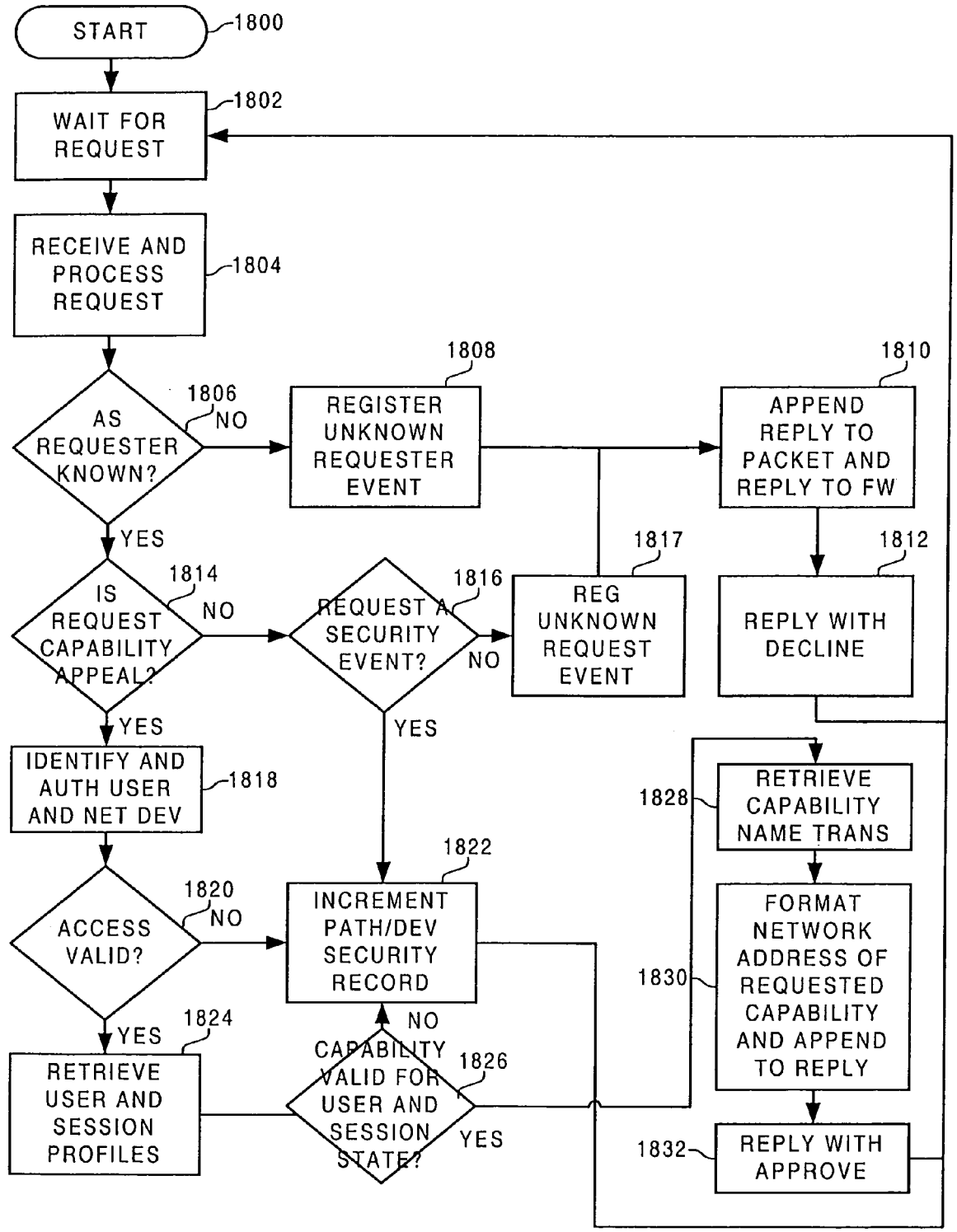
FIG. 18 illustrates a flowchart for a database system for service capability firewall in an example of the invention.

Access Network Security—FIGS. 5, 17, and 18

Service Capability Firewall

A network service provider interfaces with a network access provider at a transport functional level. The interface typically includes Internet protocol firewalls to provide security. Unfortunately, the interface between the network service provider and the network access provider is not able to hide the implementation details such as addressing schemas, transport details, and equipment specifics. The hiding of implementation details is preferred to prevent hackers from manipulating the implementation details. FIGS. 5, 17 and 18 depict one embodiment for a service capability firewall in an example of the invention. In this embodiment, the interface between the network service provider and the network access provider occurs at a named functional level instead of the transport addressing level. A named function request is any request for a capability of service provided by the network service provider. This allows the network service provider to hide the implementation details. The network service provider exposes only functional capabilities to the users depending on their security rights.

FIG. 17 depicts a flowchart for the firewall 556 for service capability firewall in an example of the invention. FIG. 17 begins in step 1700. In step 1702, the firewall 556 waits for information. In this embodiment, the information is in the form of a packet. The firewall 556 receives and processes a packet including a named function request from the network device 512 in step 1704. The firewall 556 then checks whether the firewall 556 is the destination for the named function request in step 1706. If the firewall 556 is not the destination, the firewall 556 registers a network request security event in step 1710. In step 1712, the firewall 556 encapsulates the packet with path information and transmits the packet to the database system 522 before returning to step 1702.

If the firewall 556 is the destination, the firewall 556 checks whether the sending address is consistent with the path in step 1714. If the sending address is not consistent with the path, the firewall 556 returns to step 1710. If the sending address is consistent with the path and does not belong to the accessing network, the firewall 556 checks if the sending address/session ID/named function combination is cached in step 1716. If the sending address/session ID/named function combination is cached, the firewall 556 replaces the packet's named function request with the private cached destination address in step 1718. The firewall 556 then checks if the private destination address is known and allowed to pass in step 1720. If the destination is known and allowed to pass, the firewall 556 transmits the packet on the correct path with standard firewall access in step 1722 before returning to step 3802. If the destination is not known or not allowed to pass, the firewall 556 returns to step 1710.

If the sending address/session ID/named function combination is not cached, the firewall 556 set an external request timer in step 1724. The firewall 556 then generates and transmits a request for the database system 522 in step 1726. The firewall 556 checks whether a reply is received or the timer has expired in step 1728. If the reply is not received and the timer has not expired, the firewall 556 returns to step 1728. In another embodiment, a blocked I/O is used instead of the wait loop in step 1728. If the reply is received or the timer has expired, the firewall 556 checks if there is a valid reply in step 1730. If the reply is invalid or no reply was received, the firewall 556 discards the packet and registers a translation failure event in step 1734 before returning to step 1702. If the reply is valid, the firewall 556 replaces the packet's named function request based on the reply and caches the address/session functions returned in step 1732 before returning to step 1720.

FIG. 18 depicts a flowchart for the database system 522 for service capability firewall in an example of the invention. FIG. 18 begins in step 1800. In step 1802, the database system 522 waits for the next request. The database system 522 then receives and processes the request in step 1804. In step 1806, the database system 522 then checks if the access server requester is known. If the access server requester is not known, the database system 522 registers an unknown requester event in step 1808. The database system 522 then appends the reply with the packet and replies to the access server 524 in step 1810. The database system 522 then generates and transmits a decline reply to the access server 524 in step 1812 before returning to step 1802.

If the requester is known, the database system 522 then checks if the request is a capability appeal in step 1814. A capability appeal is any message, signaling or instruction requesting a capability with a related network address in the service provider. If the request is not a capability appeal, the database system 522 then checks if the request is a security event in step 1816. If the request is not a security event, the database system 522 register an unknown request event in step 1817 before returning to step 1810. If the request is a security event, the database system 522 increments a path/device security record and appends the requester information to the request packet and logs the event in step 1822 before returning to step 1802. If the request is a capability appeal, the database system 522 then identifies the user and network device 512 in step 1818. The database system 522 then checks if the access is valid in step 1822. If the access is invalid, the database system 522 returns to step 1822. If the access is valid, the database system 522 retrieves the user and network device profiles in step 1824. The database system 522 then checks whether the capability is valid for the user and session state in step 1826. If the capability is invalid, the database system 522 returns to step 1822. If the capability is valid, the database system 522 generates a session ID, the network address of the capability requested, and functions available and appends the network address, which is only sent to the firewall/router 526 and not to the user, to the reply in step 1830. The database system 522 then transmits the approve reply to the access server 524 in step 1832 before returning to step 1802.

Access Network Service Authorization—FIGS. 5, 19, 20, 21, 22, 23, and 24

Prepaid Access

Figure 19:
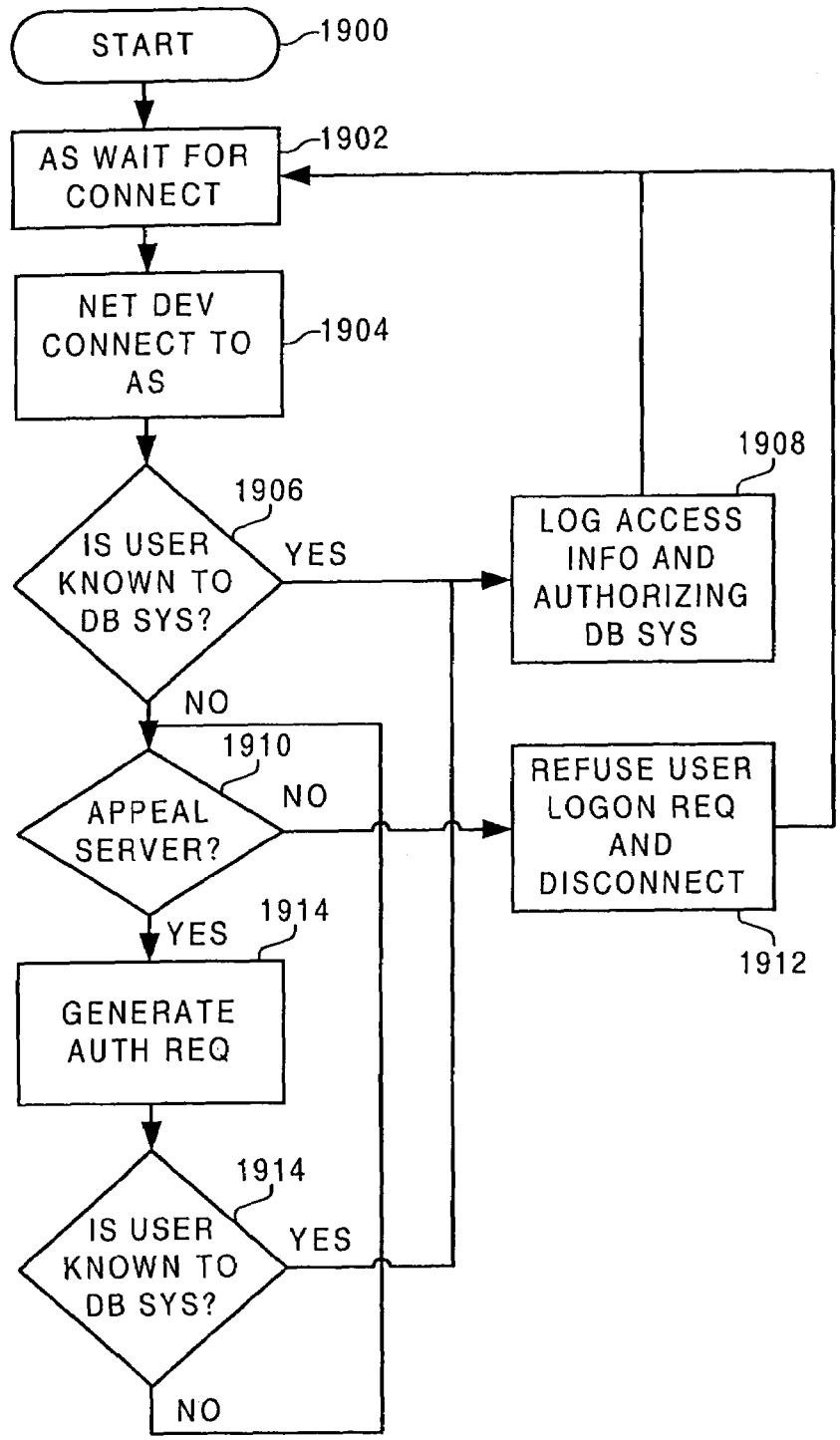
FIG. 19 illustrates a flowchart for prepaid access in an example of the invention.

Prepaid phone cards are commonly used in PSTN, where the customer pays a prepaid amount that is debited against when the customer makes a call. In data networks, prepaid cards are not currently being used. FIGS. 5 and 19 disclose one embodiment for prepaid access in an example of the invention. In this embodiment, users buy prepaid cards from network providers. When the user requests access to one of many access providers throughout the country, the access provider verifies the prepaid account code before providing the access. A prepaid account code is any number that relates to a user's prepaid account. The prepaid account is debited against for the charges related to the access. Other charges related to the service provided may also be debited against the prepaid account. For example, a user may purchase an item from a website and have the charges debited against the prepaid account. Once the prepaid amount is reached, the access provider terminates the access to the user. In one embodiment, the network provider provides different levels of service such as gold, silver, and bronze. The gold service has guaranteed throughput but higher rates for access, while the bronze service has lower throughput and rates.

FIG. 19 depicts a flowchart for prepaid access in an example of the invention. FIG. 19 begins in step 1900. In step 1902, the access server 524 waits for a connection. The network device 512 connects to the access server 524 in step 1904. Once a connection is established, the database system 522 generates and transmits a logon query for the network device 512. The network device 512 transmits information identifying a billing code. A billing code is any number that identifies a user for billing. Two examples of billing codes are prepaid account codes and credit card numbers. In this embodiment, the information identifying a billing code is a response including a prepaid account code to the logon query. In other embodiments, the billing code is retrieved from the user access profile. The access server 524 then transfers the response from the network device 512 to the database system 522. The database system 522 receives and processes the response including the prepaid account code to determine if the user is known in the local database system 570 in step 1906. A user is known when the user is allowed to use the access network 520. In one embodiment, the user is known in the local database system 570 if there is time/amounts left in the user's prepaid account. In another embodiment, the database system 522 evaluates a positive balance file to determine the remaining time/amount in the user's prepaid account. If the user is known, the database system 522 logs the access information and authorizes to provide access to the user via the access server 524 in step 1908 before returning to step 1902.

If the user is not known, the database system 522 checks if there is an appeal server for user authentication in step 1910. In one embodiment, the access server 524 performs the appeal on a decline. If there is no appeal server, the database system 522 transmits an instruction to the access server 524 to refuse the user logon and to disconnect the network device 512 from the access server 524 in step 2412 before returning to step 2402. If there is an appeal server, the database system 522 generates an authorization query including the prepaid account code for the central database system 580 in step 1914. The database system 522 checks if the user is known in the central database system 580 in step 1914. In one embodiment, the user is known in the central database system 580 if there is time/amounts left in the user's prepaid account. If the user is known, the database system 522 proceeds to step 1908. If the user is not known, the database system 522 proceeds to step 1910.

In one embodiment, the database system 522 uses a user authorization system 575 for checking if the user is known in the local database system 570. The user authorization system 575 contains all the prepaid customers, prepaid customer information, prepaid account codes, and the amount/quantity remaining in the prepaid account to verify if access is allowed. In one embodiment, the database system 522 uses a user authorization system 581 as the appeal server for checking if the user is known in the local database system 580. The user authorization system 581 contains all the prepaid customers, prepaid customer information, and the amount/quantity remaining in the prepaid account.

Bank Card Access

Figure 20:
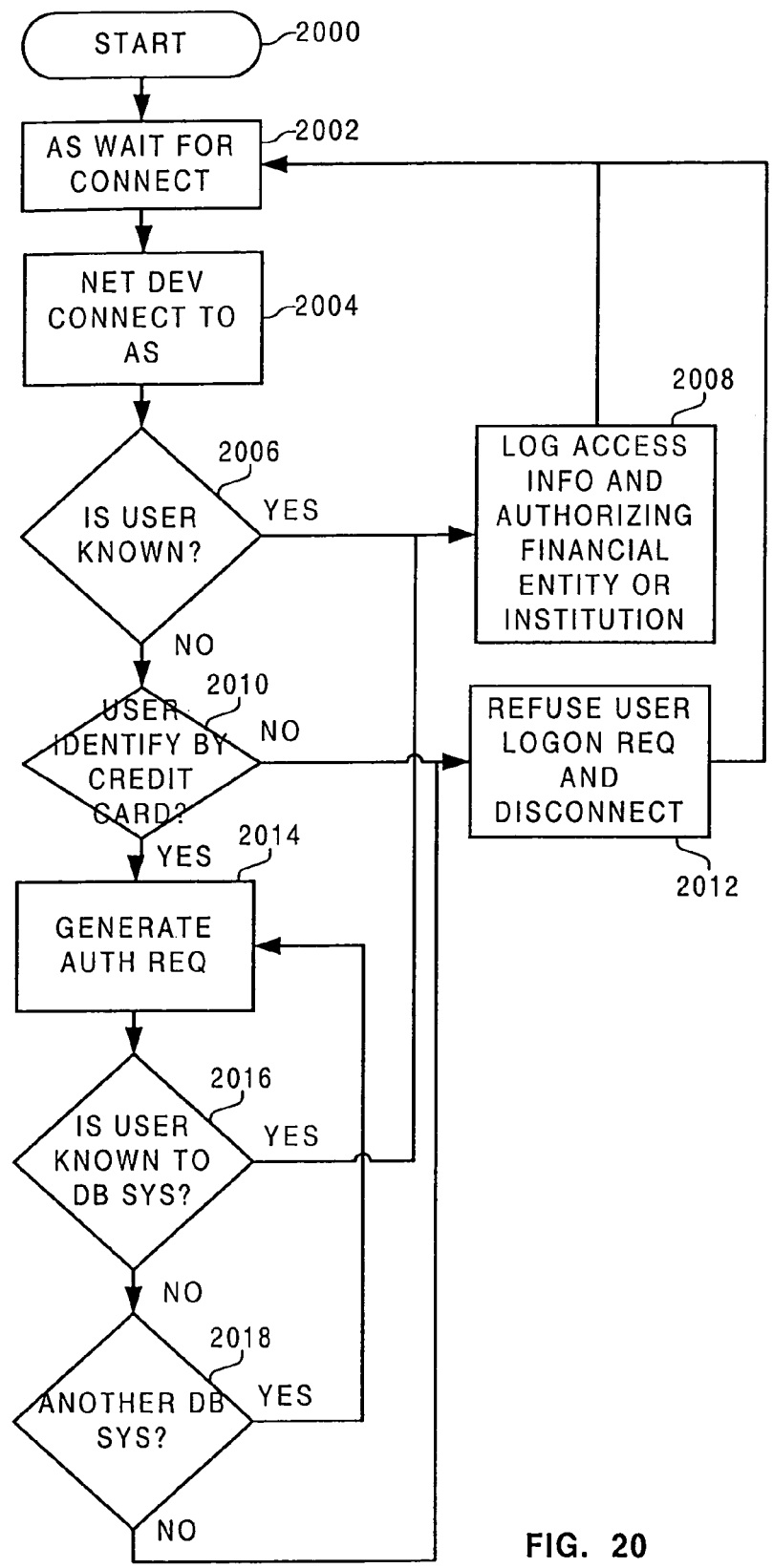
FIG. 20 illustrates a flowchart for bank card access for a connection in an example of the invention.
Figure 21:
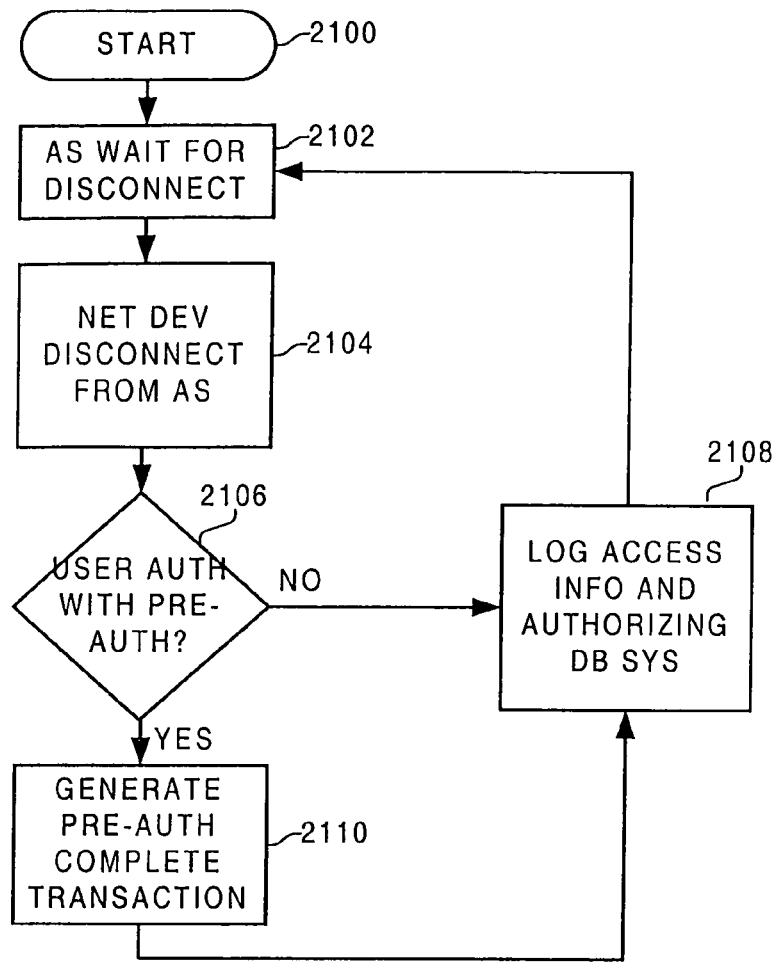
FIG. 21 illustrates a flowchart for network access cards for a disconnection in an example of the invention.

In prior systems, access providers authenticated users using their own databases. FIGS. 5, 20 and 21 disclose one embodiment for bank card access in an example of the invention. In this embodiment, access providers authenticate users through bank card financial networks using the users' credit card numbers. Network providers use credit or debit card numbers as user ID and passwords for authentication and authorization purposes. Users use prepaid cards, phone cards, and credit cards in PSTN. However, no bank cards have been used for access to data networks other than for batch bill payment.

FIG. 20 depicts a flowchart for bank card access for a connection in an example of the invention. FIG. 20 begins in step 2000. In step 2002, the access server 524 waits for a connection. The network device 512 connects to the access server 524 in step 2004. Once a connection is established, the database system 522 generates and transmits a logon query for the network device 512. The network device 512 transmits information identifying a billing code. In this embodiment, the information identifying a billing code is a response including credit card numbers to the logon query. In other embodiments, the billing code is retrieved from the user access profile. The access server 524 then transfers the response from the network device 512 to the database system 522. The database system 522 receives and processes the response to see if the user is known in the local database system 570 in step 2006. If the user is known, the database system 522 logs the access information and authorizes to provide access to the user via the access server 524 in step 2008 before returning to step 2002.

If the user is not known, the database system 522 processes the response to check if the user is identified by credit card numbers in step 2010. If the user is not identified by the credit card numbers, the database system 522 transmits an instruction to the access server 524 to refuse the user logon and to disconnect the network device 512 from the access server 524 in step 2012 before returning to step 2002. If the user is identified by the credit card numbers, the database system 522 generates an authorization query as a pre-authorization hold or authorization/capture transaction for the central database system 580 in step 2014. In one embodiment, the central database system 580 uses a financial interface 582 to interface with a financial switch to banks for authentication and authorization. The database system 522 then checks if the user is authenticated and authorized by the central database system 580 in step 2016. If the user is authenticated and authorized, the database system 522 logs access information and an authorizing financial entity or institution in step 2018 before proceeding to step 2008. If the user is not known, the database system 522 checks if there is another database system for authorization such as for foreign user access in step 2018. If there is another database system, the database system 522 returns to step 2014. If there is not another database system, the database system 522 returns to step 2012.

FIG. 21 depicts a flowchart for bank card access for a disconnection in an example of the invention. FIG. 21 begins in step 2100. In step 2102, the access server 524 waits for a disconnection. The network device 512 then disconnects from the access server 524 in step 2104. The access server 524 then checks whether the user was on a pre-authorization hold in step 2106. If the user is not on a pre-authorization hold, the 522 logs access information and an authorizing database system 522 in step 2108 before proceeding to step 2102. If the user is on a pre-authorization hold, the database system 522 generates a pre-authorization complete transaction for the central database system 580 in step 2110 before returning to step 2108.

Access Cards

Figure 22:
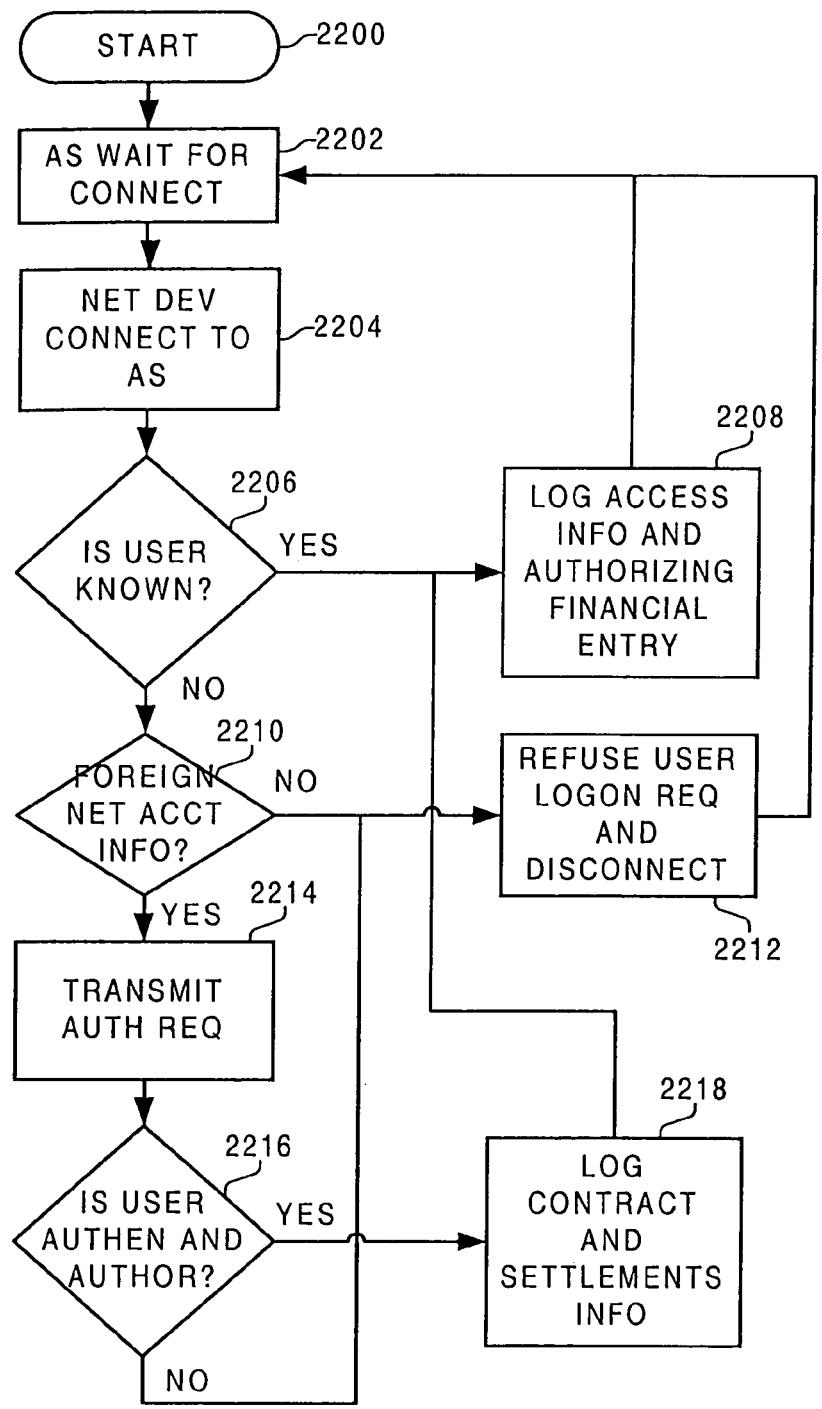
FIG. 22 illustrates a flowchart for network access cards for a connection in an example of the invention.
Figure 23:
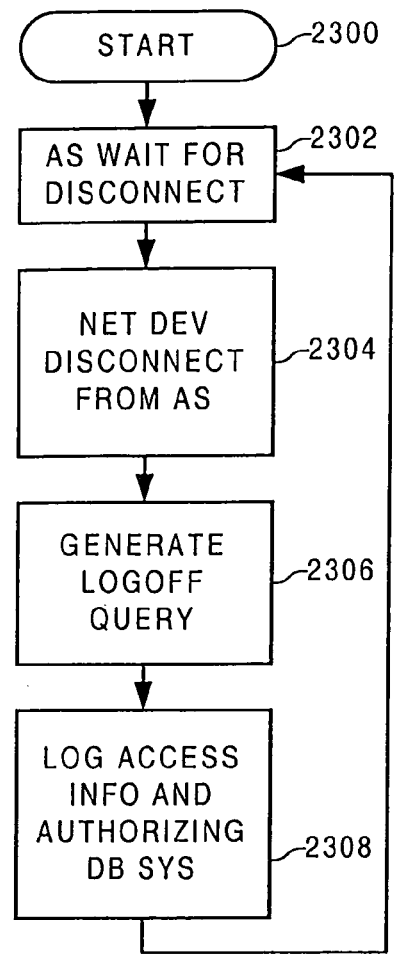
FIG. 23 illustrates a flow chart for network access cards for a disconnection in an example of the invention.

In prior systems, access providers authenticated users using their own databases. FIGS. 5, 22 and 23 disclose one embodiment for network access cards in an example of the invention. An access card is a card that a user uses to access a network. The access card includes an access card account code. The access card account code is any number that relates to the user's access account. In this embodiment, access providers authenticate users who have access cards using other access providers' databases. Access providers then may enter into sharing agreements with other access providers. These sharing agreements allow users to use multiple access providers, which provide the users greater mobility and availability. Users use phone cards in PSTN for phone card access. However, no access cards for data networks have been used.

FIG. 22 depicts a flowchart for network access cards for a connection in an example of the invention. FIG. 22 begins in step 2200. In step 2202, the access server 524 waits for a connection. The network device 512 connects to the access server 524 in step 2204. In another embodiment of the invention, the user calls a toll free number to request access. A service control point is queried to determine where to route the request for access similar to an automatic call distribution (ACD). The request for access is then routed to the access server 524 to establish a connection between the network device 512 and the access server 524.

Once a connection is established, the database system 522 generates and transmits a logon query for the network device 512. The network device 512 transmits a response including the access card account code to the logon query. The access server 524 then transfers the response from the network device 512 to the database system 522. In this embodiment, the database system 522 checks if the user is allowed to use the access network 520 by checking whether the user is known. A user is known when the user is allowed to use the access network 520. For example, a user is known when their user access profile is located within the local database system 570 and their user access profile allows the user to use the access network 520. The database system 522 receives and processes the response including the access card account code to check if the user is known in the local database system 570 in step 2206. If the user is known, the database system 522 logs the access information and authorizes to provide access to the user via the access server 524 in step 2208 before returning to step 2202.

If the user is not known, the database system 522 checks if the response included foreign network account information in step 2210. Foreign network account information is any information that is indicative of an account that is external to local database system 570 that the user is attempting to gain access. If there is no foreign network account information, the database system 522 transmits an instruction to the access server 524 to refuse the user logon and to disconnect the network device 512 from the access server 524 in step 2212 before returning to step 2202.

If there is foreign network account information, the database system 522 identifies the local database system 590 based on the foreign network account information and generates an authorization query for the local database system 590 in step 2214. The database system 522 then checks if the user is authenticated and authorized by the local database system 590 in step 2216. If the user is authenticated and authorized, the database system 522 logs contract and settlements information returned by the local database system 590 or indicated by the database system 522 in relation to local database system 590 in step 2218 before proceeding to step 2208. If the user is not known, the database system 522 proceeds to step 2212. In one embodiment, the local database system 570 uses the user authorization system 575 to check if the user is known in the local database system 570. In one embodiment, the local database system 590 uses the user authentication system 593 for authentication and authorization.

FIG. 23 depicts a flowchart for network access cards for a disconnection in an example of the invention. FIG. 23 begins in step 2300. In step 2302, the access server 524 waits for a disconnection. The network device 512 then disconnects from the access server 524 in step 2304. The access server 524 then generates and transmits a logoff query for the database system 522. The database system 522 then transfers the logoff query to the local database system 570 and the local database system 590. The database system 522 logs the access information and the authorizing database system in step 2308 before returning to step 2302.

Global Authentication

In prior systems, access providers authenticated users using their own databases. FIGS. 5 and 23 disclose one embodiment for global authentication in an example of the invention. In this embodiment, access providers authenticate users using a centralized database. Access providers then may enter into sharing agreements with other access providers. These sharing agreements allow users to use multiple access providers, which provide the users greater mobility. Currently, cellular telephone companies enter into these sharing arrangements for greater coverage. However, this sharing of databases for authentication and authorization has not occurred for data networks.

Figure 24:
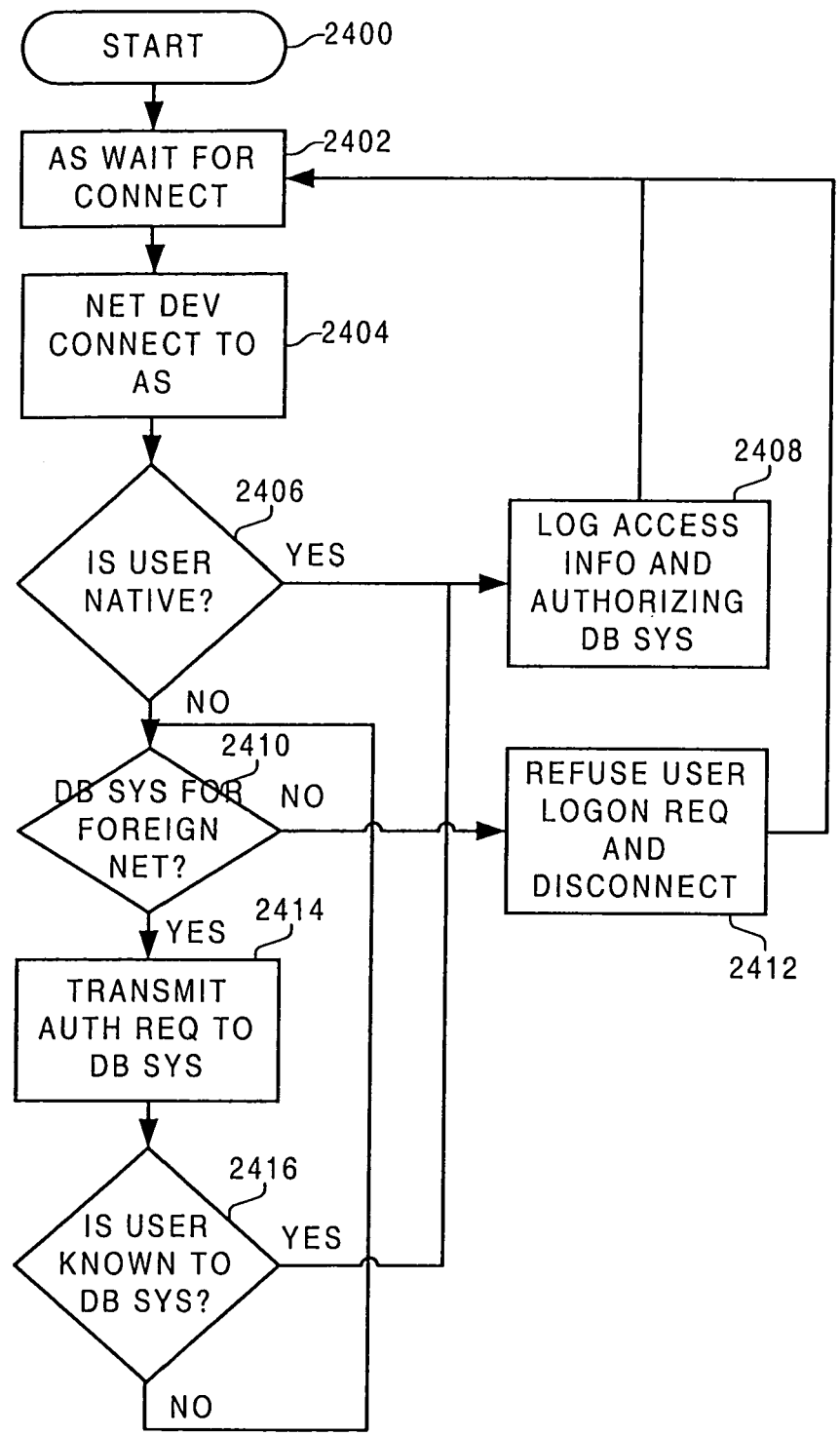
FIG. 24 illustrates a flowchart for global access in an example of the invention.

FIG. 24 depicts a flowchart for global access in an example of the invention. FIG. 24 begins in step 2400. In step 2402, the access server 524 waits for a connection. The network device 512 connects to the access server 524 in step 2404. Once a connection is established, the database system 522 generates and transmits a logon query for the network device 512. The network device 512 transmits a response to the logon query. The access server 524 then transfers the response from the network device 512 to the database system 522. The database system 522 receives and processes the response to see if the user is native in the local database system 570 in step 2406. In this embodiment, the database system 522 checks if the user is allowed to use the access network 520 by checking whether the user is native. A user is native when the user is allowed to use the access network 520. For example, a user is native when their user access profile is located within the local database system 570 and their user access profile allows the user to use the access network 520. If the user is native, the database system 522 logs the access information and authorizes to provide access to the user via the access server 524 in step 4308 before returning to step 2402.

If the user is not native, the database system 522 checks if there is an authentication/authorization server in the database system 522 for a foreign network for user authentication in step 1910. If there is no authentication/authorization server in the database system 522 for the foreign network, the database system 522 transmits an instruction to the access server 524 to refuse the user logon and to disconnect the network device 512 from the access server 524 in step 2412 before returning to step 2402. If there is an authentication/authorization server in the database system 522 for the foreign network, the database system 522 generates an authorization query for the central database system 580 in step 2414. The database system 522 then checks if the user is known in the central database system 580 in step 2414. If the user is known, the database system 522 proceeds to step 2408. If the user is not known, the database system 522 proceeds to step 2410. In one embodiment, the central database system 580 uses a user authorization system 581 to check if the user is known.

Access Network Proxy/Environment—FIGS. 5, 25, 26, 27, 28, 29, 30, and 31

User Based Proxy

A proxy is an application that represents itself as one or more network endpoints. The proxy receives a request for services from a user at a network endpoint and acts on behalf of the user in transmitting and receiving user requests and replies. There are Internet proxy agents that are user network access bind points. However, the Internet proxy agents are not user specific, and they act to protect user interests, not network. These proxy agents provide address translation and basic firewall functionality. Client focused proxies have extended to cookie collection and password handling.

Figure 25:
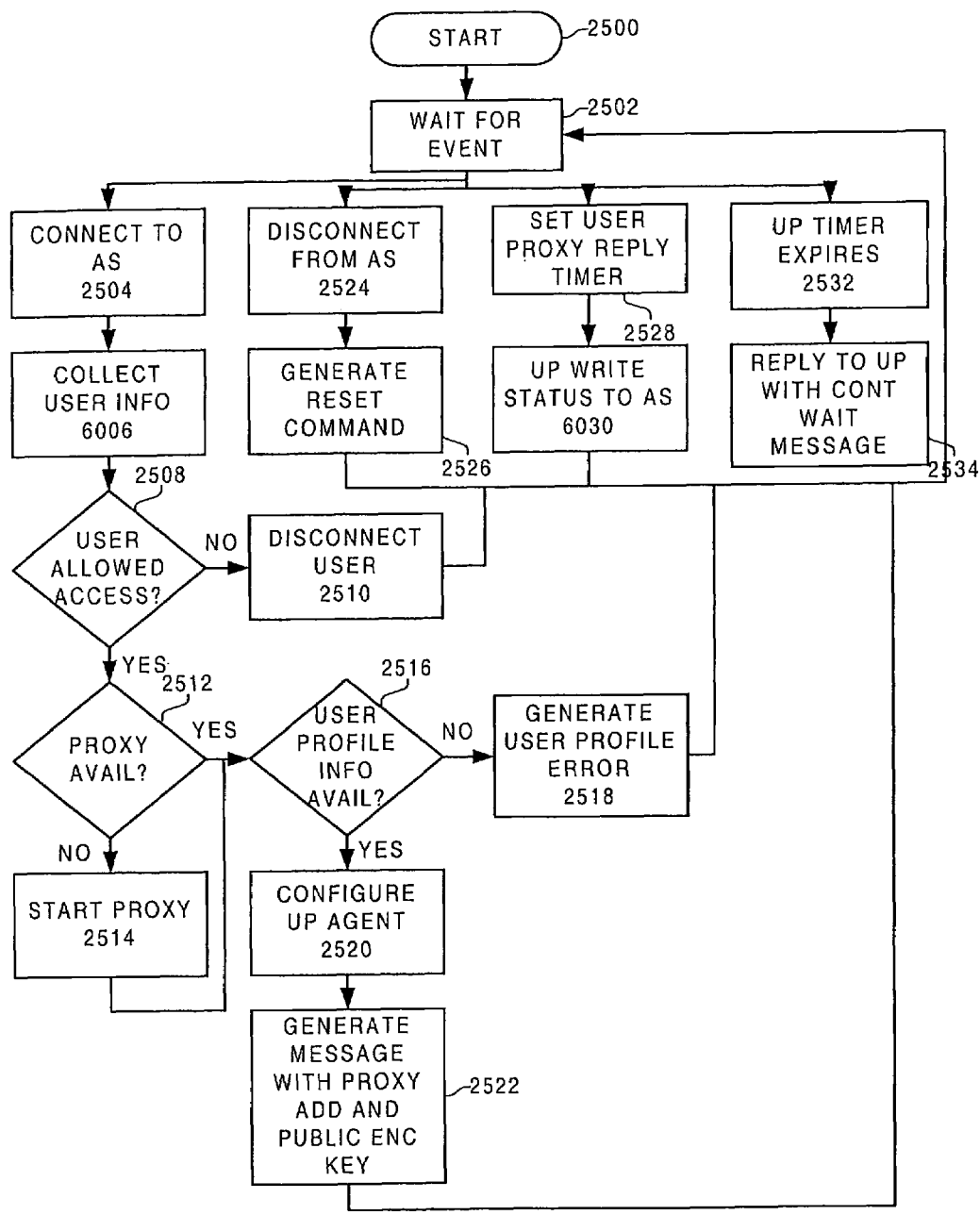
FIG. 25 illustrates a flowchart for an access server for user based proxies in an example of the invention.
Figure 26:
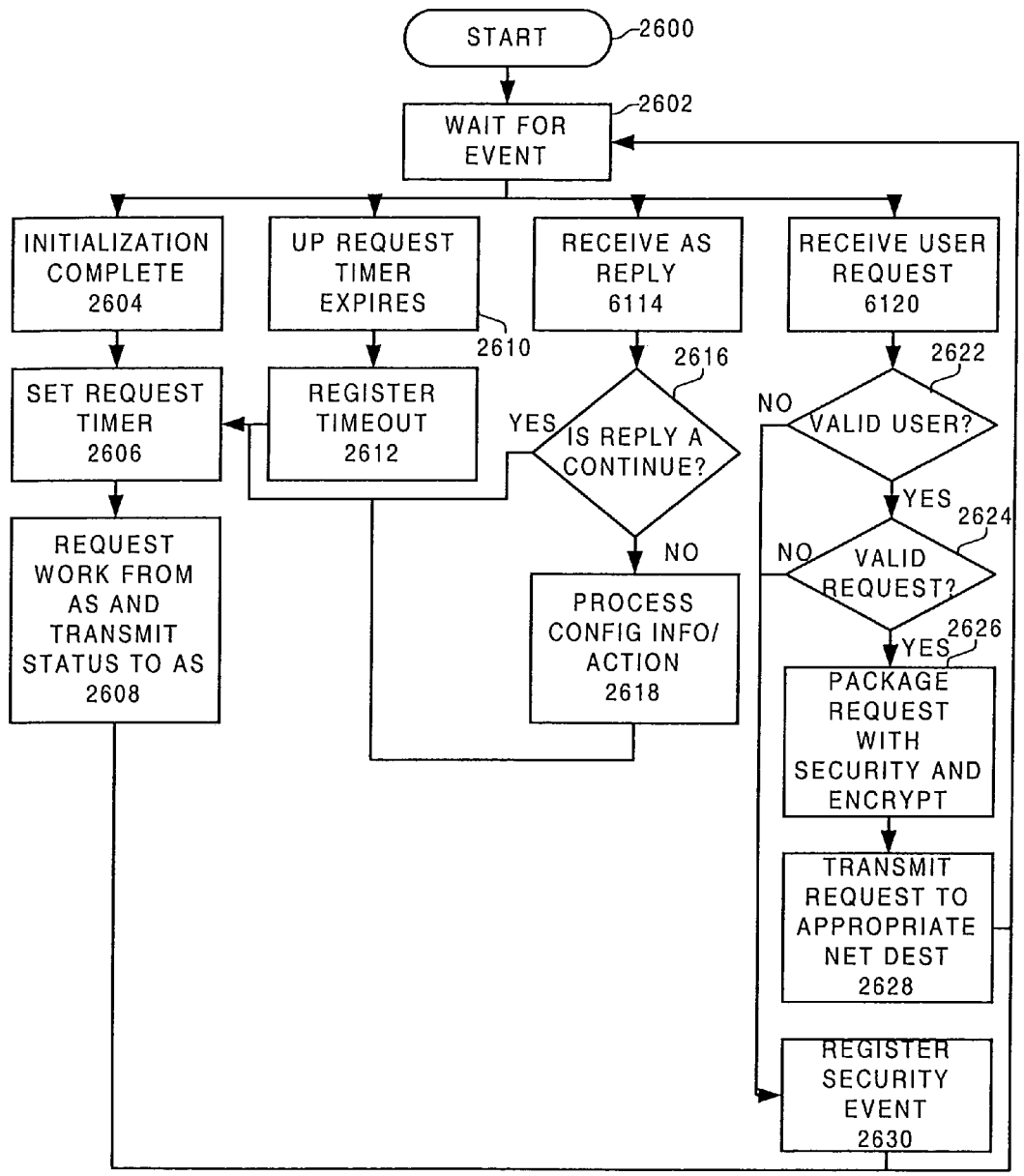
FIG. 26 illustrates a flowchart for a user proxy for user based proxies in an example of the invention.

FIGS. 5, 25 and 26 disclose one embodiment for user based proxies in an example of the invention. The user based proxies obtain information for the user and establishes a user specific network presence. A benefit of having a user specific network presence is that user access is handled by a process owned by a network security certificate authority that prevents Trojan horse network attacks. User based proxy provides a single control and monitor point for a user. The user proxy agents provides a bind point for all user specific access such as user profile functionality, translations, security, and caching.

FIG. 25 depicts a flowchart for the access server 524 for user based proxies in an example of the invention. FIG. 25 begins in step 2500. In step 2502, the access server 524 waits for the next event. If the next event is a connection, the network device 512 connects with the access server 524 in step 2504. In step 2506, the access server 524 then collects user information and transfers the user information to the database system 522 to perform the security. In one embodiment, the database system 522 uses a security server 576 to perform the security. The access server 524 then checks if the user is allowed access in step 2508. If the user is not allowed access, the access server 524 disconnects the user in step 2510 before returning to step 2502.

If the user is allowed access, the access server 524 checks if a proxy is available in the database system 522 in step 2512. In one embodiment of the invention, the user proxies are in the host system 575. If the proxy is available, the access server 524 proceeds to step 2516. If the proxy is not available, the access server 524 starts the proxy in the database system 522 in step 2514 before proceeding to step 2516.

The access server 524 checks if the user access profile information is available in step 2516. If the user access profile information is not available, the access server 524 generates and transmits a user profile error to the network device 512 in step 2518 before returning to step 2502. If the user profile information is available, the access server 524 configures the proxy for the user in step 2520. The access server 524 then generates and transmits a message with the address of the user proxy and the public encryption key to the network device 512 in step 2522. The access server 524 also collects and transmits the access address of the network device 512 and the public encryption key to the user proxy. The access server 524 then returns to step 2502.

If the next event is a disconnection, the network device 512 disconnects with the access server in step 2524. The access server 524 then generates and transmits a reset command to the user proxy to clear the proxy state information and configuration in step 2526 before returning to step 2502. If the next event is a status/request event from the user proxy, the access server 524 sets a user proxy reply timer in step 2528. The user proxy has written a status to the access server 524, and the user proxy receives a reply in step

2530 before returning to step 2502. If the next event is a timer expiration, the access server 524 receives the user proxy reply timer expiration in step 2532. The access server 524 then generates and transmits a continue wait message and status to the user proxy in step 2534 before returning to step 2528.

FIG. 26 depicts a flowchart for a user proxy for user based proxies in an example of the invention. FIG. 26 begins in step 2600. In step 2602, the user proxy waits for the next event. If the next event is the completion of the initialization, the user proxy checks if the initialization is complete in step 2604. The user proxy then sets a request timer in step 2606. The user proxy then request work from the access server 524 and transmits a status to the access server 524 in step 2608 before returning to step 2602. If the next event is the expiration of the request timer, the user proxy checks if the request timer expired in step 2610. The user proxy then registers a timeout in step 2612 before returning to step 2606.

If the next event is an access server 524 reply, the user proxy receives the access server 524 reply in step 2614. The user proxy then checks if the reply is a continue in step 2616. If the reply is a continue, the user proxy returns to step 2606. If the reply is not a continue, the user proxy processes the configuration information or action in step 2618 before returning to step 2606. If the next event is user request, the user proxy receives the user request for service in step 2620. The user proxy then checks if the user is valid in step 2622. If the user is valid, the user proxy then checks if the request is valid in step 2624. If the request is valid, the user proxy packages the request with the security certification and encryption in step 2626. The user proxy then transmits the request to the appropriate network destination in step 2628 before returning to step 2602. If the user or request is not valid, the user proxy registers a security event in step 2630 before returning to step 2602. The user proxy exchanges user information between the user network 510 and the appropriate network destination.

Subscriber Based Proxy

Figure 27:
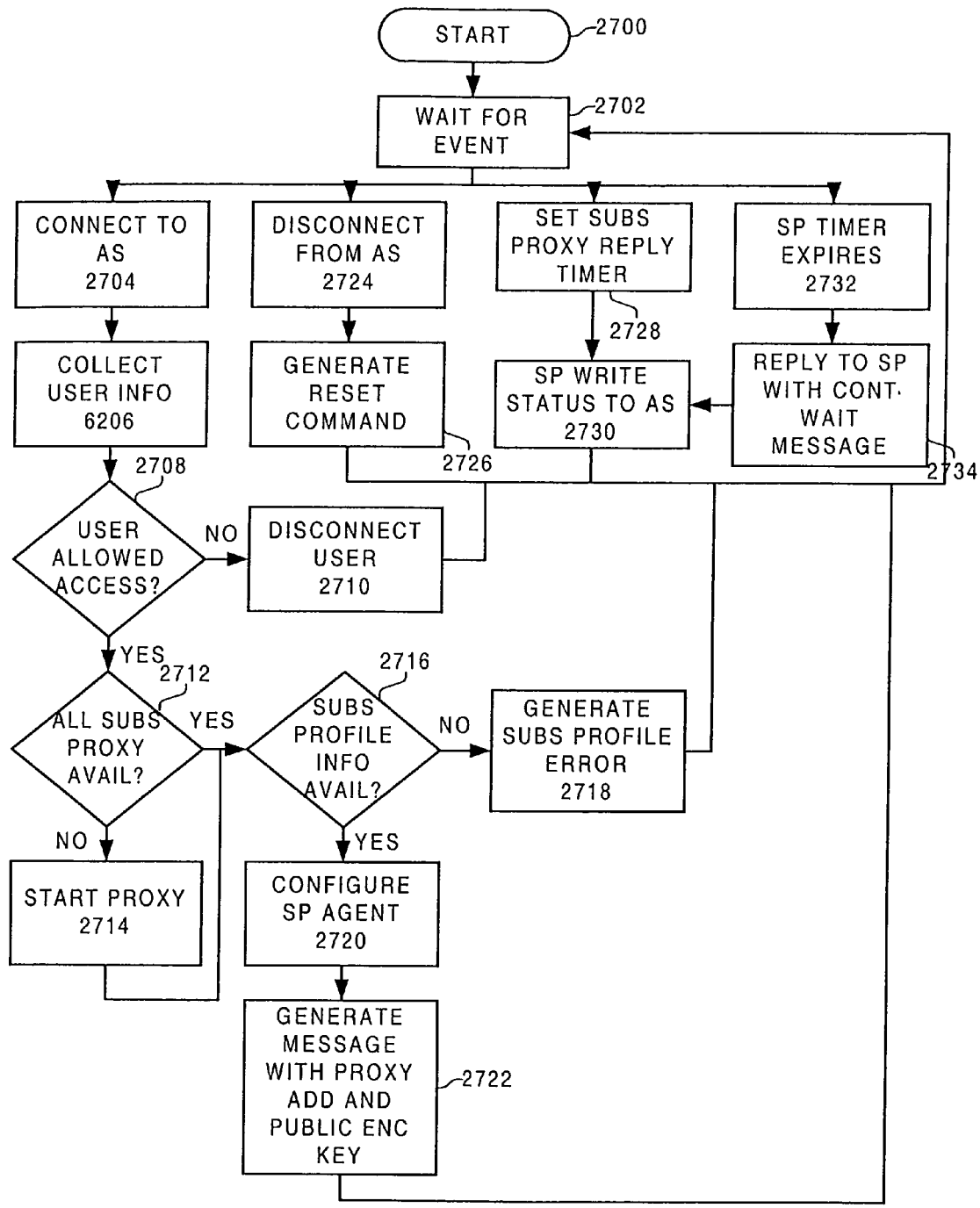
FIG. 27 illustrates a flowchart for an access server for subscriber based proxies in an example of the invention.
Figure 28:
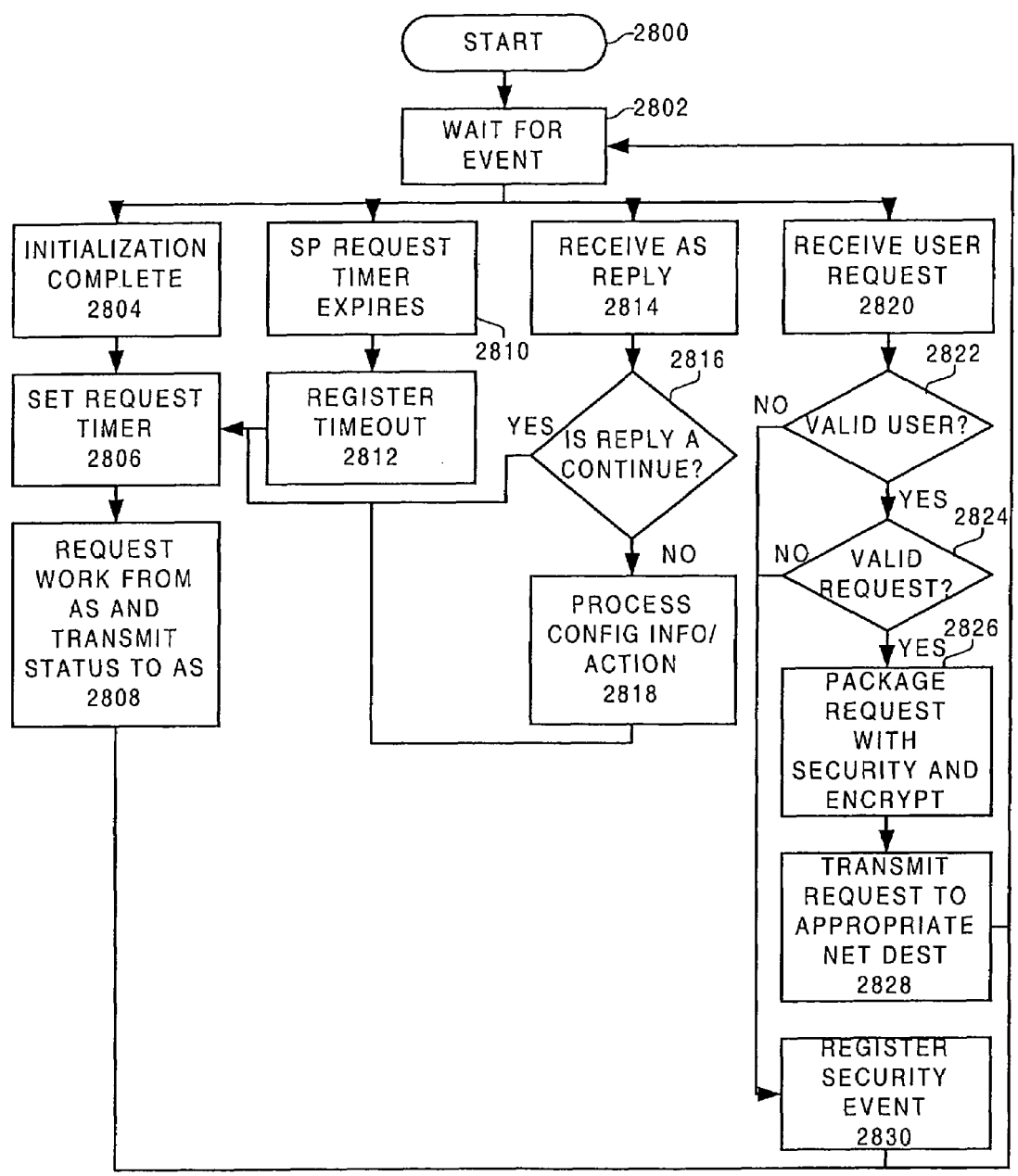
FIG. 28 illustrates a flowchart for a subscriber proxy for subscriber based proxies in an example of the invention.

Another type of proxy is a subscriber based proxy. A subscriber is a logical entity such as an organization, corporation, or other grouping of users that has subscribed to services with a service provider. FIGS. 5, 27 and 28 disclose one embodiment for subscriber based proxies in an example of the invention. The subscriber based proxies obtain information for a user of a subscriber group and establishes a subscriber specific network presence. The benefit of having a subscriber specific network presence is that user access rights of the subscriber can be handled as a group, and group rights are owned by a network security certificate authority. The subscriber proxy agents provide a bind point for all subscriber specific access such as user profile functionality, translations, security, and caching.

FIG. 27 depicts a flowchart for the access server 524 for subscriber based proxies in an example of the invention. FIG. 27 begins in step 2700. In step 2702, the access server 524 waits for the next event. If the next event is a connection, the network device 512 connects with the access server 524 in step 2704. In step 2706, the access server 524 then collects user information and transfers the user information to the database system 522 to perform the security. In one embodiment, the database system 522 uses a security server 574 to perform the security. The access server 524 then checks if the user is allowed access in step 2708. If the user is not allowed access, the access server 524 disconnects the user in step 2710 before returning to step 2702. If the user is allowed access, the access server 524 checks if all required subscriber proxies are available in the database system 522 in step 2712. In one embodiment of the invention, the subscriber proxies are in the host system 575. If the proxies are available, the access server 524 proceeds to step 2716. If the proxies are not available, the access server 524 starts the required proxies in the database system 522 in step 2714 before proceeding to step 2716.

In step 2716, the access server 524 checks if the subscriber access profile information is available. If the subscriber access profile information is not available, the access server 524 generates and transmits a subscriber profile error to the network device 512 in step 2718 before returning to step 2702. If the subscriber profile information is available, the access server 524 configures the subscriber proxies for the subscriber in step 2720. The access server 524 then generates and transmits a message with the address of the subscriber proxy and the public encryption key to the network device 512 in step 6222. The access server 524 also collects and transmits the access address of the network device 512 and the public encryption key to the subscriber proxies. The access server 524 then returns to step 2702.

If the next event is a disconnection, the network device 512 disconnects with the access server in step 2724. The access server 524 then generates and transmits a reset command to the subscriber proxy in step 2726 before returning to step 2702. If the next event is a status/request event from the subscriber proxy, the access server 524 sets a subscriber proxy reply timer in step 2728. In step 2730, the subscriber proxy has written a status to the access server 524, and the subscriber proxy receives a reply before returning to step 2702. If the next event is a subscriber proxy timer expiration, the access server 524 receives the subscriber proxy reply timer expiration in step 2732. The access server 524 then generates and transmits a continue wait message and a status to the subscriber proxy in step 2734 before returning to step 2730.

FIG. 28 depicts a flowchart for a subscriber proxy for subscriber based proxies in an example of the invention. FIG. 28 begins in step 2800. In step 2802, the subscriber proxy waits for the next event. If the next event is the completion of the initialization, the subscriber proxy checks if the initialization is complete in step 2804. The subscriber proxy then sets a request timer in step 2806. The subscriber proxy then request work from the access server 524 and transmits a status to the access server 524 in step 2808 before returning to step 2802. If the next event is the expiration of the request timer, the subscriber proxy checks if the request timer expired in step 2810. The subscriber proxy then registers a timeout in step 2812 before returning to step 2806.

If the next event is an access server 524 reply, the subscriber proxy receives the access server 524 reply in step 2814. The subscriber proxy then checks if the reply is a continue in step 2816. If the reply is a continue, the subscriber proxy returns to step 2806. If the reply is not a continue, the subscriber proxy processes the configuration information or action in step 2818 before returning to step 2806. If the next event is a user request for service, the subscriber proxy receives the user request in step 2820. The subscriber proxy then checks if the user is valid in step 2822. If the user is valid, the subscriber proxy then checks if the request is valid in step 2824. If the request is valid, the subscriber proxy packages the request with the security certification and encryption in step 2826. The subscriber proxy then transmits the request to the appropriate network destination in step 2828 before returning to step 2802. If the user or request is not valid, the subscriber proxy registers a security event in step 2830 before returning to step 2802. The subscriber proxy exchanges user information between the user network 510 and the appropriate network destination.

Dynamic Proxies

Figure 29:
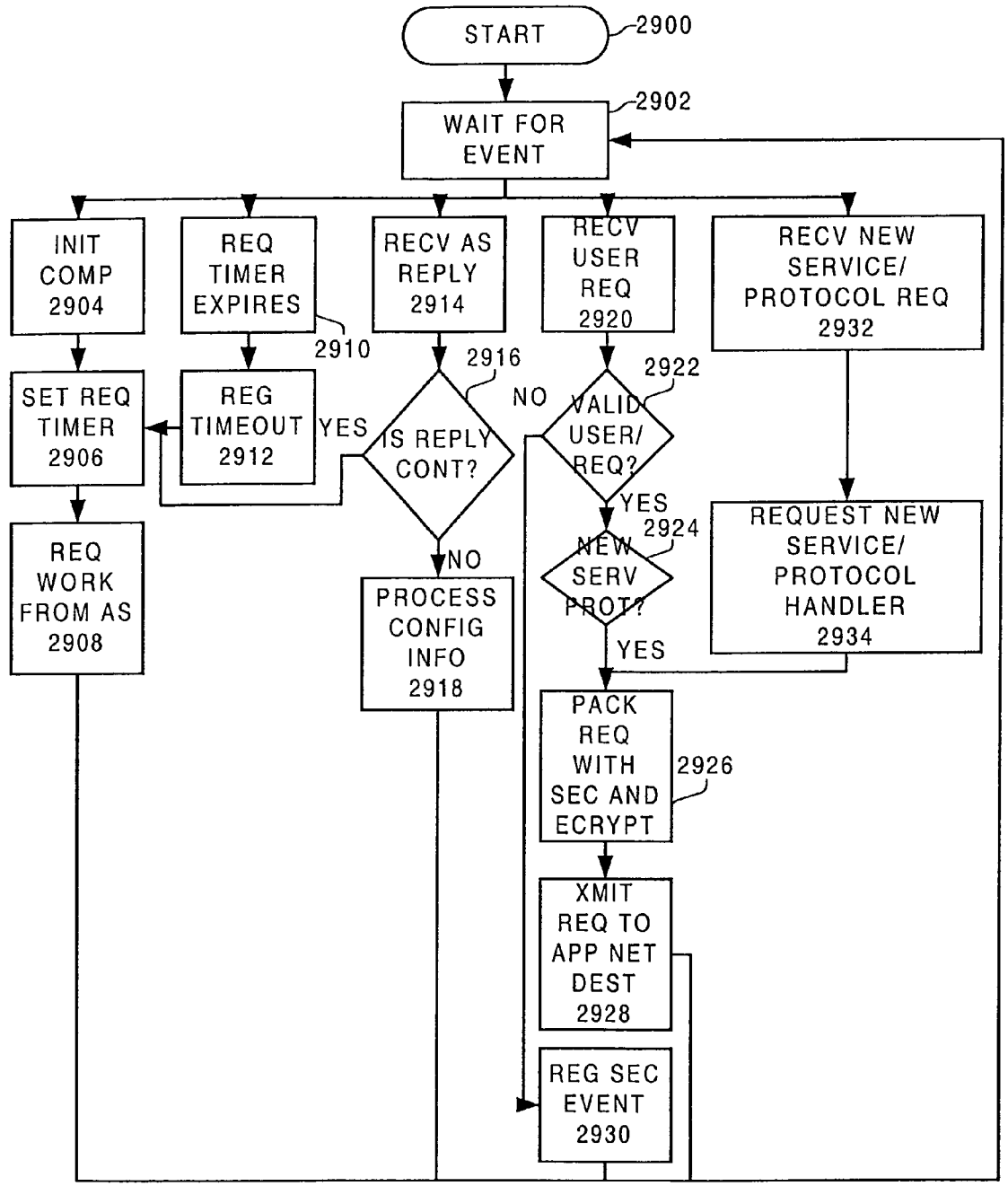
FIG. 29 illustrates a flowchart for a dynamic proxy for dynamic proxies in an example of the invention.

One prior system named "pluxy" allows a manual extension of a proxy. Pluxy requires manual determination and loading of a dynamic set of services, which is done on an operator basis. FIGS. 5 and 29 disclose one embodiment for dynamic proxies in an example of the invention. In this embodiment, both the user based proxies and the subscriber based proxies are extended in response to user actions. The dynamic proxy can be modified and enhanced to evolve with new services and/or protocols. The dynamic proxy size is smaller and more efficient by supporting only the logic that is being used. Implementation and development times of new service and protocol are also reduced because new proxies are not required with the new service and/or protocol.

FIG. 29 depicts a flowchart for a dynamic proxy for dynamic proxies in an example of the invention. FIG. 29 begins in step 2900. In step 2902, the dynamic proxy waits for the next event. If the next event is the completion of the initialization, the dynamic proxy checks if the initialization is complete in step 2904. The dynamic proxy then sets a request timer in step 2906. The dynamic proxy then request work from the access server 524 in step 2908 before returning to step 2902. If the next event is the expiration of the request timer, the dynamic proxy checks if the request timer expired in step 2910. The dynamic proxy then registers a timeout in step 2912 before returning to step 2906.

If the next event is an access server 524 reply, the dynamic proxy receives the access server 524 reply in step 2914. The dynamic proxy then checks if the reply is a continue in step 2916. If the reply is a continue, the dynamic proxy returns to step 2906. If the reply is not a continue, the dynamic proxy processes the configuration information in step 2918 before returning to step 2902. If the next event is a user request, the dynamic proxy receives the user request in step 2920. The dynamic proxy then checks if the user and the request are valid in step 2922. If the user and the request are valid, the dynamic proxy checks if there is a new service or protocol requested in step 2924. If there is a new service or protocol, the dynamic proxy proceeds to step 2934. If there is not a new service or protocol, the dynamic proxy packages the request with the security certification and encryption in step 2926. The dynamic proxy then transmits the request to the appropriate network destination in step 2928 before returning to step 2902. If the user or request is not valid, the subscriber proxy registers a security event in step 2930 before returning to step 2902.

If the next event is a new service/protocol request, the dynamic proxy receives the new service/protocol request in step 2932. In step 2934, the dynamic proxy processes the new service/protocol request to generate a handler request for a new service/protocol handler in step 2934 before returning to step 2926. The dynamic proxy receives the handler and executes the handler for the new service or proxy. In one embodiment, the dynamic proxy is enhanced by loading applet-like extensions from a handler system similar to a web browser.

Access Execution Environment

Proxy servers in the Internet represents a user in one network as existing in another network to obtain services for the user. One problem with Internet proxy servers is the absence of the management of network resource utilization. In TINA-C, the User Agent and the User Session Manager are restricted to known service binding because any new service requires knowledge of or logic for a new CORBA interface. One problem with TINA-C is the absence of any provider resource management capabilities. Unfortunately, both Internet proxy servers and TINA-C do not provide any means of associating or viewing all network resources used by a user access session. Another problem is the lack of securing provider network resource against tampering by accessing users. Also, Internet proxy servers and TINA-C do not provide a platform-supported means of enforcing security levels on network access users. Both system also lack a validation of potential execution capability extensions.

Figure 30:
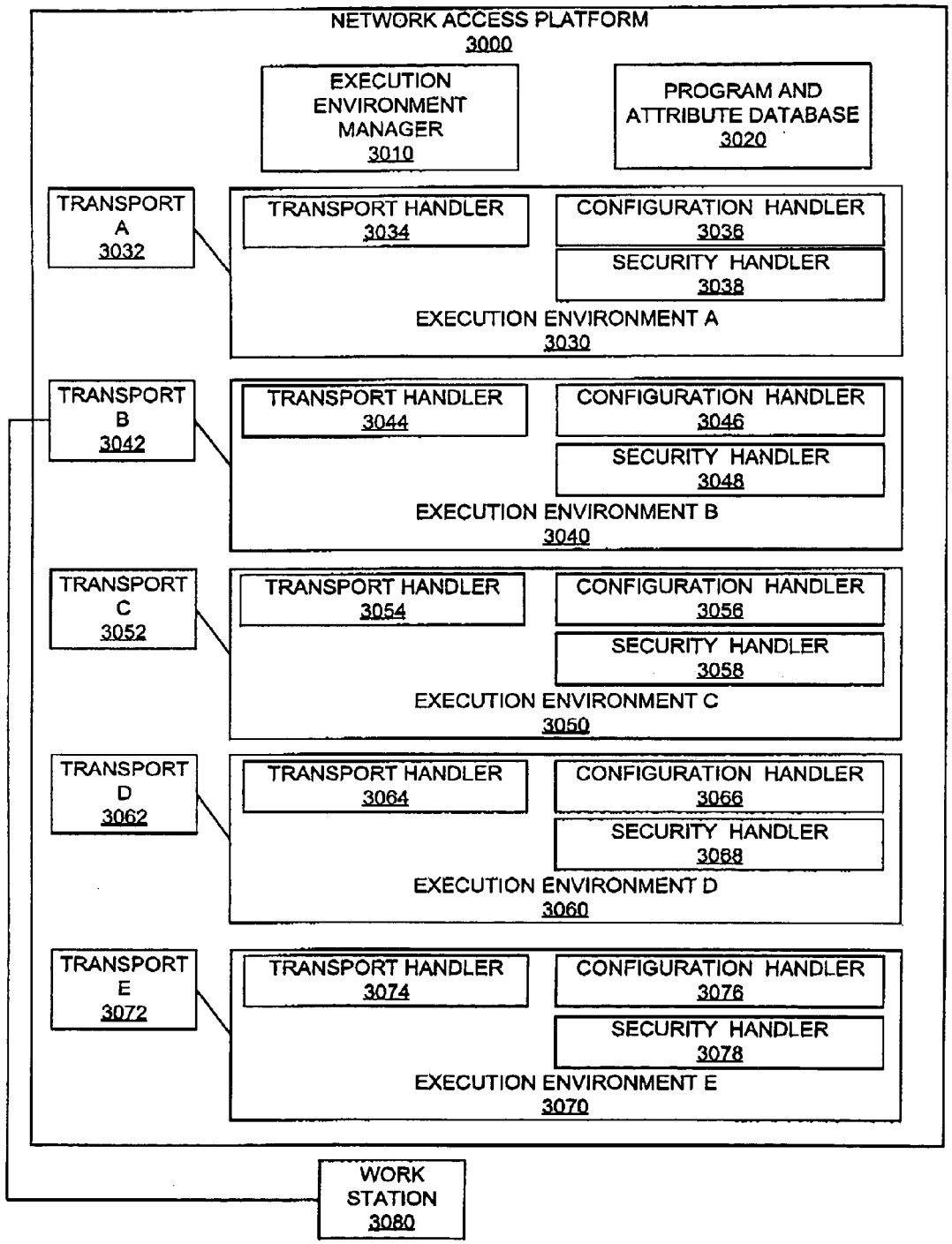
FIG. 30 illustrates a block diagram of the access execution environment in an example of the invention.
Figure 31:
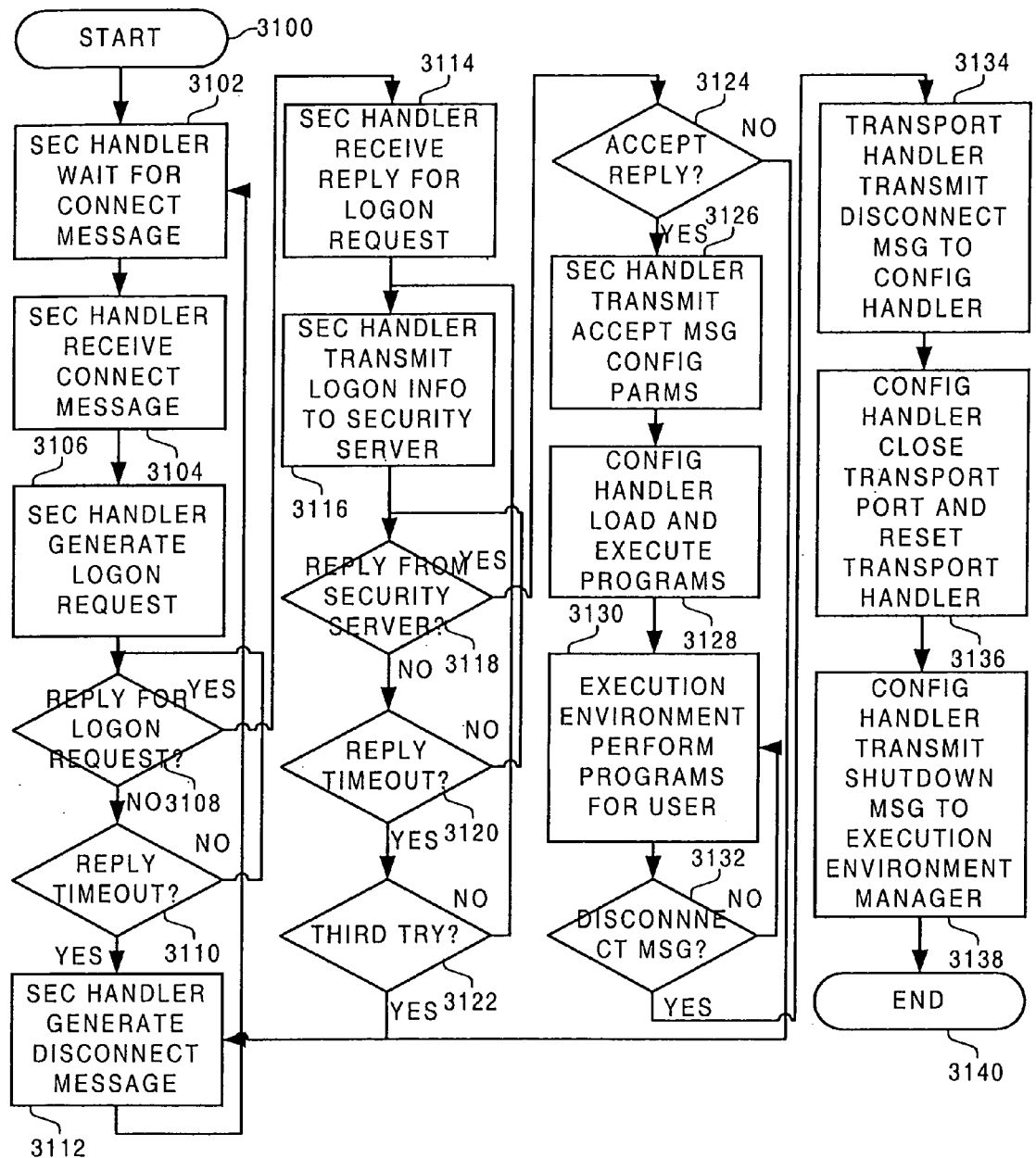
FIG. 31 illustrates a flow chart for the access execution environment in an example of the invention.

FIGS. 5, 30, and 31 disclose one embodiment for an access execution environment in an example of the invention. The access execution environment easily and efficiently manages and secures network access by providing an execution environment in the access provider environment. Users access shared services and resources through their specific access execution environment. Because the access execution environment is in the access provider environment, the access provider can view the all of the user's activity by observing the execution environment. In this embodiment, the execution environment is setup as a standard system user on the network access platform, which allows management of the system user by operating system level user resource controls, quotas, and management mechanisms.

The access execution environment includes a multi-tasking virtual machine, a script interpreter, alias resolution capabilities, security certificate authentication, configuration handler, session caching, and protocol handling components. FIG. 30 depicts a block diagram of the access execution environment in an example of the invention. In FIG. 30, a network access platform 3000 comprises an execution environment manager 3010, a program and attribute database 3020, an execution environment A 3030, a transport A 3032, an execution environment B 3040, a transport B 3042, an execution environment C 3050, a transport C 3052, an execution environment D 3060, a transport D 3062, an execution environment E 3070, and a transport E 3072. In one embodiment, the network access platform 3000 is included within the database system 522. In another embodiment, the network access platform is included within the host system 575. The transport A 3032 is connected to the execution environment A 3030. The transport B 3042 is connected to the execution environment A 3040 and a workstation 3080. The transport C 3052 is connected to the execution environment C 3050. The transport D 3062 is connected to the execution environment D 3060. The transport E 3072 is connected to the execution environment E 3070. The execution environment A 3030 includes a transport handler 3034, a configuration handler 3036, and a security handler 3038. The execution environment B 3040 includes a transport handler 3044, a configuration handler 3046, and a security handler 3048. The execution environment C 3050 includes a transport handler 3054, a configuration handler 3056, and a security handler 3058. The execution environment D 3060 includes a transport handler 3064, a configuration handler 3066, and a security handler 3068. The execution environment E 3070 includes a transport handler 3074, a configuration handler 3076, and a security handler 3078.

In operation, a system administrator sets up a number of network access user accounts on the hardware platform. The administrator then sets up resource limits for each account/ platform resource. The administrator then starts an execution environment 3030, 3040, 3050, 3060, and 3070 for each access user account ID. The execution environment A 3030 initializes and loads a configuration handler 3036. The execution environment A 3030 then loads the security handler 3038 and the transport handler 3034. The transport handler 3034 opens a logical or physical transport port A 3032 on the hardware platform using port information from the configuration handler.

FIG. 31 depicts a flow chart for the access execution environment in an example of the invention. FIG. 31 begins in step 3100. In step 3102, the security handler 3038 waits for a connect message from the transport handler 3034. The security handler 3038 then receives the connect message from the transport handler 3034 in step 3104. The security handler 3038 then generates and transmits a logon request via the transport handler 3034 in step 3106. The security handler 3038 then checks if a reply for the logon request from the transport handler 3034 has been received in step 3108. If the reply for the logon request has not been received, the security handler 3038 checks if a reply timeout has occurred in step 3110. If a reply timeout has not occurred, the security handler 3038 returns to step 3108. If a reply timeout has occurred, the security handler 3038 generates and transmits a disconnect message to the transport handler 3034 in step 3112 and returns to step 3102 to wait for a connect message.

In step 3114, the security handler 3038 receives the reply for the logon request. Then the security handler 3038 retrieves the location of a security server from the configuration handler 3036 and transmits the logon information to the security server in step 3116. The security handler 3038 then checks if a reply to the logon information from the security server has been received in step 3118. If no reply has been received, the security handler 3038 checks if a reply timeout has occurred in step 3120. If a reply timeout has not occurred, the security handler 3038 returns to step 3118. If a reply timeout has occurred, the security handler 3038 checks if the logon information has been sent three times in step 3122. The number of tries could be configurable. If the logon information has not been sent three times, the security handler 3038 returns to step 3116 to transmit the logon information. If the logon information has been sent three times, the security handler 3038 returns to step 3112 to send a disconnect message.

If the security server replied before the reply timeout, the security handler 3038 checks if the reply is an accept message in step 3124. If the reply is a decline message, the security handler 3038 returns to step 3112. If the reply is an accept message, the security handler 3038 transmits the accept message configuration parameters to the configuration handler 3036 in step 3126. The configuration handler 3036 then loads attributes and programs and executes programs specified by the security server reply in step 3128. The execution environment A 3030 performs the execution of programs for the user in step 3130. In another embodiment, the programs request attributes and/or programs to be loaded and/or executed. The programs include the ability to interface with users via the transport handler and load/execute other programs required by request types.

The configuration handler 3036 then checks if the transport handler 3034 receives a disconnect message in step 3132. If the transport handler 3034 has not received a disconnect message, the configuration handler 3036 returns to step 3130. If the transport handler 3034 has received a disconnect message, the transport handler 3034 transmits the disconnect message to the configuration handler 3036 in step 3134. In step 3136, the configuration handler 6536 based on port configuration attributes closes the transport port 3032, resets the transport handler 3034, and notifies the execution environment manager 3010 to create a new execution environment for that port. The configuration handler 3036 gracefully shuts down all handlers, programs, and eventually the execution environment A 3030. The configuration handler 3036 transmits a shutdown message to the execution environment manager 3010 in step 3138 before terminating in step 3140. The execution environment manager 3010 restarts the execution environment A 3030 upon notification of the shutdown. The operations of the other execution environments 3040, 3050, 3060, and 3070 perform in the same manner as the execution environment A 3030 and are not discussed for the sake of clarity.

Access Network Translations—FIGS. 5, 32, 33, 34, 35, 36, 37, 38, and 39

Domain Name Scoping

The typing in of domain names such as www.nypostoline.com is quite cumbersome for the user to access specific services. The Domain Name Server (DNS) translates the domain name to a network address for the service. Clicking on bookmarks or favorites in browsers, which reference the domain names, does eliminate the need to type in the domain names. However, when users change network devices, these bookmarks or favorites do not follow the user. In an operating system environment, the command interpreter shell allows the user to customize interpretation of command strings. If no customization is loaded, the command interpreters interprets in a default fashion.

Figure 32:
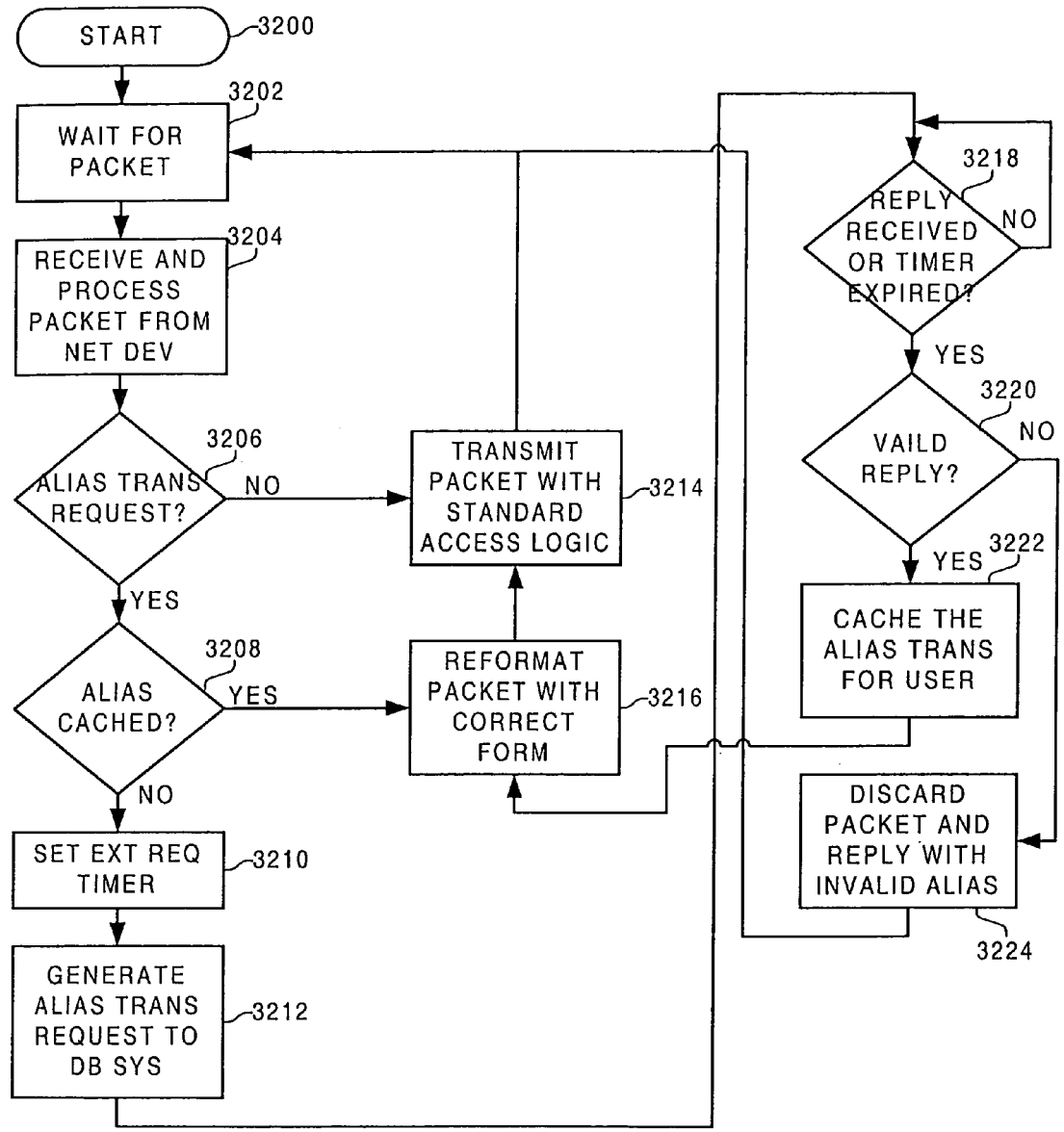
FIG. 32 illustrates a flowchart for an access server for domain name scoping in an example of the invention.
Figure 33:
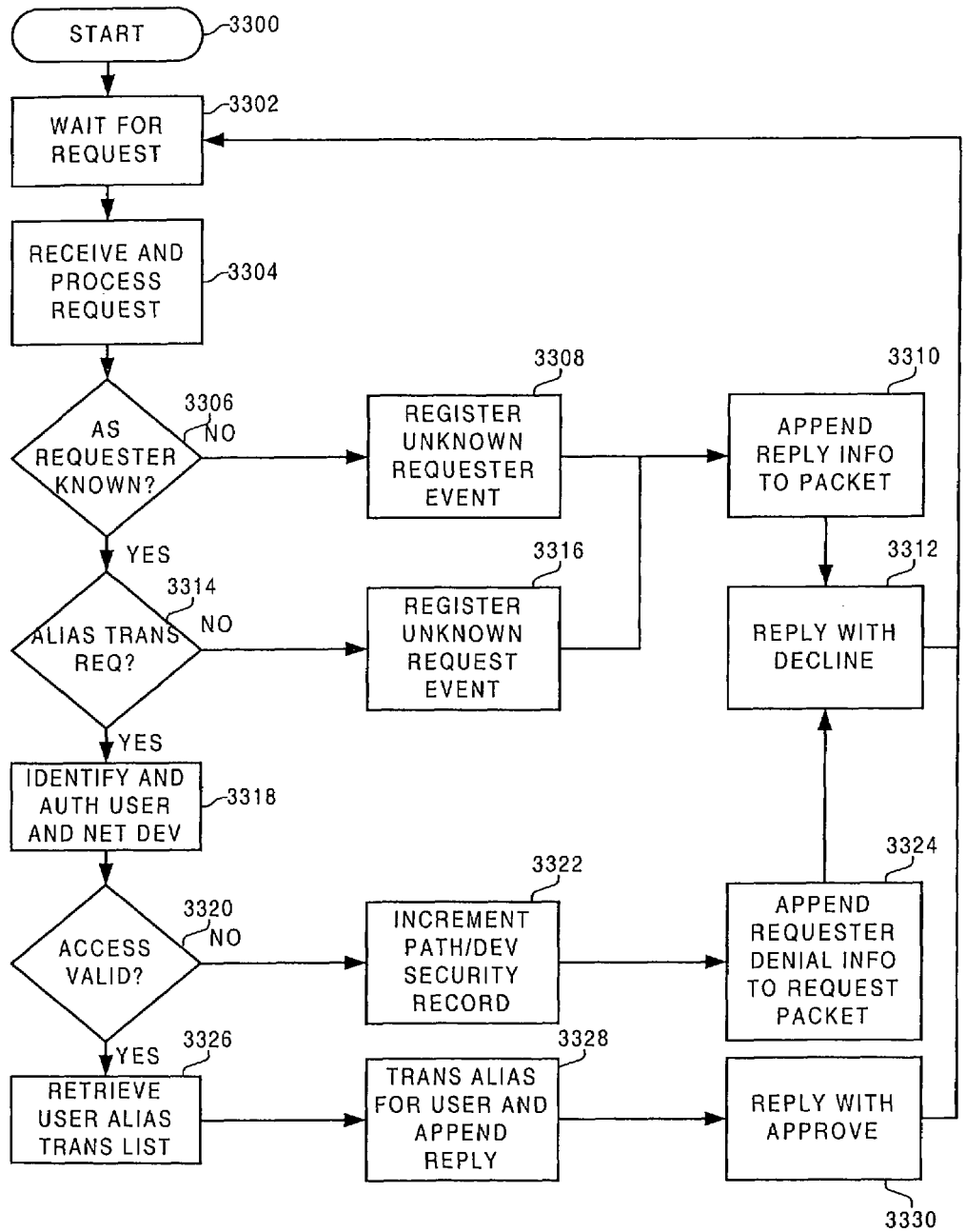
FIG. 33 illustrates a flowchart for a database system for domain name scoping in an example of the invention.

FIGS. 5, 32, and 33 disclose one embodiment for domain name scoping in an example of the invention. This embodiment provides a customizable network shell to overlay the standard DNS service offered in Internet Protocol based networks. Users then are able to define user specific acronyms or aliases for specific or logical services. An acronym or alias indicates domain names, macros, programs, actions, or network addresses. If the translation for the alias does not exist in the list of aliases for the user, the access server 524 checks if the alias exists in the list for a group in which the user belongs. The access server 524 then checks if the alias exist in the DNS for the general network. In another embodiment, the database system 522 checks the existence of the alias in the list for the group and in the DNS for the general network. There are numerous variations in the hierarchy for searching for an alias but are not discussed for the sake of simplicity.

FIG. 32 depicts a flowchart for the access server 524 for domain name scoping in an example of the invention. FIG. 32 begins in step 3200. In step 3202, the access server 524 waits for a packet. In this embodiment, the access server 524 receives information in the form of packets from the network device 512. The access server 524 then receives and processes the packet from the network device 512 in step 3204. The access server 524 then checks if the packet is an alias translation request in step 3206. If the packet is not an alias translation request, the access server 524 transmits the packet with standard access logic in step 3214 before returning to step 3202.

If the packet is an alias translation request, the access server 524 then checks if the alias translation is cached for the user in step 3208. If the alias translation is cached, the access server 524 reformats the packet using the cached alias translation in step 3216 before returning to step 3214. If the alias translation is not cached, the access server 524 sets an external request timer in step 3210. The access server 524 then generates and transmits an alias translation request to the database system 522 in step 3212. The alias translation request is any message, instruction, or signaling indicative of requesting an alias translation. The access server 524 checks whether a reply has been received or the external request timer has expired in step 3218. If a reply has not been received and the external request timer has not expired, the access server 524 returns to step 3218.

If a reply has been received or the external request timer has expired, the access server 524 checks if the reply was valid in step 3220. If the reply is invalid, the access server 524 discards the packet and replies with an invalid alias message or alias error message to the network device 512 before returning to step 3202. If the reply is valid, the access server 524 caches the alias translation for the user in step 3222 before returning to step 3216.

FIG. 33 depicts a flowchart for the database system 522 for domain name scoping in an example of the invention. FIG. 33 begins in step 3300. In step 3302, the database system 522 waits for a request. The database system 522 then receives and processes the request from the access server 524 in step 3304. In step 3306, the database system 522 then checks if the access server requester is known in step 3306. If the access server requester is not known, the database system 522 then registers an unknown requester event in step 3308. The database system 522 appends the reply information to the packet in step 3310. The database system 522 replies with a decline message to the access server 524 in step 3312 before returning to step 3302.

If the access server requester is known, the database system 522 then checks whether the request is an alias translation request in step 3314. If the request is not an alias translation request, the database system 522 registers an unknown request event in step 3316 before returning to step 3310. If the request is an alias translation request, the database system 522 identifies and authenticates the user and the network device 512 in step 3318. If the access is invalid, the database system 522 increments a path/device security record in step 3322. The database system 522 then appends the requester denial information to the request packet in step 3324. The database system 522 then replies with a decline message to the access server 524 in step 3312 before returning to step 3302.

If the access is valid, the database system 522 retrieves the user's alias translation list in step 3326. The database system 522 then translates the alias for the user and appends the translation to a reply to the access server 524. The database system 522 then replies with an approve message to the access server 524 in step 3330. In one embodiment of the invention, the database system 522 uses the alias translation system 578 to perform the operations disclosed in FIG. 33 and stores the aliases and alias translations in the alias translation system 578.

Inband Domain Name Service Lookup

The Domain Name Server (DNS) translations of a domain name to a network address delays user interaction with the service provider. In prior solutions in voice telephone Signaling System #7 networks, a signal transfer point performs an inband local number portability (LNP) lookup on a ISDN part call setup request such as an Initial Address Message (IAM). This inband lookup eliminates the network switch from launching a Transaction Capabilities Application Part (TCAP) LNP query to translate the telephone number in the IAM.

Figure 34:
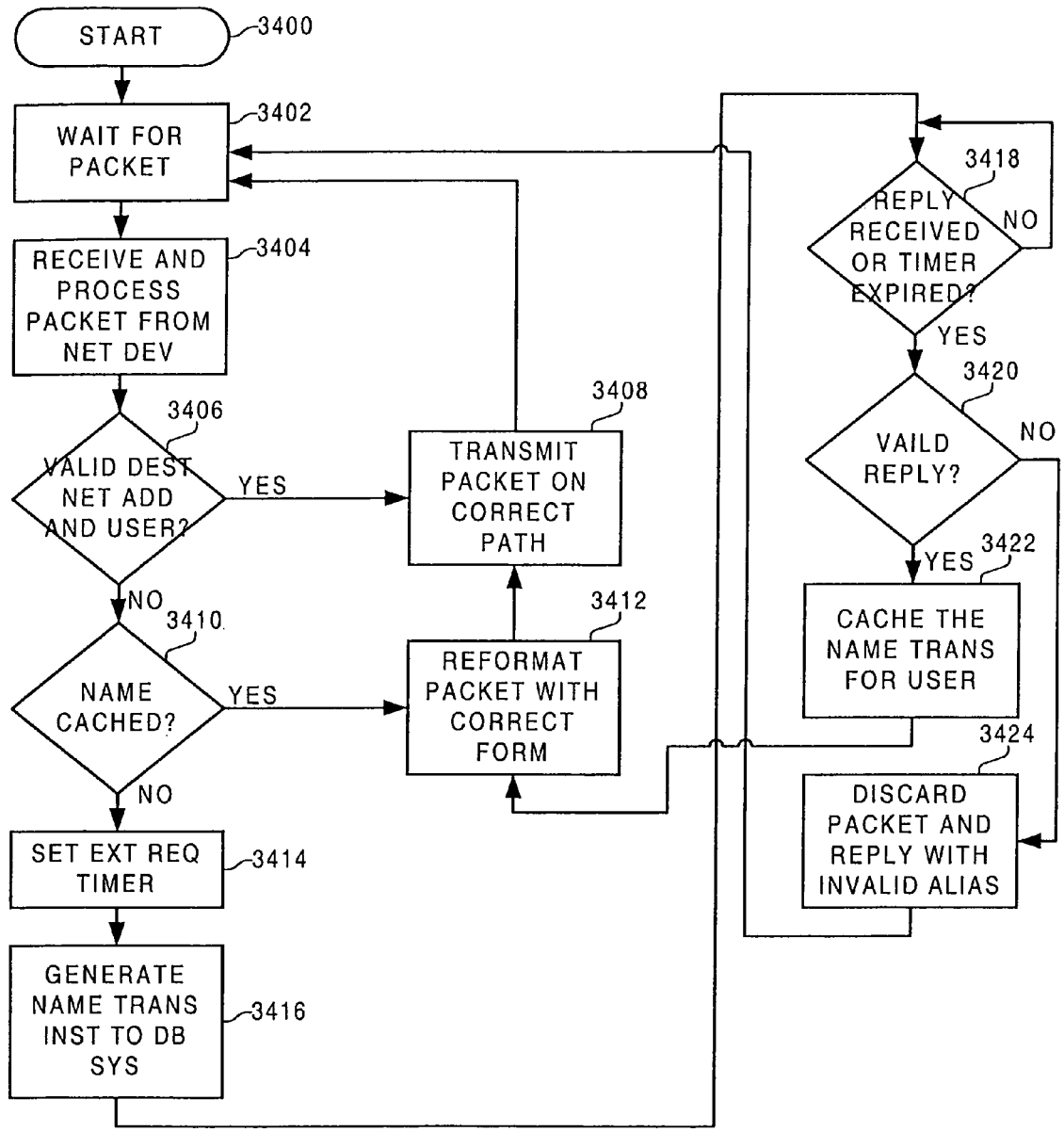
FIG. 34 illustrates a flowchart for an access server for an inband domain name service lookup in an example of the invention.

FIGS. 5 and 34 disclose one embodiment for inband domain name service in an example of the invention. This embodiment provides a cache for the access server 524 for alias translations on a per user basis. Thus, the external queries for translations of aliases to domain names, macros, programs, or network addresses are eliminated. If the translated value of a request is in the alias translation cache, no translation request will be required to a DNS server. Therefore, users experience reduced delays when requesting a service.

FIG. 34 depicts a flowchart for the access server 524 for an inband domain name service lookup in an example of the invention. FIG. 34 begins in step 3400. In step 3402, the access server 524 waits for a packet. The access server 524 then receives and processes the packet from the network device 512 in step 3404. The access server 524 then checks if the destination network address and user is valid in step 3406. If the destination network address and user is valid, the access server 524 transmits the packet on the correct path to reach the destination in step 3408 before returning to 3402.

If the destination network address or the user is invalid, the access server 524 then checks if the alias translation is cached for the user in step 3410. If the alias translation is cached, the access server 524 reformats the packet using the cached alias translation in step 3412 before returning to step 3402. If the alias translation is not cached, the access server 524 sets an external request timer in step 3414. The access server 524 then generates and transmits an alias translation request to the database system 522 in step 3416. The access server 524 checks whether a reply has been received or the external request timer has expired in step 3418. If a reply has been received and the external request timer has not expired, the access server 524 returns to step 3418.

If a reply has been received or the external request timer has expired, the access server 524 checks if the reply was valid in step 3420. If the reply is invalid, the access server 524 discards the packet and replies with an invalid alias message to the network device 512 in step 3424 before returning to step 3402. If the reply is valid, the access server 524 caches the alias translation for the user in step 3422 before returning to step 3412.

Inline Access Service Triggering

Figure 35:
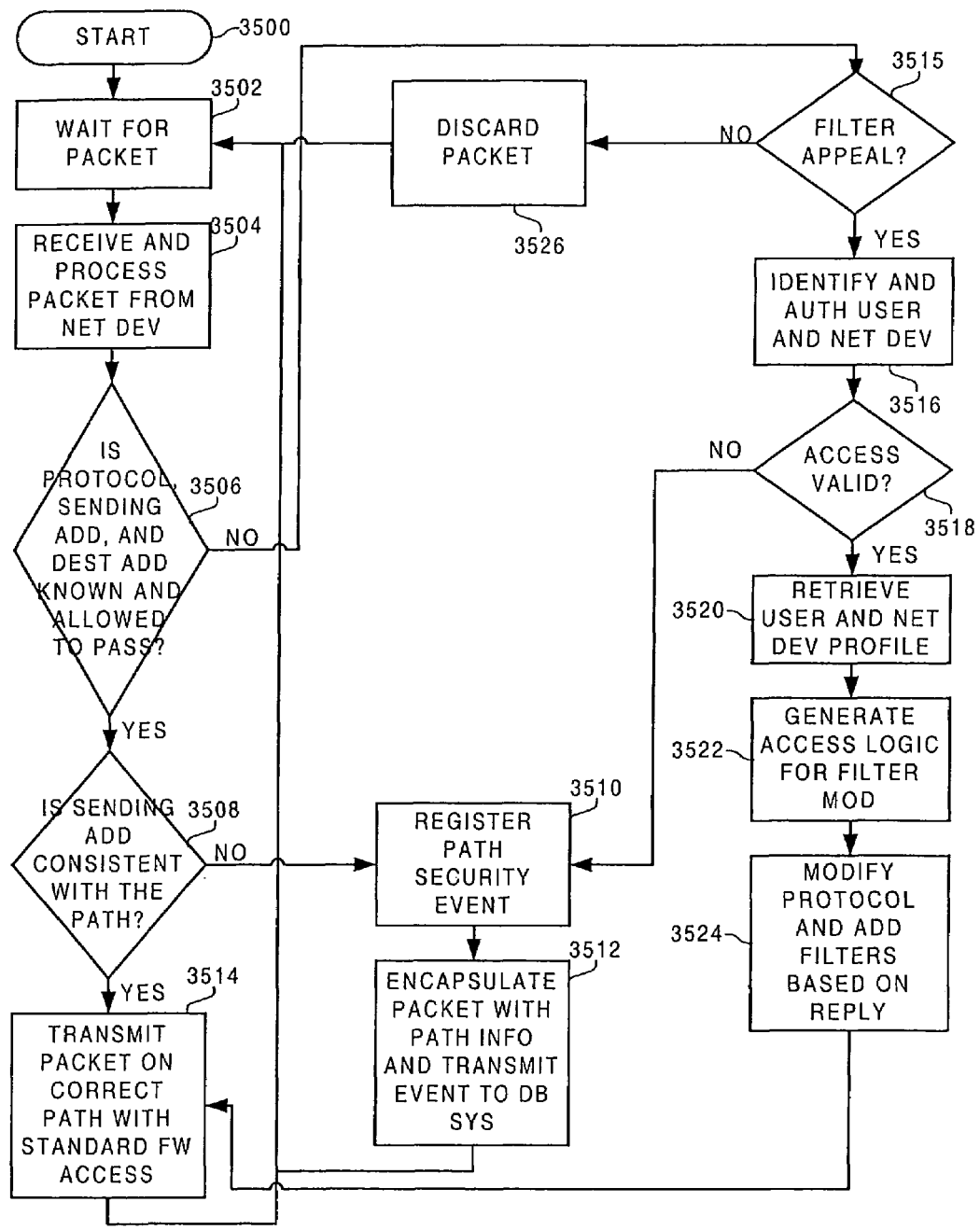
FIG. 35 illustrates a flowchart for inline access service triggering in an example of the invention.

Typical firewalls filter packets out on a request by request basis on "what is not allowed". FIGS. 5 and 35 disclose one embodiment for inline access service triggering. In this embodiment, the access server 554 filters packets out on a "what is allowed" basis. Also, the access server 554 performs packet filtering on a service access basis.

FIG. 35 depicts a flowchart for inline access service triggering in an example of the invention. FIG. 35 begins in step 3500. In step 3502, the access server 554 waits for the next packet. In this embodiment, the access server 554 receives information in the form of packets from the network device 512. The access server 554 receives and processes a packet from the network device 512 in step 3504. In step 3506, the access server 554 checks if the protocol, sending address, and the destination address are known and allowed to pass. In one embodiment, the access server 554 checks the database system 522 for the determination made in step 3506. If the protocol, sending address, and the destination address are known and allowed to pass, the access server 554 checks if the sending address is consistent with the path in step 3508. If the sending address is not consistent with the path, the access server 554 registers a path security event in step 3510. The access server 554 then formats the packet with path information in step 3512. The access server 554 also increments the path/device security record and logs the event before returning to step 3502. If the sending address is consistent with the path, the access server 554 transmits the packet on the correct path with standard firewall access in step 3514 before returning to step 3502.

If the protocol, sending address, or the destination address are not known or not allowed to pass, the access server 554 checks if the request is a filter appeal in step 3515. If the request is not a filter appeal, the access server 554 discards the packet in step 3526 before returning to step 3502. If the request is a filter appeal, the access server 554 identifies and authenticates the user and the network device 512 in step 3516. The access server 554 then checks if the access is valid in step 3518. If the access is invalid, the access server 554 returns to step 3510. If the access is valid, the access server 554 retrieves the user access profile and network device's 512 profile in step 3520. The access server 554 then modifies the access logic for filter modification in step 3524. The access server 554 then modifies the protocol and address filters based on the request in step 4824 before returning to step 3514. In some embodiments, the access server 554 modifies the filters in conformance with the user access profile.

Access Service Triggering

Figure 36:
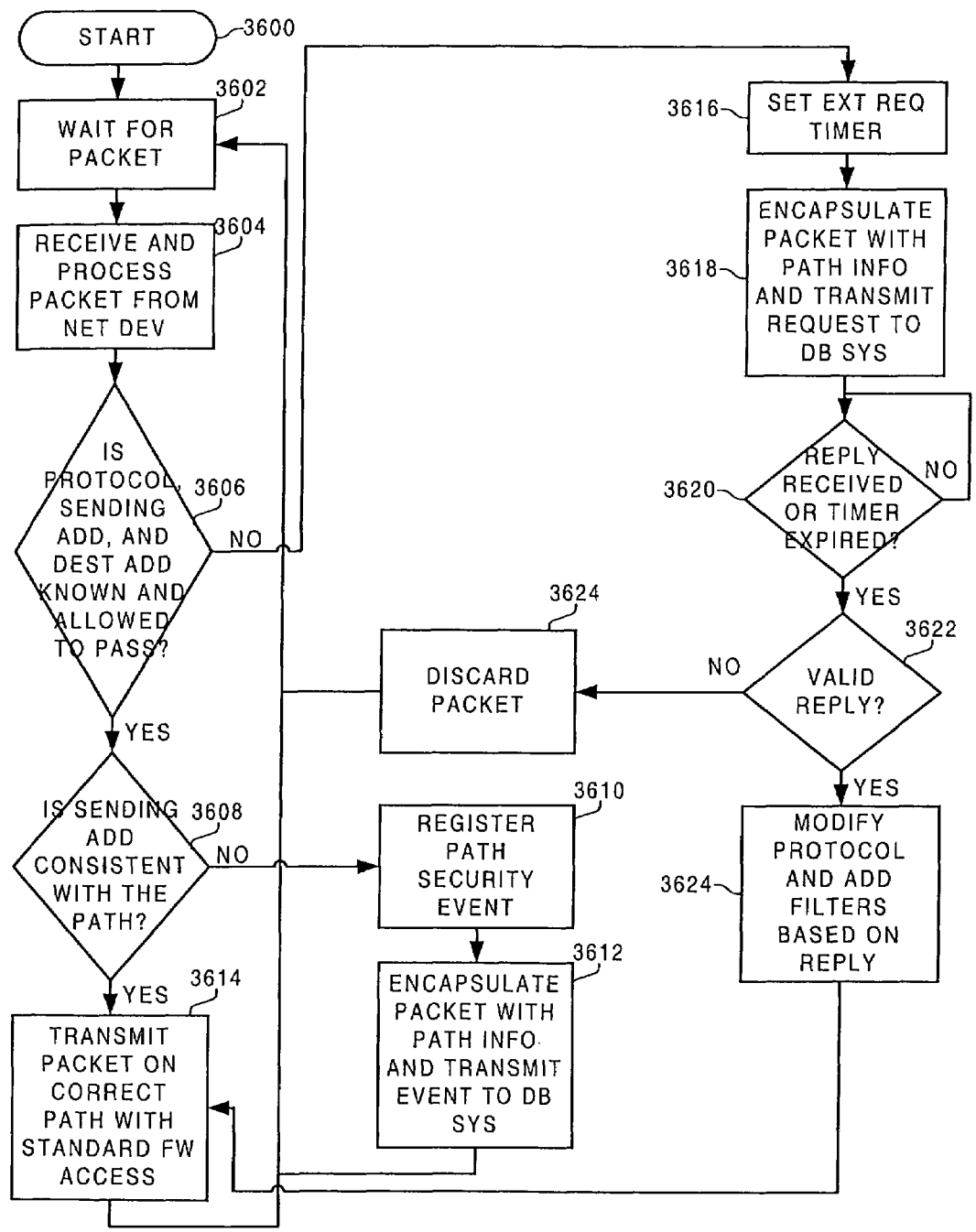
FIG. 36 illustrates a flowchart for an access server for access service triggering in an example of the invention.
Figure 37:
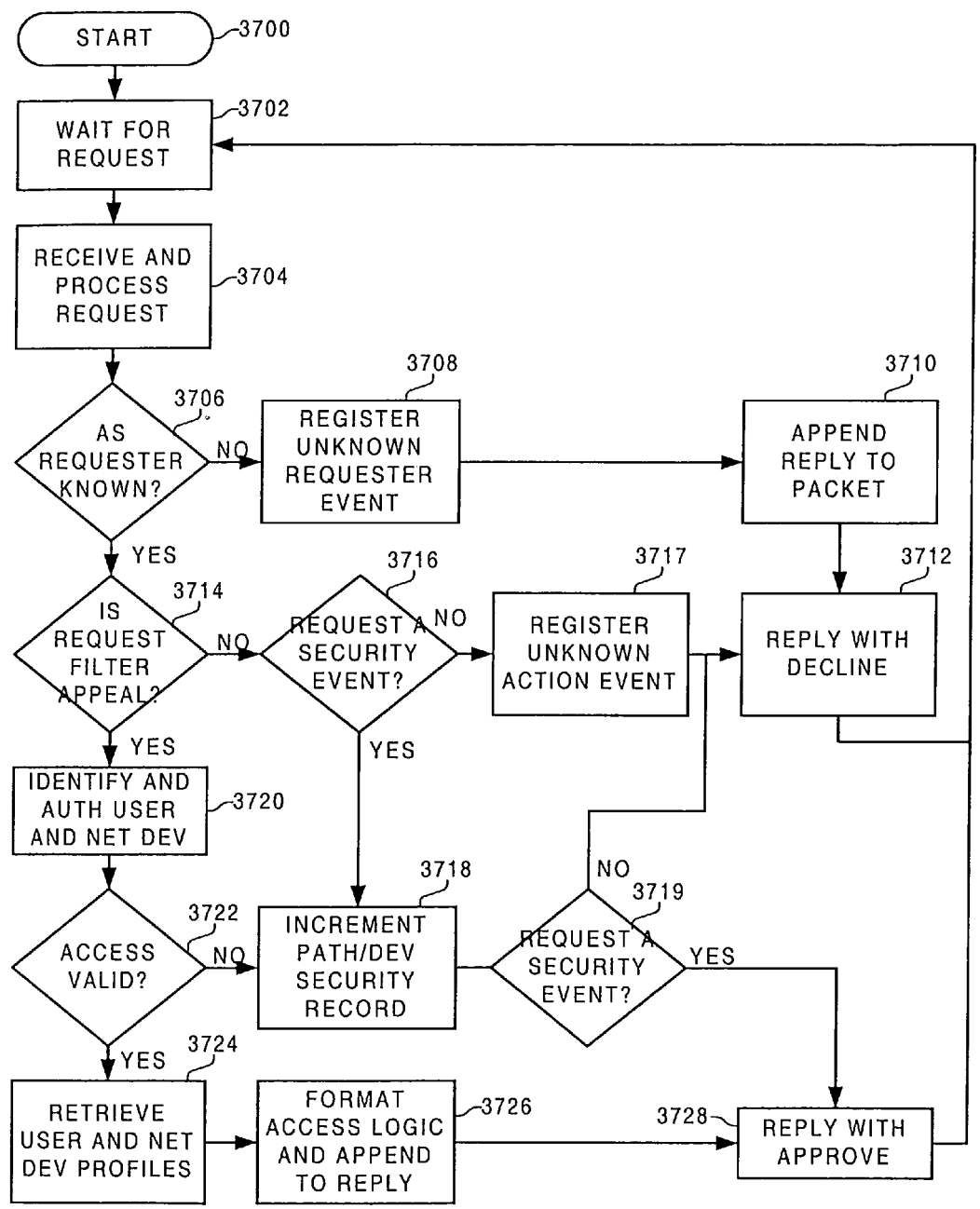
FIG. 37 illustrates a flowchart for a database system for access service triggering in an example of the invention.

Access providers sometimes need to extend their authentication logic beyond their primary access devices. No prior system in data networks extends the authentication logic beyond what is performed by the access provider's access devices. FIGS. 5, 36 and 37 disclose one embodiment for access service triggering. In this embodiment, the access server 524 triggers a request to external access control logic. Access providers extends the access and authentication logic beyond their access devices while maintaining centralized control of the authentication logic and user access profiles. Also, the access server 554 performs packet filtering on a service access basis.

FIG. 36 depicts a flowchart for the access server 524 for access service triggering in an example of the invention. FIG. 36 begins in step 3600. In step 3602, the access server 524 waits for the next packet. The access server 524 then receives and processes a packet from the network device 512 in step 3604. In step 3606, the access server 524 checks if the protocol, sending address, and the destination address are known and allowed to pass. In one embodiment, the access server 524 checks the database system 522 for the determination made in step 3606. If the protocol, sending address, and the destination address are known and allowed to pass, the access server 524 checks if the sending address is consistent with the path in step 3608. If the sending address is not consistent with the path, the access server 524 registers a path security event in step 3610. The access server 524 then formats the packet with path information in step 3612 before returning to step 3602. If the sending address is consistent with the path, the access server 524 transmits the packet on the correct path with standard firewall access in step 3614 before returning to step 3602.

If the protocol, sending address, or the destination address are not known or are not allowed to pass, the access server 524 sets an external request timer in step 3616. The access server 524 then generates and transmits a request with the path information to the database system 522 in step 3618. The access server 524 then checks if a reply has been received or the external request timer has expired in step 3620. If the reply has not been received or the external request timer has not expired, the access server 524 checks if the reply is valid in step 3622. If the reply is invalid, the access server 524 discards the packet in step 3624 before returning to step 3602. If the reply is valid, the access server 524 then modifies the protocol and address filters based on the reply in step 3624 before returning to step 3614.

FIG. 37 depicts a flowchart for the database system 522 for access service triggering in an example of the invention. FIG. 37 begins in step 3700. In step 3702, the database system 522 waits for the next request. The database system 522 then receives and processes the request in step 3704. In step 3706, the database system 522 then checks if the access server requester is known in step 3706. If the access server requester is not known, the database system 522 registers an unknown requester event in step 3708. The database system 522 then appends the reply to the packet in step 3710. The database system 522 then generates and transmits a decline reply to the access server 524 in step 3712 before returning to step 3702.

If the access server requester is known, the database system 522 then checks if the request is a filter appeal in step 3714. If the request is not a filter appeal, the database system 522 then checks if the request is a security event in step 3716. If the request is not a security event, the database system 522 registers an unknown action event in step 3717 before returning to step 3712. If the request is a security event, the database system 522 increments a path/device security record, appends the requester information to the request packet, and logs the event in step 3718. The database system 522 then checks if the request is a security event in step 3719. If the request is not a security event, the database system 522 then returns to step 3712. If the request is a security event, the database system 522 proceeds to step 3728.

If the request is a filter appeal, the database system 522 then identifies the user and network device 512 in step 3720. The database system 522 then checks if the access is valid in step 3722. If the access is invalid, the database system 522 returns to step 3718. If the access is valid, the database system 522 retrieves the user and network device profiles in step 3724. The database system 522 then generates access logic and appends the access logic to a reply in step 3726. The database system 522 then transmits the approve reply to the access server 524 in step 3728 before returning to step 3702.

Personal URL

Figure 38:
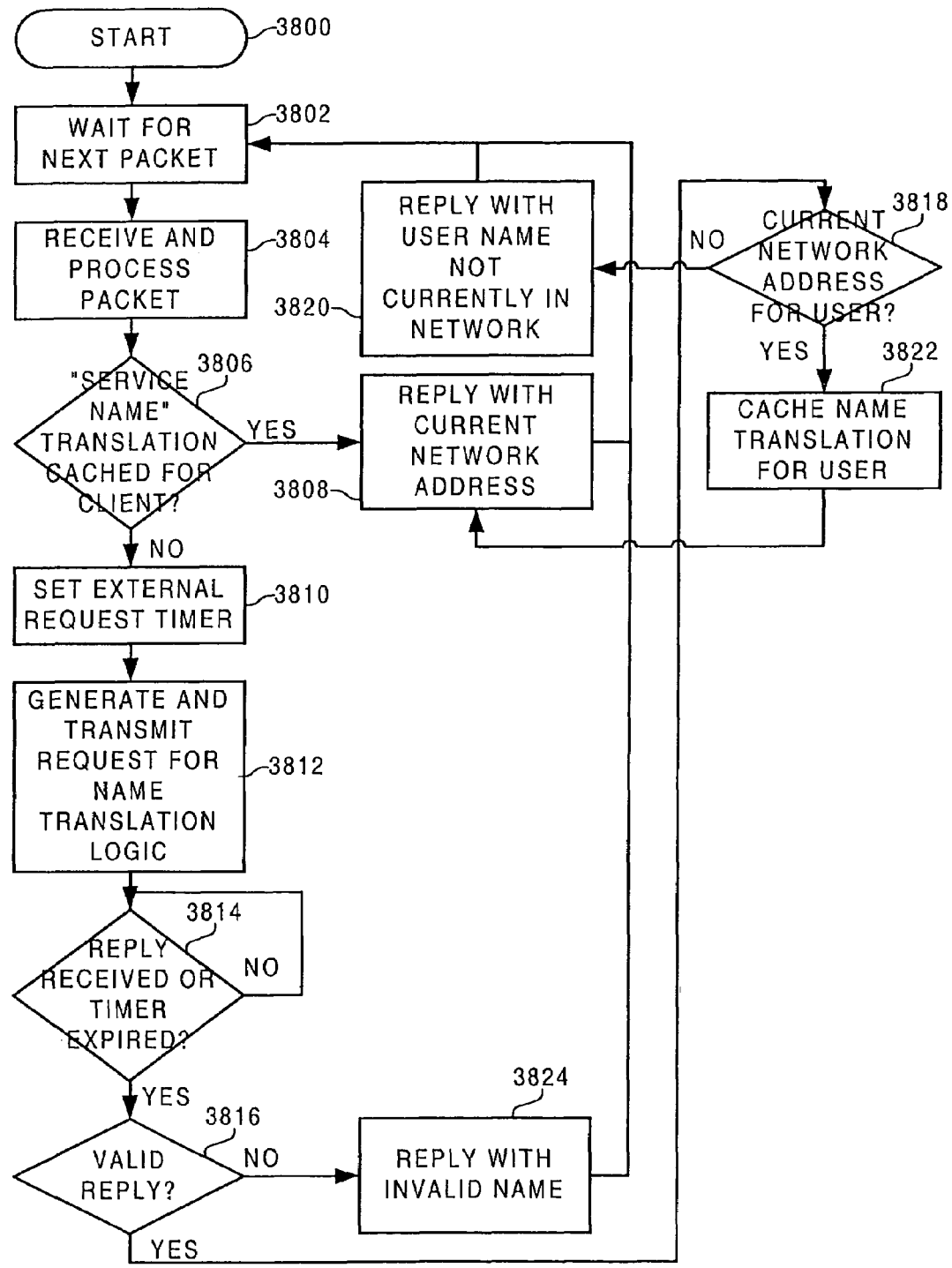
FIG. 38 illustrates a flow chart for the personal URL lookup in an example of the invention.
Figure 39:
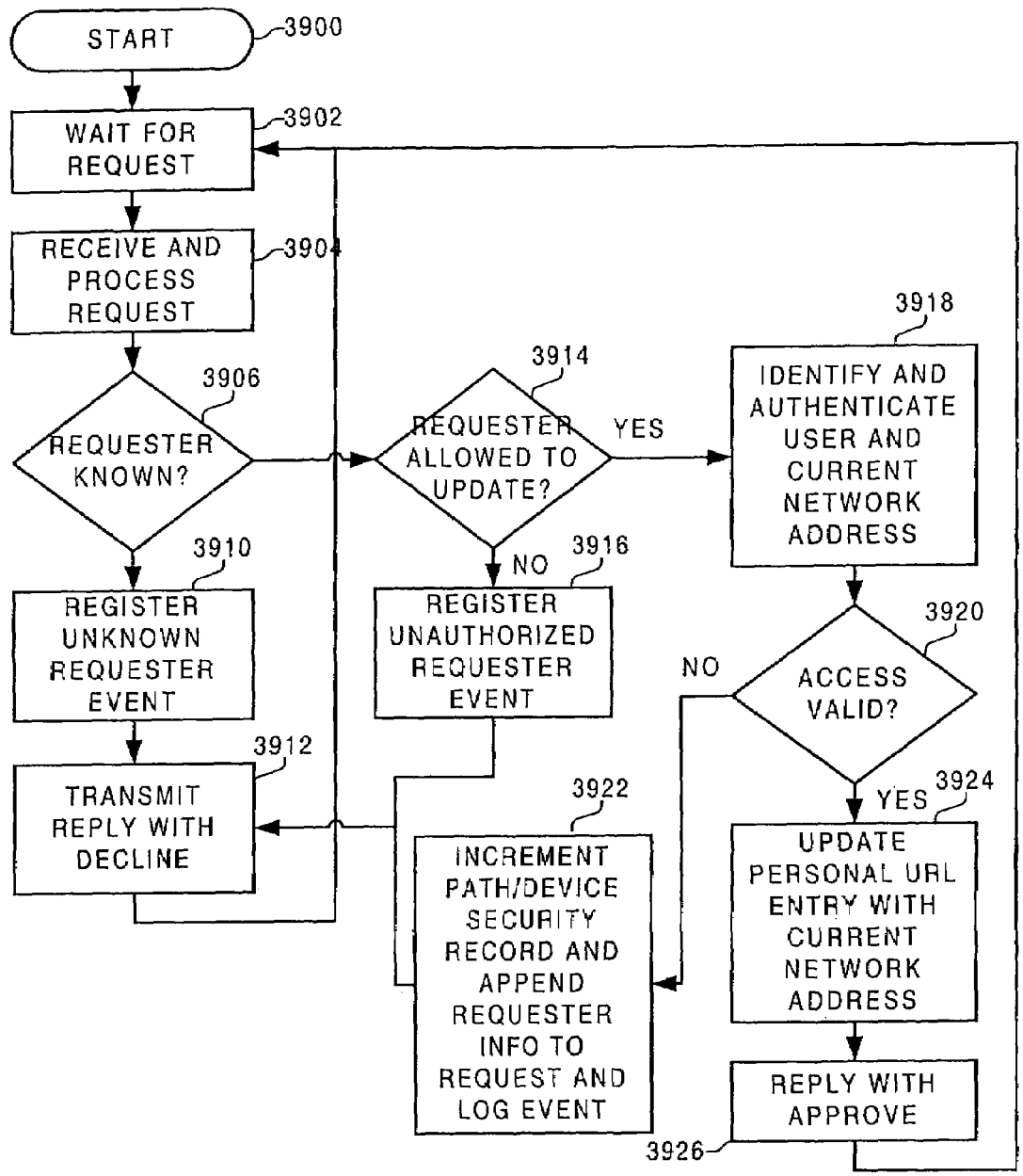
FIG. 39 illustrates a flow chart for the personal URL update in an example of the invention.

The Internet currently uses Uniform Resource Locator (URL) addresses such as www.yahoo.com so that the address is in more human readable form than the network address. Unfortunately, user cannot distinguish themselves by a network address because the user's network address changes when the user's access point changes. FIGS. 5, 38 and 39 disclose one embodiment for a personal URL. In this embodiment, a network user may publish their location on the network by a user alias. A user alias is any alias that relates to the network address of a user. Logically linking a user's current network address with a user alias allows a user to be located wherever the user accesses the network.

FIG. 38 depicts a flowchart for a personal URL lookup in an example of the invention. FIG. 38 begins in step 3800. In step 3802, the database system 522 waits for the next packet. The database system 522 then receives and processes the packet including the user alias. The database system 522 then checks if a user alias translation is cached for this user in step 3806. If the user alias translation is cached, the database system 522 replies with the current network address of the user in step 3808 before returning to step 3802.

If the user alias translation is not cached, the database system 522 sets an external request timer in step 3810. The database system 522 then generates and transmits a request for user alias translation logic in step 3812. In one embodiment, the database system 522 transmits the request for user alias translation logic to the database system that contains the user access profile. The database system 522 then checks whether a reply was received or the external request timer expired in step 3814. If the reply was not received and the external request timer did not expire, the database system 522 returns to step 3814. If a reply was received or the external request timer did expire, the database system 522 checks if the reply was valid in step 3816. If the reply was invalid, the database system replies with an invalid name message in step 3824 before returning to step 3802.

If the reply was valid, the database system 522 check if there is a current network address for the user in step 3818. If there is no current network address for the user, the database system 522 replies with user alias not currently in network message in step 3820 before returning to step 3802. If there is a current network address for the user, the database system 522 caches the user alias translation in step 3822 before returning to step 3808.

FIG. 39 depicts a flowchart for a personal URL update in an example of the invention. FIG. 39 begins in step 3900. In step 3902, the database system 522 wait for a request. The database system 522 then receives and processes the request to update the user alias in step 3904. In one embodiment, the database system receives the request from a database system that contains the user access profile. In another embodiment, the request comes from the access server 524. The database system 522 then checks if the requester is known in step 3906. If the requester is not known, the database system 522 registers an unknown requester event in step 3910. The database system 522 then transmits a reply with decline in step 3912 before returning to step 3902.

If the requester is known, the database system 522 then checks if the requester is allowed to update the user alias in step 3914. If the requester is not allowed, the database system 522 registers an unauthorized requester event in step 3916 before returning to step 3912. If the requester is allowed to update, the database system 522 then identifies and authenticates the user and current network address in step 3918. The database system 522 then checks if the access is valid in step 3920. If the access is invalid, the database system 522 increments the path/device security record in step 3922. The database system 522 also appends the requester information to the request and logs the event before returning to step 3912.

If the access is valid, the database system 522 then updates the user alias translation with the current network address in step 3924. The database system 522 then replies with an approve in step 3926 before returning to step 3902. In one embodiment of the invention, the database system 522 uses the personal DNS system 579 to perform the operations disclosed in FIGS. 38 and 39.

Access Network Caching—FIGS. 5, 40, 41, 42, 43, and 44

Predictive Caching

Users that are dialed into the network at a rate of 56 kbps or greater typically retrieve information at a rate of 2–4 kbps. Various equipment between the network access provider and the service provider cause this lower rate of transmission. Some examples of the equipment are network access provider equipment, service provider equipment, network backbone overloading, traffic shaping device, firewalls, and routers. One solution for compensating for the lower rate of transmission is caching. Computers typically contain a memory cache for specific application or devices. Firewalls and routers may also contain caches for data. Unfortunately, none of these caches are user specific.

FIGS. 5, 40, 41 and 42 disclose one embodiment of the invention for predictive end user caching. Predictive end user caching advantageously improves user noticeable delays and slowdowns due to the lower transmission rate. The extension of data requests from the user network 510 beyond the access server 524 is eliminated when the data requested is cached in the database system. Also, using a predictive algorithm reduces delay by improving caching efficiency based on a user's predictable pattern.

Figure 40:
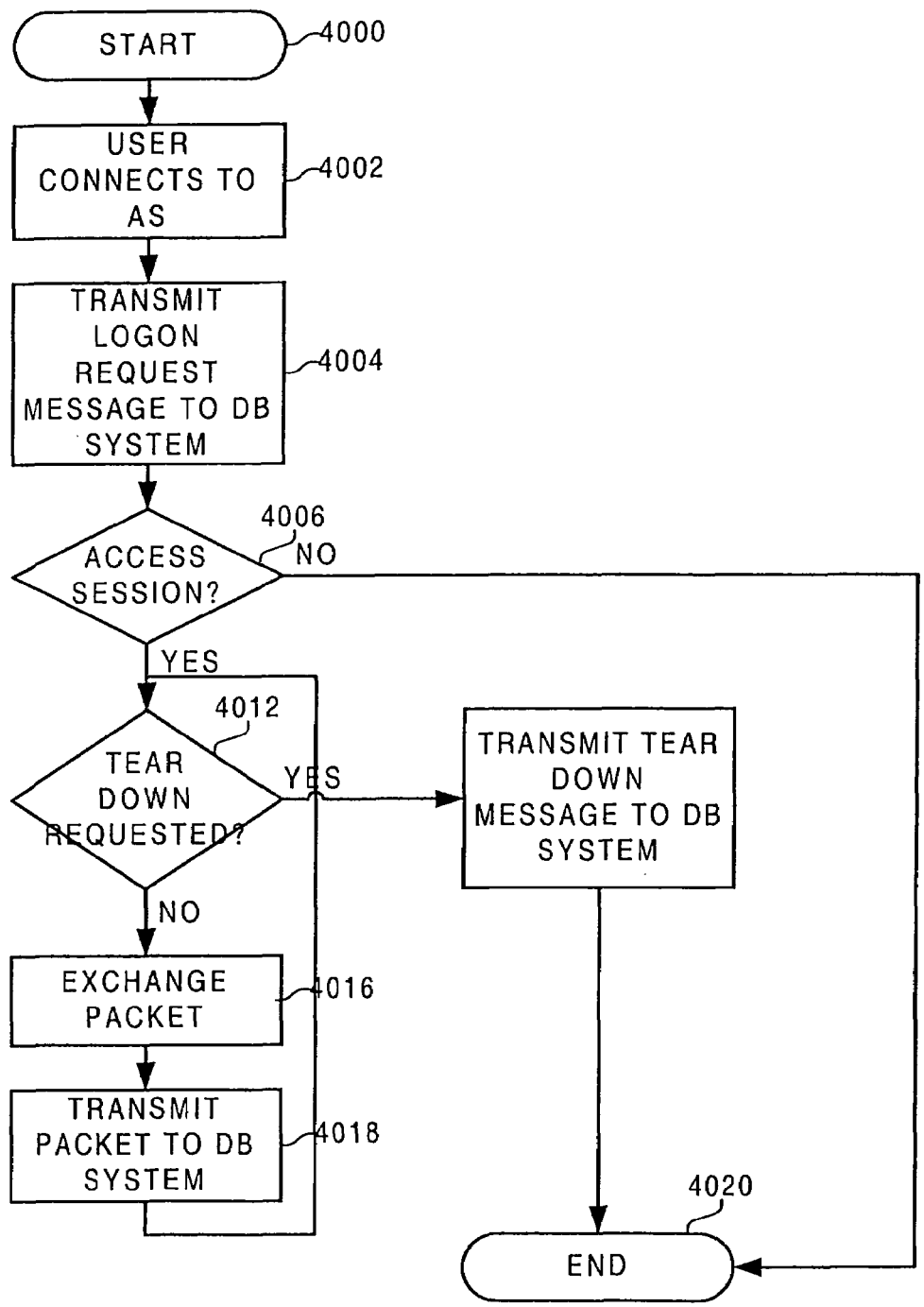
FIG. 40 illustrates a flowchart for an access server for auditing in an example of the invention.

FIG. 40 depicts a flowchart for the access server 524 for auditing in an example of the invention. FIG. 40 begins at step 4000. In step 4002, the user network 510 establishes a connection to the access server 524. In step 4004, the access server 524 generates and transmits a logon request message to the database system 522. The access server 524 then checks if the database system allowed an access session to be established for the user in step 4006.

If the access session is not established, the access server 524 terminates in step 4020. If the access session is established, the access server 524 then checks if an access session tear down is requested in step 4012. If the access session tear down is requested, the access server 524 generates and transmits a tear down message with user and path information to the database system 522 in step 4014 before terminating in step 4020.

While no session tear down request is received, the access server 524 exchanges packets with the user network 510 depending on the service provided in step 4016. The access server 524 transmits all new packet destinations including the user and path information to the database system 522 in step 4018 before returning to step 4012. In one embodiment, the database system 522 stores the connect request message, the session reject message, the session accept message, the tear down message including the user and path information, and the packets including the user and path information in an audit database system 526. In one embodiment, the connect request message, the session reject message, the session accept message, the tear down message including the user and path information, and the packets including the user and path information are in the form of an audit message. An audit message is any message, information, or signaling that is audited while a user is accessing an access network 520.

Figure 41:
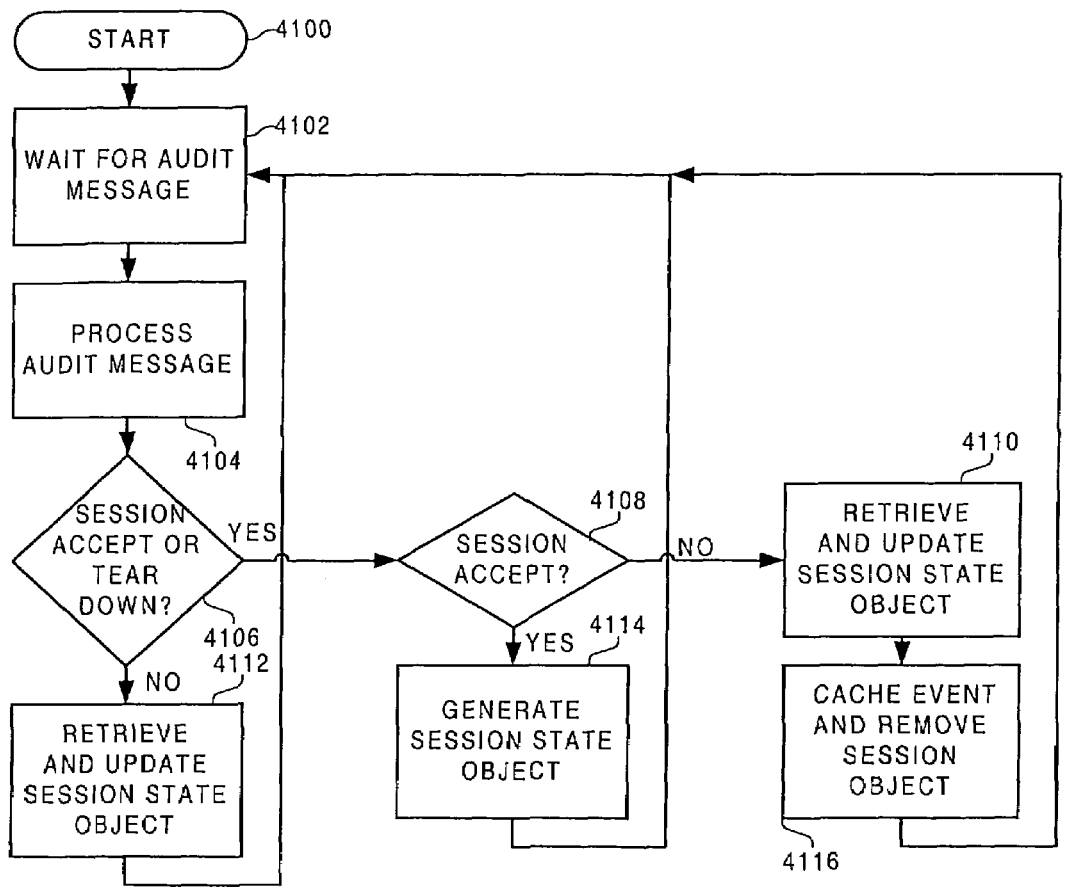
FIG. 41 illustrates a flowchart for a database system for auditing in user predictive caching in an example of the invention.

FIG. 41 depicts a flowchart for the database system 522 for auditing in user predictive caching in an example of the invention. FIG. 41 begins in step 4100. In step 4102, the database system 522 waits for an audit message. In step 4102, the database system 522 receives and processes the audit message. The database system 522 then checks if the audit message is a session accept message or a tear down message in 4106. If the audit message is not a session accept message or a tear down message, the database system 522 retrieves the session state object and updates the object with the audit message in step 4112 before returning to step 4102.

If the audit message is a session accept message or a tear down message, the database system 522 then checks if the audit message is a session accept message in step 4108. If the audit message is a session accept message, the database system 522 generates a session state object including the user, device, path, and session ID in step 4114 before returning to step 1802. If the audit message is a tear down message, the database system 522 retrieves the session state object and updates the object in step 4112. Also, the database system 522 stores the event in step 4116. In one embodiment, the database system 522 stores the event in the cache database system 574. The database system 522 removes the active reference from the session state object before returning to step 4102. In one embodiment of the invention, the database system 522 uses the audit database system 573 to perform the operations disclosed in FIG. 41.

Figure 42:
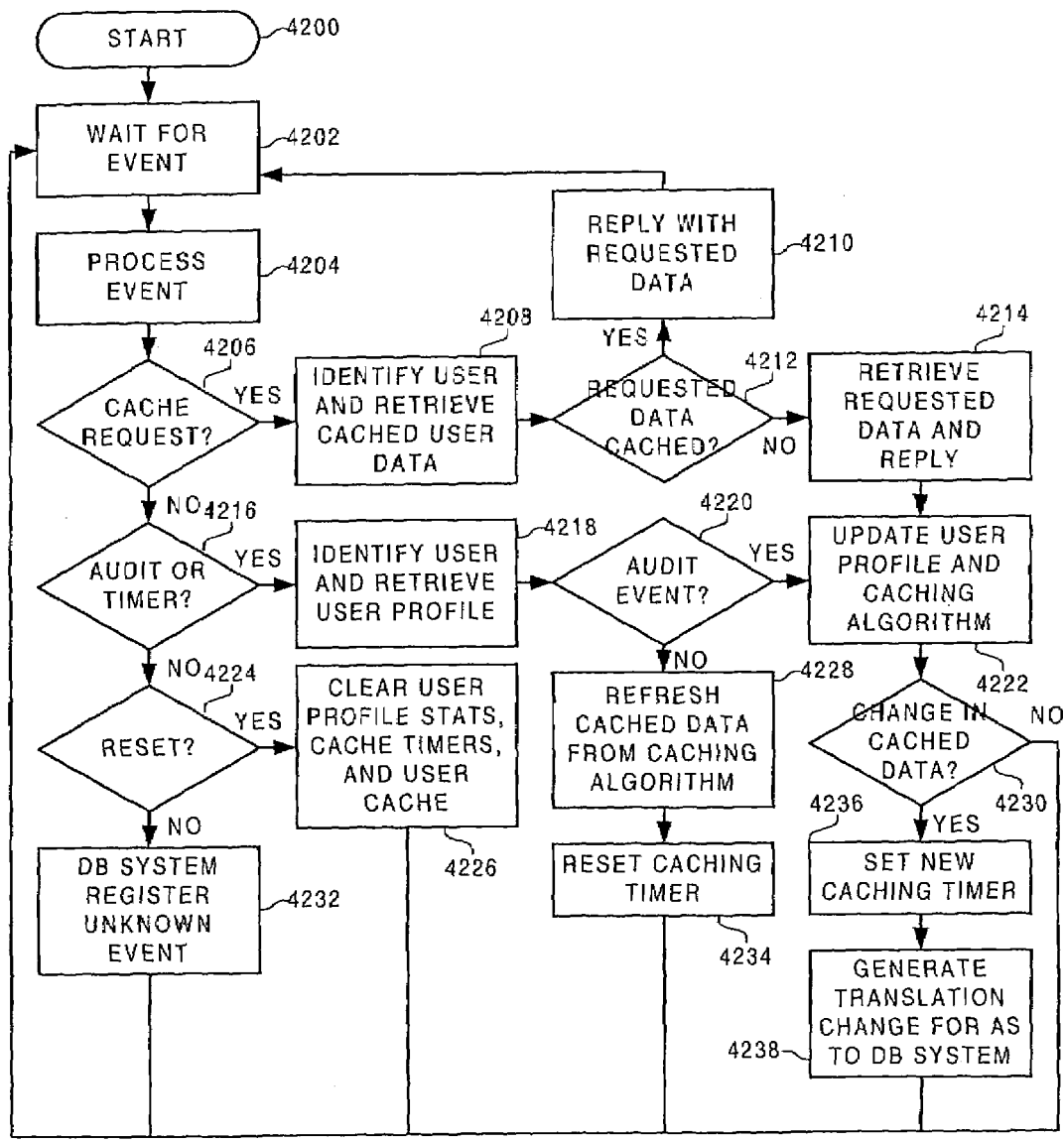
FIG. 42 illustrates a flowchart for a database system for caching in user predictive caching in an example of the invention.

FIG. 42 depicts a flowchart for the database system 522 for caching in user predictive caching in an example of the invention. FIG. 42 begins in step 4200. In step 4202, the database system 522 waits for the next event. The database system 522 processes the event in step 4204. In this embodiment, a request for data is a cache request. The database system 522 then checks if the event is a cache request in step 4206.

If the event is a cache request, the database system 522 identifies the user and retrieves the cached user data in step 4208. The database system 522 then checks if the requested data from the cache request is in the cached user data in step 4212. If the requested data is in the cached user data, the database system 522 replies with the requested data in step 4210 before returning to step 4202. If the requested data is not in the cached user data, the database system 522 retrieves the requested data from the service provider via the access server 524 in step 4214. The database system 524 then replies to the user network 510 with the requested data. Alternatively, in another embodiment, the access server 524 transfers the requested data from the service provider to the user network 510 and the database system 522.

In step 4222, the database system 522 updates the user access profile and the caching algorithm. The database system 522 then determines whether there is a change in the cached data based on the caching algorithm in step 4230. If there is no change in the cached data, the database system 522 returns to step 4202. If there is a change in the cached data, the database system 522 sets any new caching timers for the cached data in step 4236. The database system 522 also generates and transmits a translation change to the access server 524 to change the requested destination address to the database system 522 in step 4238 before returning to step 4202.

If the event is not a cache request, the database system 522 then checks if the event is an audit or timer request in step 4216. If the event is an audit or timer request, the database system 522 identifies the user and retrieves the user access profile in step 4218. The database system 522 then checks if the event is an audit request in step 4220. If the event is an audit request, the database system 522 proceeds to step 4222. If the event is not an audit request, the database system 522 refreshes the cached data from the service provider of the cached data based on the caching algorithm in step 4228. The database system 522 then resets the caching timer for the cached data in step 4234 before returning to step 4202.

If the event is not an audit or timer request, the database system 522 checks if the event is a reset event in step 4224. If the event is not a reset event, the database system 522 registers a unknown event received in step 4232 before returning to step 4202. If the event is a reset event, the database system 522 clears the user access profile statistics, caching timers, the user's cached data. In one embodiment, the user's cached data is stored in the cached database system 574 and the database system 522 uses the cached database system 574 to perform the operations disclosed in FIG. 42.

User Controlled Caching

Another solution to reduce user noticeable delays and slowdowns due to the lower transmission rate is user controlled caching. FIGS. 5, 40, 43 and 44 disclose one embodiment of the invention for user controlled caching. A user controls caching by creating a script of commands to cache data prior to the user accessing the network. For example, a user selects financial or local weather forecasts to cache, so when the user logs on to the network the information will be immediately available from the cache. Scripting has typically been done on general purpose computers. In a general purpose computer, the user sets up a sequenced set of commands to be executed when the script is executed. Unfortunately, this type of scripting has not been performed on a network cache.

Figure 43:
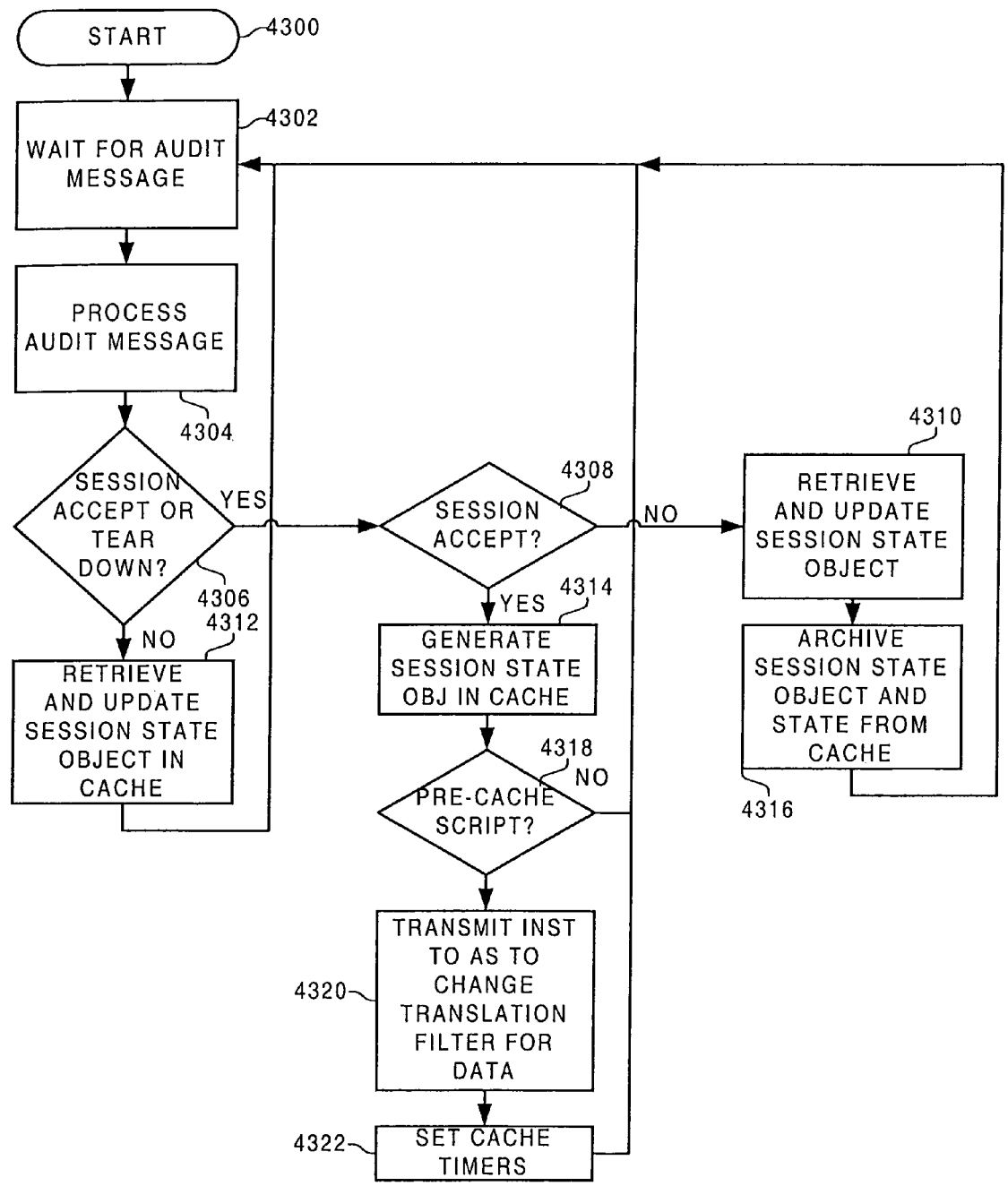
FIG. 43 illustrates a flowchart for a database system for auditing in user controlled caching in an example of the invention.

In this embodiment of user controlled caching, the operation of the access server 524 is as described in FIG. 40. FIG. 43 depicts a flowchart for the database system 522 for auditing in user controlled caching in an example of the invention. FIG. 43 begins in step 4300. In step 4302, the database system 522 waits for an audit message. In step 4302, the database system 522 receives and processes the audit message. The database system 522 then checks if the audit message is a session accept message or a tear down message in 4306. If the audit message is not a session accept message or a tear down message, the database system 522 retrieves the session state object and updates the object with the audit message in the cache in step 4312 before returning to step 4302.

If the audit message is a session accept message or a tear down message, the database system 522 then checks if the audit message is a session accept message in step 4308. If the audit message is a session accept message, the database system 522 generates a session state object in the cache including the user, device, path, and session ID in step 4314. The database system 522 then checks if the user has a pre-cache script in step 4318. If the user does not have a pre-cache script, the database system 522 returns to step 4302. If the user has a pre-cache script, the database system 522 generates and transmits a pre-cache instruction set to the access server 524 to change the translation filter to access the database system 522 for destinations in the pre-cache script so that any requests for those destinations are fulfilled from the cache in step 4320. The database system 522 then sets cache refresh timers in step 4322 and returns to step 4302.

If the audit message is a tear down message, the database system 522 retrieves the session state object and updates the object in step 4310. Also, the database system 522 stores the event in step 4316. In one embodiment, the database system 522 stores the session state object and the state in the cache database system 527. The database system 522 removes the active reference from the session state object before returning to step 4302. In one embodiment of the invention, the database system 522 uses the audit database system 573 to perform the operations disclosed in FIG. 43.

Figure 44:
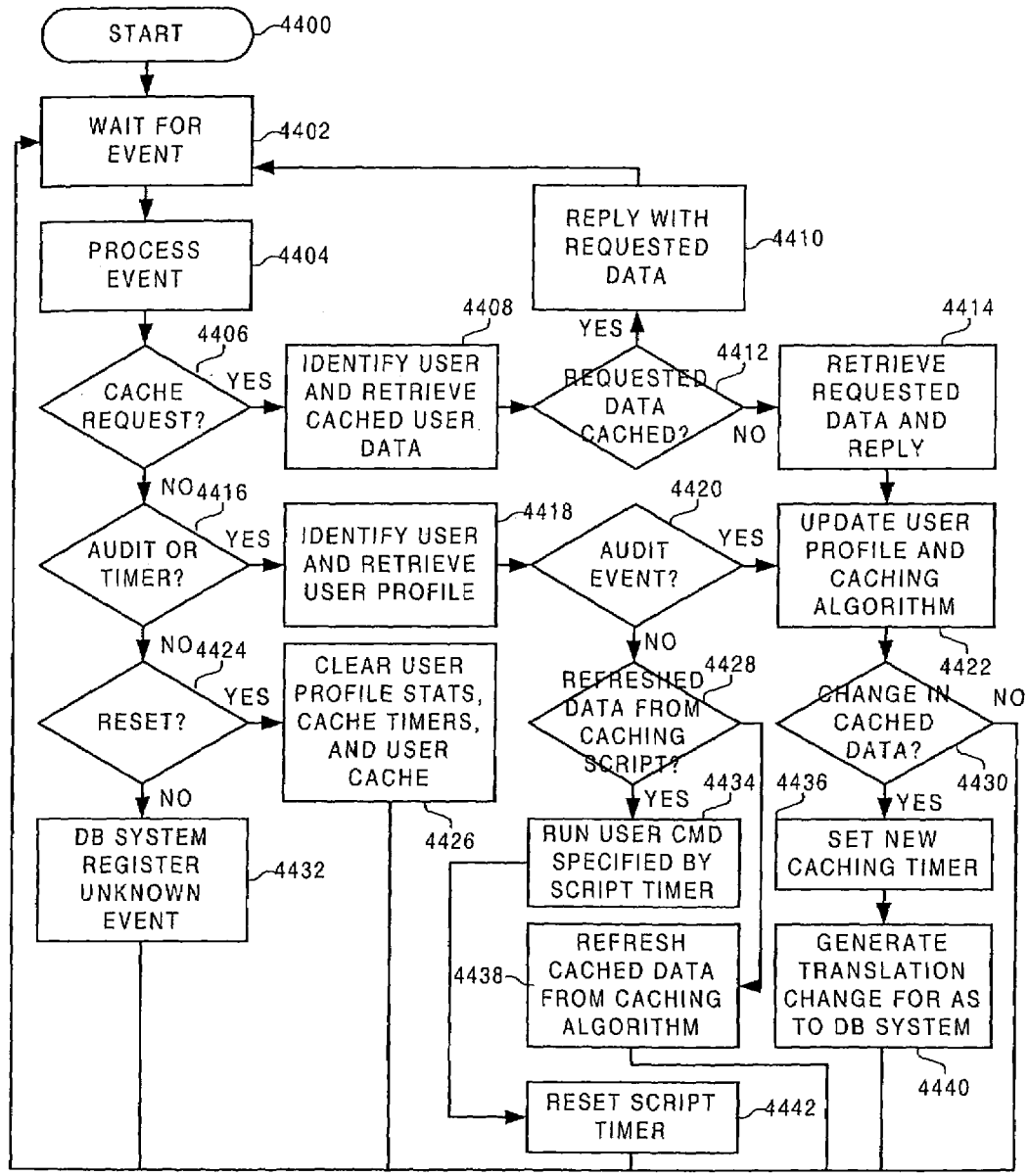
FIG. 44 illustrates a flowchart for a database system for caching in user controlled caching in an example of the invention.

FIG. 44 depicts a flowchart for the database system 522 for caching in user controlled caching in an example of the invention. FIG. 44 begins in step 4400. In step 4402, the database system 522 waits for the next event. The database system 522 processes the event in step 4404. In this embodiment, a request for data is a cache request. The database system 522 then checks if the event is a cache request in step 4406.

If the event is a cache request, the database system 522 identifies the user and retrieves the cached user data in step 4408. The database system 522 then checks if the requested data from the cache request is in the cached user data in step 4412. If the requested data is in the cached user data, the database system 522 replies with the requested data in step 4410 before returning to step 4402. If the requested data is not in the cached user data, the database system 522 retrieves the requested data from the service provider via the access server 524 in step 4414. The database system 522 then replies to the user network 510 with the requested data. Alternatively, in another embodiment, the access server 524 transfers the requested data from the service provider to the user network 510 and the database system 522.

In step 4422, the database system 522 updates the user access profile and the caching algorithm. The database system 522 then determines whether there is a change in the cached data based on the caching algorithm in step 4430. If there is no change in the cached data, the database system 522 returns to step 4402. If there is a change in the cached data, the database system 522 sets the new caching timer for the cached data in step 4436. The database system 522 also generates and transmits a translation change to the access server 524 to change the requested destination address to the database system 522 in step 4440 before returning to step 4402.

If the event is not a cache request, the database system 522 then checks if the event is an audit or timer request in step 4416. If the event is an audit or timer request, the database system 522 identifies the user and retrieves the user access profile in step 4418. The database system 522 then checks if the event is an audit request in step 4420. If the event is an audit request, the database system 522 proceeds to step 4422.

If the event is not an audit request, the database system 522 checks if the event is a script timer in step 4428. If the event is not a script timer, the database system 522 refreshes the cached data from the service provider of the cached data based on the caching algorithm in step 4438 before returning to step 4402. If the event is a script timer, the database system 522 executes the user commands or command set specified by the script timer event in step 4434. The database system 522 then resets the script timer for the cached data in step 4442 before returning to step 4402.

If the event is not an audit or timer request, the database system 522 checks if the event is a reset event in step 4424. If the event is not a reset event, the database system 522 registers a unknown event received in step 4432 before returning to step 4402. If the event is a reset event, the database system 522 clears the user access profile statistics, caching timers, the user's cached data. In one embodiment, the user's cached data is stored in the cached database system 574 and the database system 522 uses the cached database system 574 to perform the operations disclosed in FIG. 44.

Access Network Switching—FIGS. 5, 45, 46, and 47

Switching Access by a User

Access between users and service providers vary based on quality and security, which in turn determine the costs of the access. Users typically have a need to switch between types of access depending on the service offered or what stage in the service the user is in. For example, a user browses the amazon.com website for books using a standard Internet access. When purchasing the books, the user needs a more secure Internet access to ensure that the user's credit card number is not stolen by a hacker.

One prior solution for enhanced security is data Virtual Private Networks (VPN). Data VPN's are relatively static constructions which allow the extension of a user network to another location by extending the network over leased lines or shared Internet/Intranet facilities. However, VPN's require service anticipation, planning and expense beyond what the typical Internet and Intranet users possess. VPN's also do not provide dynamic switching between accesses. Another prior solution is Local Area Network emulation (LANE). LANE utilizes ATM transports to extend the reach of the user network. However, most Internet and Intranet users do not possess ATM equipment and expertise, and the backbone network is still IP.

Figure 45:
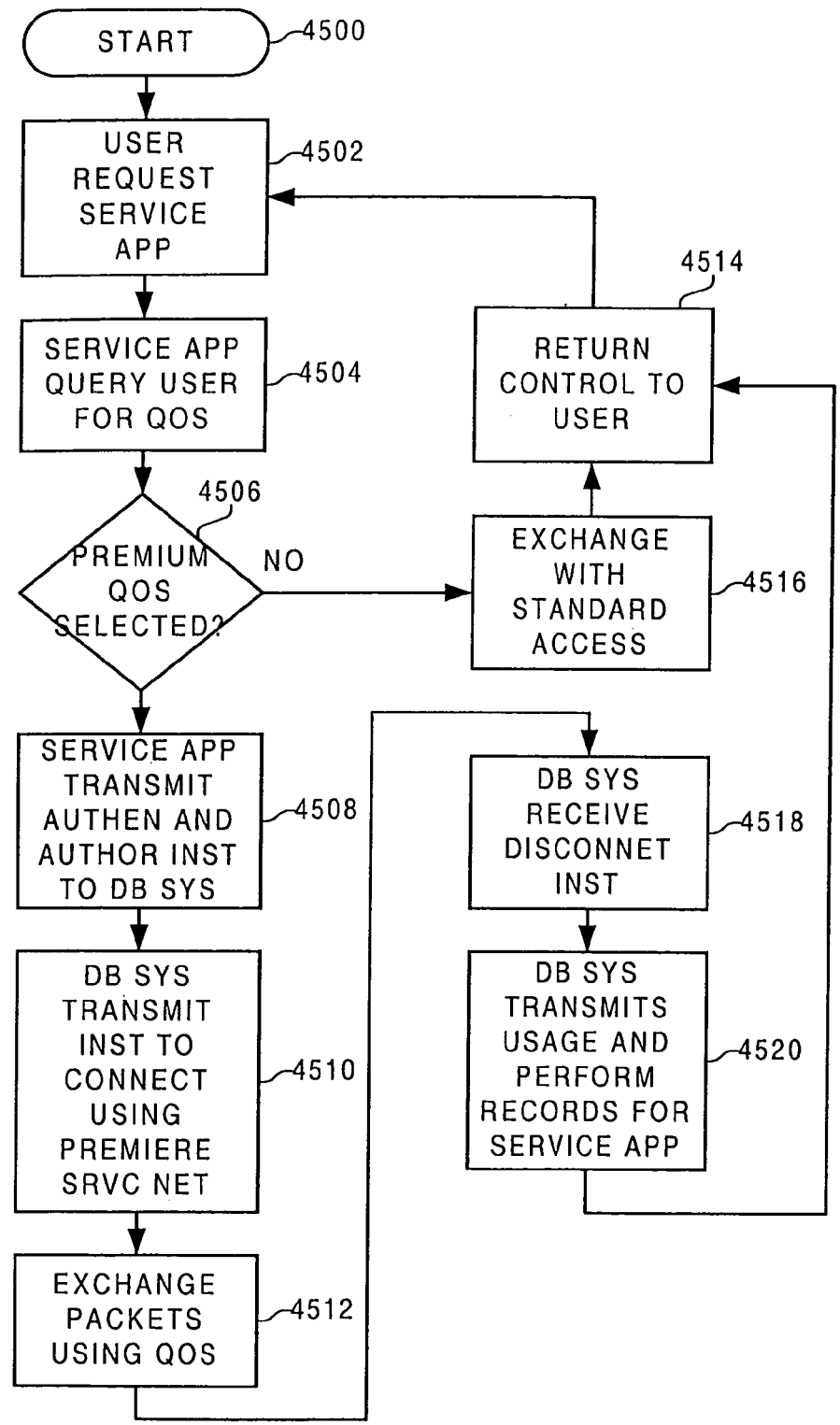
FIG. 45 illustrates a flowchart for switching access by a user in an example of the invention.

FIGS. 5 and 45 disclose one embodiment for switching access by a user in an example of the invention. A user selects a different access to a service provider and is switched to the access without the user's connection to their access provider being interrupted. FIG. 45 depicts a flowchart for switching access by a user in an example of the invention. In this embodiment, a user using standard Internet access selects a premiere Internet access during the setup of a service application. There are numerous variations in switching between access paths such as from premiere Internet access path to a lower quality Internet access path, but only one embodiment is shown for the sake of simplicity.

FIG. 45 begins in step 4500. In step 4502, a user through the network device 512 transmits a request using a standard Internet access path through the service network 530 for a service application residing in the network device 562. The service application in the network device 562 receives the request and transmits a query for the quality of service (QOS) Internet access desired by the requester to the network device 512 in step 4504. The service application in the network device 562 then receives and processes a request to switch access to check if the user selected a premium QOS Internet access in step 4516. If the user did not select a premium QOS Internet access, the user and service application exchange packets using the standard Internet access via the network device 512, the access server 524, the service network 530, the access server 554, and the network device 562 in step 4516. The service application in the network device 562 returns the control to the user in step 4514 to select another service application in step 4502.

If the user selects a premium QOS Internet access, the service application in the network device 562 generates and transmits an authentication and authorization instruction for the premium QOS Internet access to the database system 522 to check if the switch of access is allowed. The database system 522 receives and processes the authentication and authorization instruction. The database system 522 then generates and transmits a premium access instruction to establish premium Internet access between the access server 524 and the access server 554 via the service network 540. In one embodiment, the database system 522 transmits the premium access instruction to the service network 540 to establish premium Internet access between the access server 524 and the access server 554. The database system 522 then generates and transmits the premium access instruction to the access server 524 to connect the network device 512 to the service network 540 for the premium Internet access. The database system 522 also generates and transmits the premium access instruction to the access server 554 to connect the network device 562 to the service network 540 for the premium Internet access.

Once the premium Internet access is established, the user and service application exchange packets using the premium Internet access via the network device 512, the access server 524, the service network 540, the access server 554, and the network device 562 in step 4512. The database system 522 then generates and transmits a disconnect instruction to the access server 524, the service network 540, and the access server 554 to tear down the premium Internet access in step 4518. The database system 522 then generates and transmits usage and performance statistics for the service application in the network device 562 in step 4520 before returning to step 4514. In one embodiment, the database system 522 uses a cross connect system 583 to perform the operations disclosed in FIG. 45.

Switching Access by a Service Provider

Figure 46:
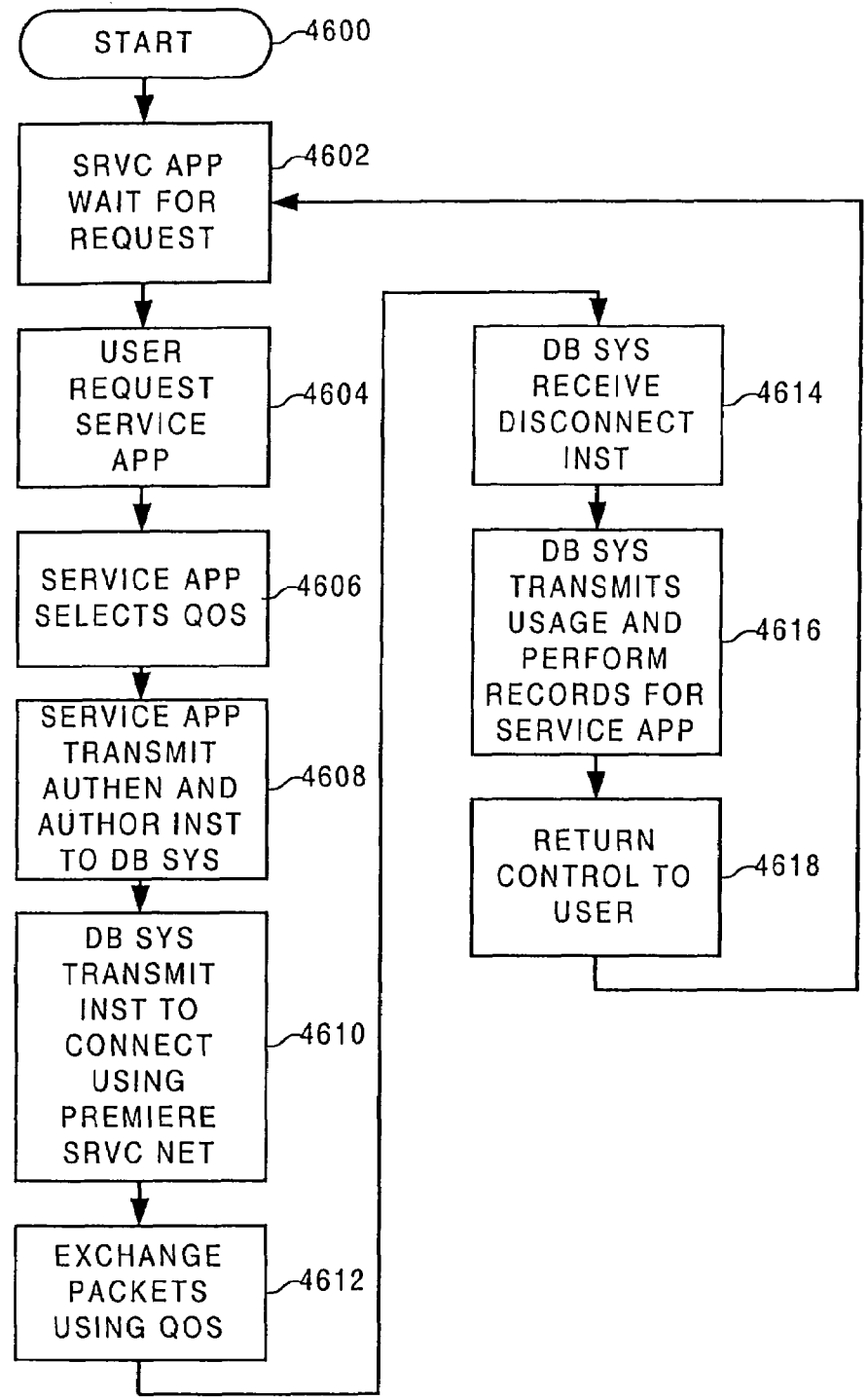
FIG. 46 illustrates a flowchart for switching access by a service provider in an example of the invention.

FIGS. 5 and 46 disclose one embodiment for switching access by a service provider in an example of the invention. The service provider selects a different access to a user and is switched to the access without the user or service provider's connection to their access provider being interrupted. FIG. 46 depicts a flowchart for switching access by a service provider in an example of the invention. In this embodiment, the service provider selects a toll free premiere Internet service for a user using standard Internet access. The service provider pays for the charges in the toll free premium Internet service instead of the user—similar to toll free phone calls.

FIG. 46 begins in step 4600. In step 4602, the service application in the network device 562 waits for a request for a service. The user through the network device 512 transmits a request using a standard Internet access through the service network 530 for the service application in the network device 562 in step 4604. The service application in the network device 562 receives and processes the request. The service application then selects a toll free premiere quality of service (QOS) Internet access to the network device 512 in step 4606. The service application in the network device 562 generates and transmits an authentication instruction to the database system 522 in step 4608. The database system 522 receives and process the authentication instruction. In step 4612, the database system 522 then generates and transmits a premium access instruction to establish the toll free premium Internet access between the access server 524 and the access server 554 via the service network 540.

Once the toll free premium Internet access is established, the user and service application exchange packets using the premium Internet access via the network device 512, the access server 524, the service network 540, the access server 554, and the network device 562 in step 4612. Once the service is completed, the database system 522 then generates and transmits a disconnect instruction to the access server 524, the service network 540, and the access server 554 to tear down the toll free premium Internet access in step 4614. The database system 522 then generates and transmits usage and performance statistics for the service application in the network device 562 in step 4616. Once the service is completed, the service application in the network device 562 returns the control to the user in step 4618 to select another service application in step 4602. In one embodiment, the database system 522 uses the cross connection system 583 to perform the operations disclosed in FIG. 46. In another embodiment, a third party such as the government performs the switching for surveillance or monitoring purposes.

Dynamic Switching Access

Figure 47:
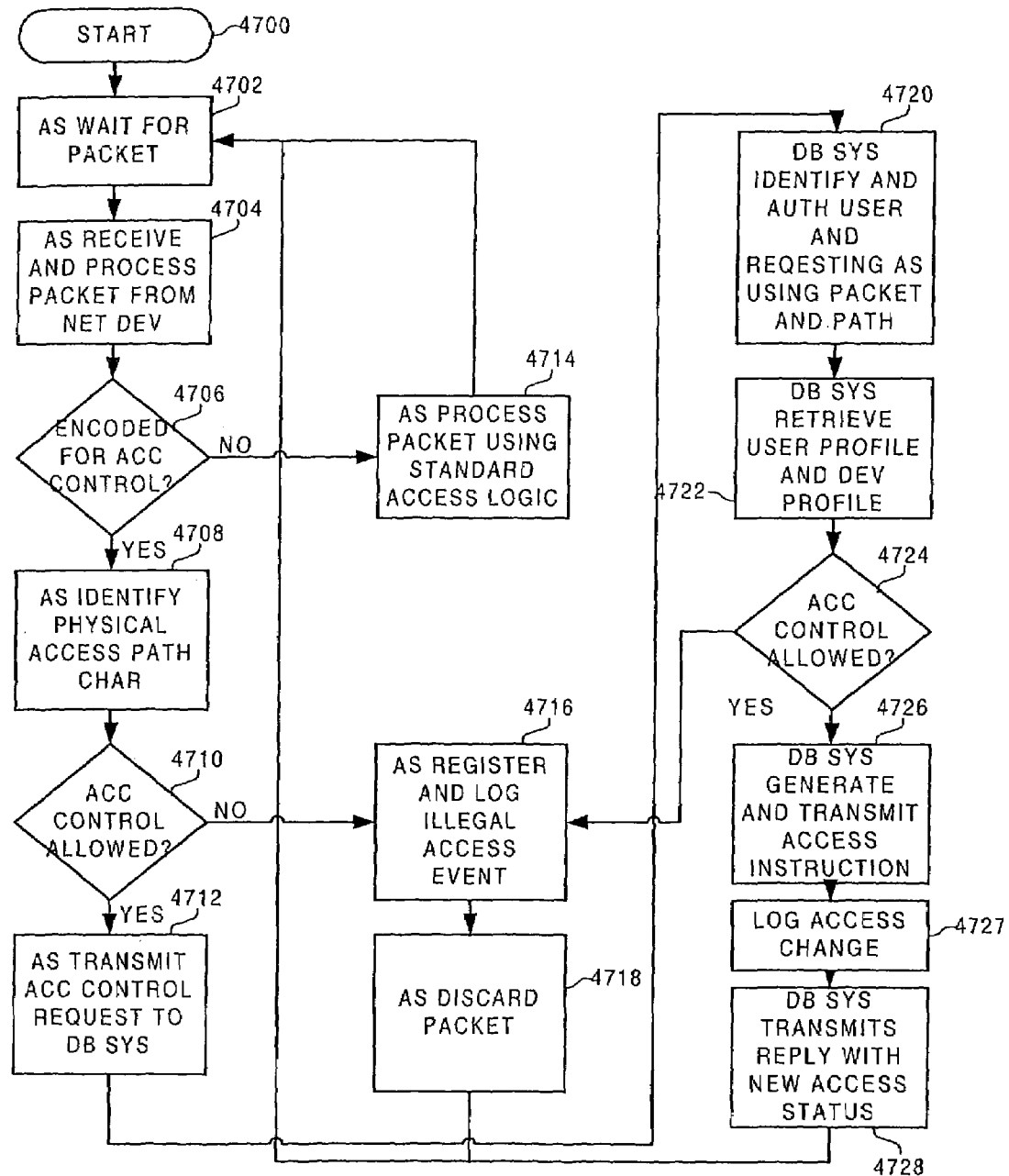
FIG. 47 illustrates a flowchart for dynamic switching access in an example of the invention.

FIGS. 5 and 47 disclose one embodiment for dynamic switching access in an example of the invention. In a prior solution, a single access link from the user network to the access server is linked to a dedicated network in a single access session. However, users need to switch between different networks such as Internet and Intranets without tearing down the existing access session. No other systems allow the access server to be controlled by the data stream the access server is passing. Analog modems monitor the character stream for an escape sequence. The escape sequence notifies the modem that the data is for modem control and not for application data. However, no prior systems have implemented this functionality for a packet data network.

FIG. 47 depicts a flowchart for dynamic switching access in an example of the invention. In this embodiment, a user during an access session may switch networks without having the access session torn down. The access server 524 receives a control instruction from the user to switch from one dedicated service network 530 to another dedicated service network 540. FIG. 47 begins in step 4700. In step 4702, the access server 524 waits for a packet. In this embodiment, a request is in the format of a packet. The access server 524 then receives and processes the packet from the network device 512 in step 4704. The access server 524 checks if the packet is encoded for access control in step 4706. If the packet is not encoded for access control, the access server 524 processes the packet using standard access logic in step 4714 before returning to step 4702.

If the packet is encoded for access control, the access server 524 identifies the physical access path characteristics in step 4708. The access server 524 then checks if the access control is allowed in step 4710. If access control is not allowed, the access server 524 registers and logs an illegal access event in step 4716. The access server 524 then discards the packet in step 4718 before returning to step 4702.

If access control is allowed, the access server 524 generates and transmits an access control instruction to the database system 522 in step 4712. The database system 522 then receives and processes the access control instruction. The database system 522 identifies, authenticates, and authorizes the user and the requesting access server using the packet and path in step 4720. The database system 522 then retrieves the user access profile and the network device profile in step 4722. The database system 522 then checks if access control is allowed for the user and the network device based on the user access profile and the network device profile in step 4724. If access is not allowed, the database system 522 proceeds to step 4716.

If access is allowed, the database system 522 generates and transmits an access instruction to the access server 524 to update the access logic to switch to the service network 540 in step 4726. The databases system 522 logs the access change in step 4727. In one embodiment, the database system 522 logs the access change in the audit system 572. The database system 522 also generates and transmits a reply with the new access status to the network device 512 in step 4728 before returning to step 4702. In one embodiment, the database system 522 uses the cross connect system 583 to perform the operations disclosed in FIG. 47.

Access Network Destination Control—FIGS. 5, 48, 49, 50, 51, 52, 53, 54, 55, 56, 57, 58, and 59

Network Failover

Network devices become unavailable for a various reasons such as busy, failure, or overload. For network failover, when a destination network device is unavailable, network device requests are manually re-routed to a secondary network device. In order to avoid this manual rerouting, one prior art solution is the sharing of a network address between multiple processors in a box or multiple machines in a cluster. However, the requirement of destination and secondary devices residing in the same box or cluster makes this solution unacceptable for large systems.

Another prior art system is Network Address Translation, which translates a private network address to a public network address for a period of time. This system does not provide the capability of a network address to represent multiple failover destinations. Another solution is the Common Object Request Broker Architecture (CORBA), which provides the user a list of potential "logical" network devices to post the network device request. However, the user must implement CORBA interfaces and interactively select back up processes. The transaction context is lost when the primary fails. The user must re-establish the context. Unfortunately, none of these solutions provide an automatic translation from an unavailable destination network device to a secondary network device without operator or user intervention, where the destination and secondary devices are not within the same box or cluster.

Figure 48:
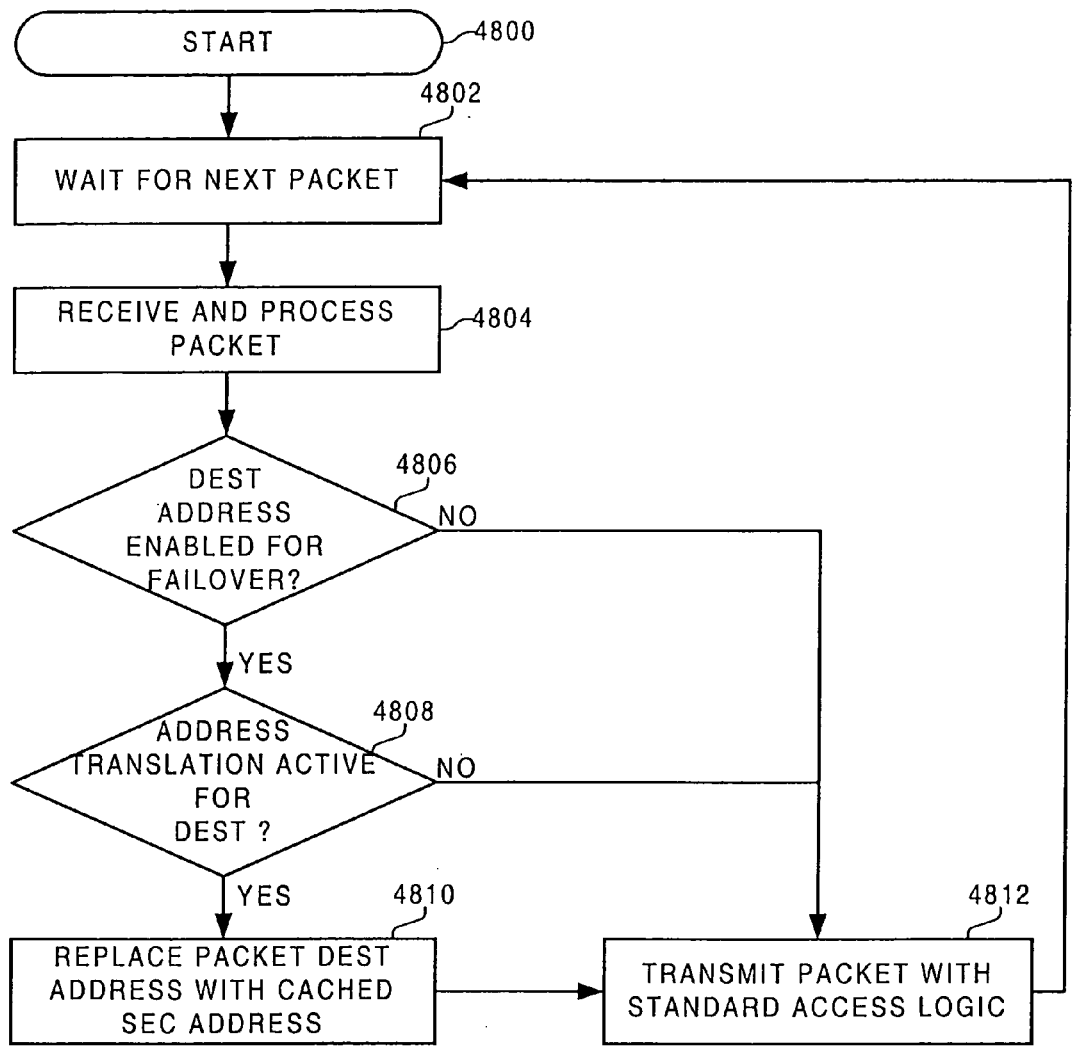
FIG. 48 illustrates a flowchart for an access server for network address failover in an example of the invention.
Figure 49:
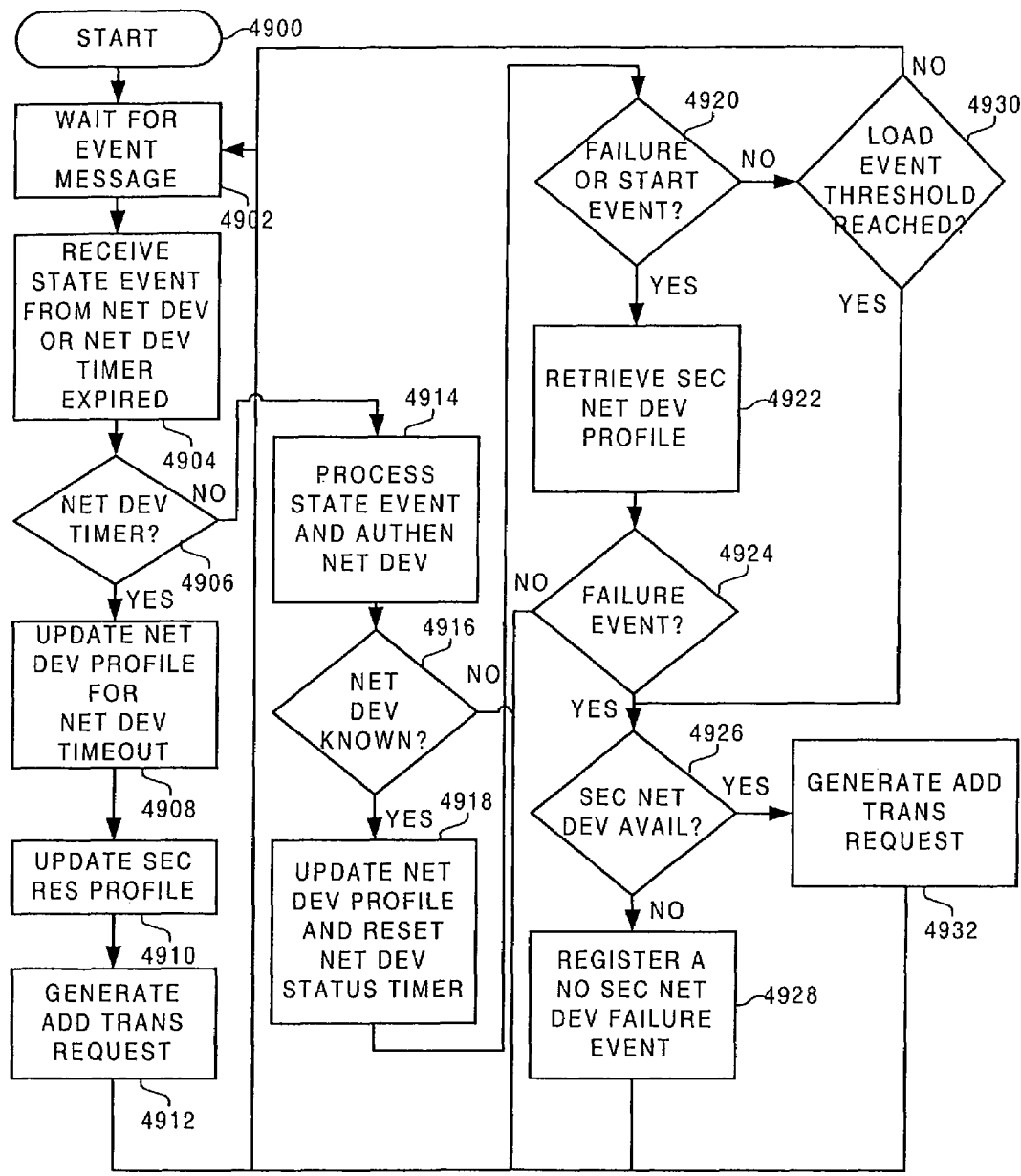
FIG. 49 illustrates a flowchart for a database system for network address failover in an example of the invention.

FIGS. 5, 48 and 49 disclose one embodiment for handling network address failover in an example of the invention. In a failover scenario, a destination network device fails or overloads, which makes the destination network device unavailable, and a secondary network device replicates the destination network device to give the user a fault tolerant appearance of the destination network device. Requests for the destination network device are translated to the secondary network device.

FIG. 48 depicts a flowchart for the access server 554 for network address failover in an example of the invention. FIG. 48 begins in step 4800. In step 4802, the access server 554 waits for the next packet from either the service network 530 or the service network 540. The access server 554 then receives and processes the packet in step 4804. In this embodiment, the access server 554 receives and processes information in the form of a packet. In step 4806, the access server 554 detects that the destination network device 562 fails and checks if the destination network address is enabled for failover in step 4806. If the destination network address is not enabled for failover, the access server 554 transmits the packet with standard access logic to the destination network device 562 in step 4812 before returning to step 4802.

If the destination network address is enabled for failover, the access server 554 checks if an address translation is active for the destination network device 562 in step 4808. If an address translation is not active for the destination network device 562, the access server 554 transmits the packet with standard access logic to the destination network device 562 in step 4812 before returning to step 4802. If an address translation is active for the destination network device 562, the access server 554 processes the packet to replace the destination network address with the secondary network address that is cached for the destination network address for failover in step 4810. The access server 554 then transmits the packet with standard access logic to the secondary network device 564 in step 4812 before returning to step 4802.

FIG. 49 depicts a flowchart for the database system 522 for network address failover in an example of the invention. FIG. 49 begins in step 4900. In step 4902, the database system 522 waits for a state event message or a timer event from a network device in the user network 560. The database system 522 receives a state event message from the destination network device 562 or a network device timer expires in step 4904. The database system 522 checks if the network device timer expired in step 4906.

If the network device timer expired, the database system 522 retrieves and updates the destination network device's 562 profile with availability and performance statistics to reflect a network device timeout in step 4908. The database system 522 then retrieves and updates and the secondary network device's 564 profile to indicate that the destination network device 562 is unavailable in step 4910. In step 4912, the database system 522 generates and transmits an address translation request message to the access server 554 to change packets' destination network address to the secondary network address.

If the network device timer has not expired, the database system 522 processes the state event message and authenticates the destination network device 562 in step 4914. In step 4916, the database system 522 checks if the destination network device 562 is known. If the destination network device 562 is not known, the database system 522 generates and transmits an unknown resource event before returning to step 4902. If the destination network device 562 is known, the database system 522 retrieves and updates the destination network device's 562 profile with availability and performance statistics in step 4918. The database system 522 also resets the network device timer. The database system 522 then checks if the state event message is a failure or start event in step 4920.

If the state event message is not a failure or start event, the database system 522 checks if the load event threshold for the destination network device 562 is reached in step 4930. If the load event threshold is not reached, the database system 522 returns to step 4902. If the load event threshold is reached, the database system 522 proceeds to step 4926.

If the state event message is a failure or start event, the database system 522 retrieves and updates the secondary network device's 564 profile in step 4922. In step 4924, the database system 522 checks if the state event message is a failure event. If the state event message is not a failure event, the database system 522 generates new active device profiles and then returns to step 4902. If the state event message is a failure event, the database system 522 proceeds to step 4926.

In step 4926, the database system 522 checks if the secondary network device 564 is available. If the secondary network device 564 is available, the database system 522 generates and transmits an address translation request message to the access server 554 to change packets' destination network address to the secondary network address in step 4932 before returning to step 4902. If the secondary network device 564 is not available, the database system 522 registers a no secondary network device failure event in step 4928 before returning to step 4902. In one embodiment, the database system 522 uses the availability database system 594 to perform the operations disclosed in FIG. 49.

Network Busy Forwarding

Figure 50:
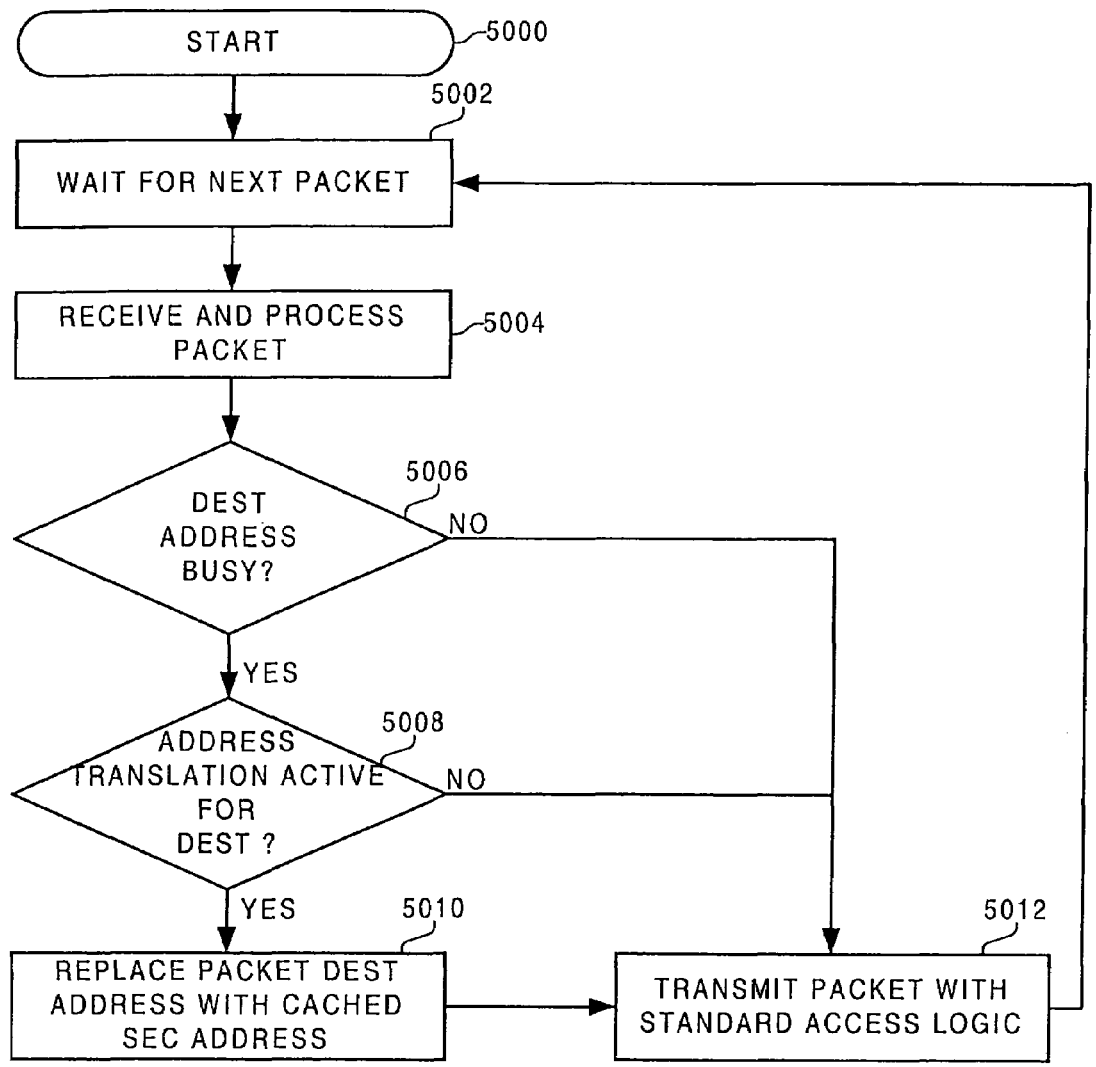
FIG. 50 illustrates a flowchart for an access server for network busy forwarding in an example of the invention.
Figure 51:
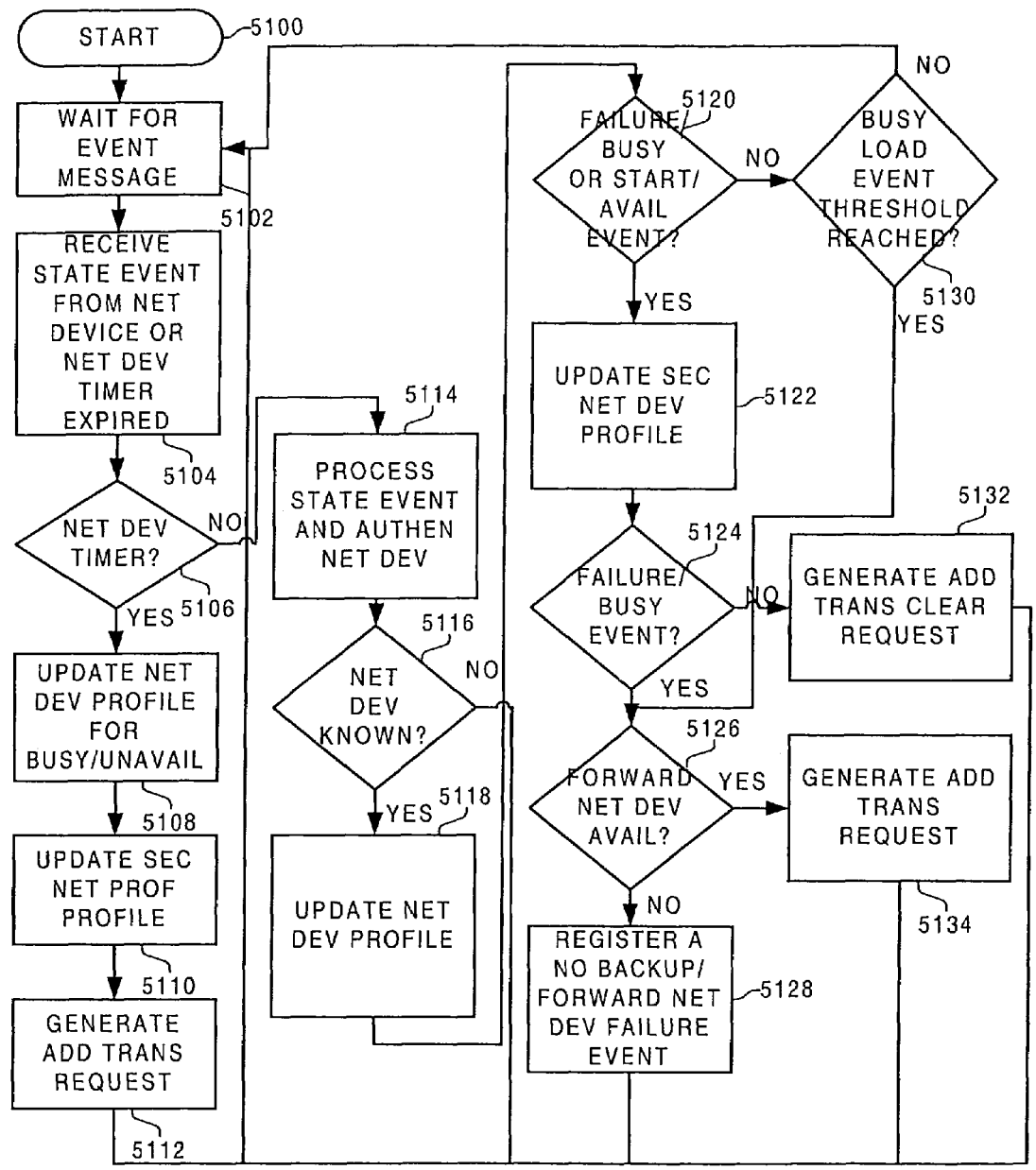
FIG. 51 illustrates a flowchart for a database system for network busy forwarding in an example of the invention.

In a Public Switched Telephone Network (PSTN), a busy signal is sent to the caller when the called number destination is busy and thus unavailable. The caller can then select alternate actions such as delaying, retrying, or re-routing the request. Unfortunately, the PSTN handling of busy calls has not been applied to network devices in a data network. FIGS. 5, 50 and 51 disclose one embodiment for network busy forwarding in an example of the invention. When a destination network device 562 is busy, an access server 554 forwards the packets to a secondary network device 564. Requests for the destination network device are translated to the secondary network device.

FIG. 50 depicts a flowchart for the access server 554 for network busy forwarding in an example of the invention. FIG. 50 begins in step 5000. In step 5002, the access server 554 waits for the next packet from either the service network 530 or the service network 540. The access server 554 then receives and processes the packet in step 5004. In this embodiment, the access server 554 receives and processes information in the form of a packet. In step 5006, the access server 554 checks if the destination network device 562 is busy. If the destination network device 562 is not busy, the access server 554 transmits the packet with standard access logic to the destination network device 562 in step 5012 before returning to step 5002.

If the destination network device 562 is busy, the access server 554 checks if an address translation is active for the destination network device 562 in step 5008. If an address translation is not active for the destination network device 562, the access server 554 transmits the packet with standard access logic to the destination network device 562 in step 5012 before returning to step 5002. If an address translation is active for the destination network device 562, the access server 554 processes the packet to replace the destination network address with the secondary network address that is cached for the destination network address for failover in step 5010. The access server 554 then transmits the packet with standard access logic to the secondary network device 564 in step 5012 before returning to step 5002.

FIG. 51 depicts a flowchart for the database system 522 for network busy forwarding in an example of the invention. FIG. 51 begins in step 5100. In step 5102, the database system 522 waits for a state event message from a network device in the user network 560. The database system 522 receives a state event message from the destination network device 562 or the network device timer expired in step 5104. The database system 522 checks if a network device timer expired in step 5106.

If a network device timer expired, the database system 522 retrieves and updates the destination network device's 562 profile with availability and performance statistics to reflect a network device timeout such as the network device being busy or unavailable in step 5108. The database system 522 then retrieves and updates and the secondary network device's 564 profile to indicate that the destination network device 562 is busy or unavailable in step 5110. The database system 522 also resets the network device timer. In step 5112, the database system 522 generates and transmits an address translation request message to the access server 554 to change packets' destination network address to the secondary network address.

If the network device timer is not expired, the database system 522 processes the state event message and authenticates the destination network device 562 in step 5114. In step 5116, the database system 522 checks if the destination network device 562 is known. If the destination network device 562 is not known, the database system 522 generates and transmits an unknown resource event before returning to step 5102. If the destination network device 562 is known, the database system 522 retrieves and updates the destination network device's 562 profile with availability and performance statistics in step 5118. The database system 522 then checks if the state event message is a failure/busy or start/available event in step 5120.

If the state event message is not a failure/busy or start/available event, the database system 522 checks if the busy load event threshold for the destination network device 562 is reached in step 5130. If the load event threshold is not reached, the database system 522 returns to step 5102. If the load event threshold is reached, the database system 522 proceeds to step 5126.

If the state event message is a failure/busy or start/available event, the database system 522 retrieves and updates the secondary network device's 564 profile in step 5122. In step 5124, the database system 522 checks if the state event message is a failure/busy event. If the state event message is not a failure/busy event, the database system 522 generates an address translation clear request in step 5132 before returning to step 5102. The address translation clear request adds a new active device profile or clears the existing translation. If the state event message is a failure/busy event, the database system 522 proceeds to step 5126.

In step 5126, the database system 522 checks if the secondary network device 564 is available. If the secondary network device 564 is available, the database system 522 generates and transmits an address translation request message to the access server 554 to change packets' destination network address to the secondary network address if a busy translation exists in the destination network device's 562 profile in step 5134 before returning to step 5102. If the secondary network device 564 is not available, the database system 522 registers a no secondary network device failure event and transmit a busy message to the user in step 5128 before returning to step 5102. In one embodiment, the database system 522 uses the availability database system 594 to perform the operations disclosed in FIG. 51.

Busy Flag

Figure 52:
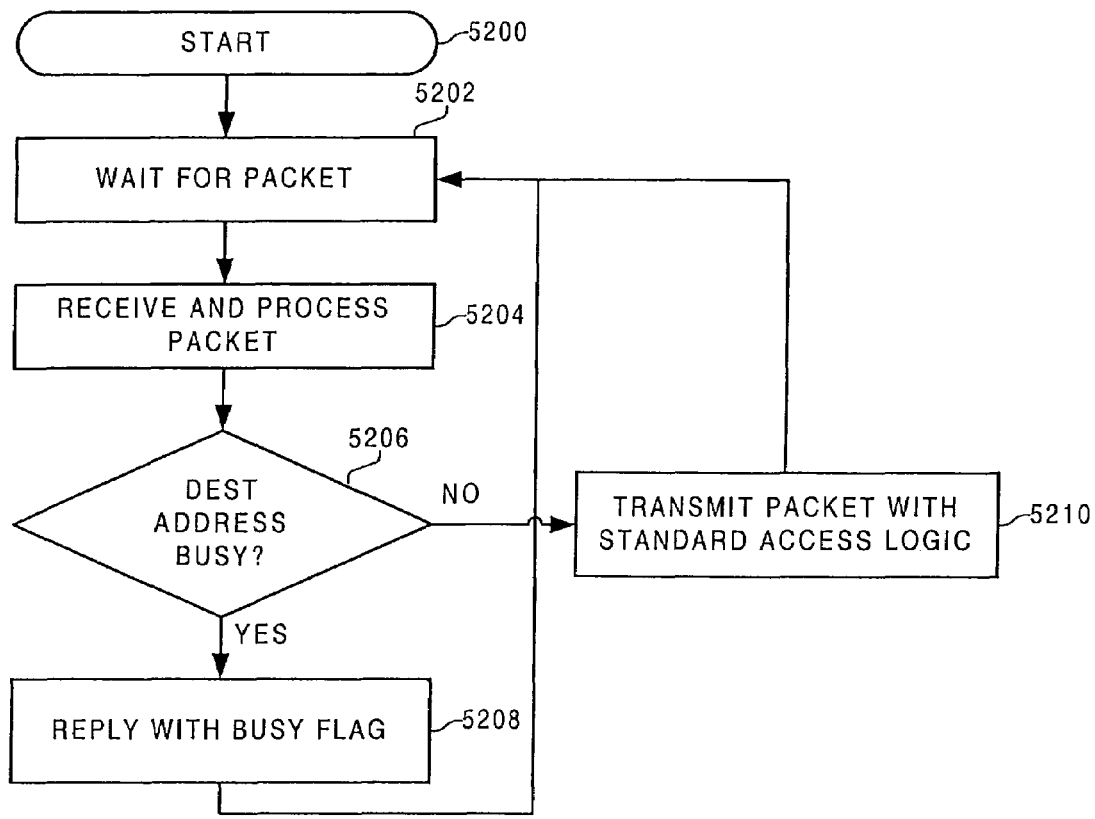
FIG. 52 illustrates a flowchart for an access server for a busy flag when the destination network device is busy in an example of the invention.

FIGS. 5 and 52 disclose one embodiment for a busy flag when the destination network device is busy in an example of the invention. When a destination network device 562 is busy and thus unavailable, an access server 554 replies to the user with a busy flag. FIG. 52 depicts a flowchart for the access server 554 for a busy flag when the destination network device is busy in an example of the invention. In one embodiment, the busy flag is a busy screen in Hyper-Text Markup Language. FIG. 52 begins in step 5200. In step 5204, the access server 554 waits for the next packet from either the service network 530 or the service network 540. The access server 554 then receives and processes the packet in step 5204. In this embodiment, the access server 554 receives and processes information in the form of a packet. In step 5206, the access server 554 checks if the destination network device 562 is busy. If the destination network device 562 is not busy, the access server 554 transmits the packet with standard access logic to the destination network device 562 in step 5210 before returning to step 5202. If the destination network device 562 is busy, the access server 554 replies to the user with a busy flag in step 5208 before returning to step 5002.

Timeout

Figure 53:
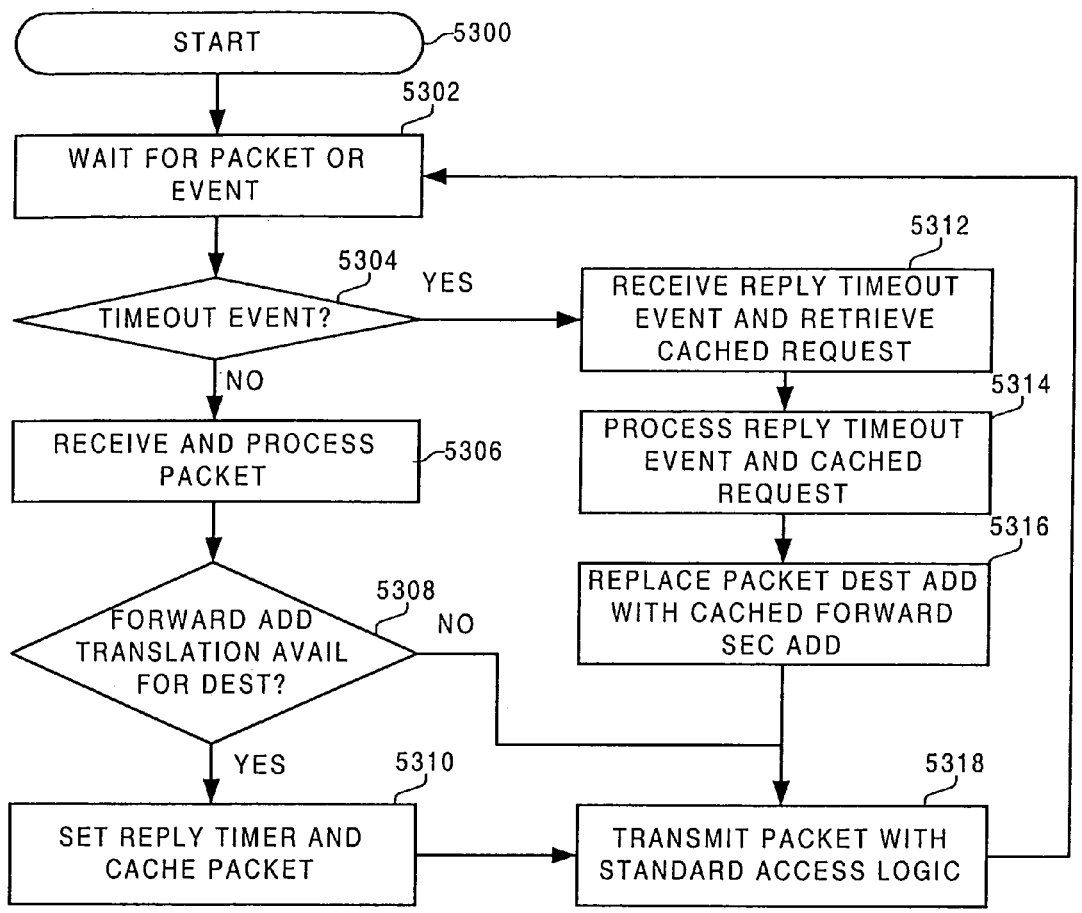
FIG. 53 illustrates a flowchart for an access server for forwarding if the destination network device timeouts in an example of the invention.

FIGS. 5 and 53 disclose one embodiment for forwarding if the destination network device times out in an example of the invention. In this embodiment, a destination network device 562 receives a request packet from a user but fails to reply to the user within a pre-determined time. The failure to reply within a pre-determined time indicates the destination network device 562 is unavailable. The access server 554 then redirects the packet to a secondary network device 564 to handle forwarding when the destination network device fails to respond with the pre-determined time.

FIG. 53 depicts a flowchart for the access server 554 for forwarding if the destination network device times out in an example of the invention. FIG. 53 begins in step 5300. In step 5302, the access server 554 waits for the next packet or event. The access server 554 then checks whether a reply timeout event is received in step 5304. If a reply timeout event is not received, the access server 554 then receives and processes the packet in step 5306. In this embodiment, the access server 554 receives and processes information in the form of a packet. In step 5308, the access server 554 checks if an address translation is available for the destination network device 562. If an address translation is not available for the destination network device 562, the access server 554 transmits the packet with standard access logic to the destination network device 562 in step 5318 before returning to step 5302. If an address translation is available for the destination network device 562, the access server 554 sets a reply timer and caches the packet for the secondary network device 564. The access server 554 then transmits the packet with standard access logic to the destination network device 564 in step 5318 before returning to step 5302.

In step 5312, the access server 554 receives the reply timeout event and retrieves the cached request. The access server 554 then processes the reply timeout event and the cached request in step 5314. In step 5315, the access server 554 then replaces the packet's destination network address with the cached secondary network address. The access server 554 then transmits the packet to the secondary network device 564 with the standard access logic in step 5318 before returning to step 5302. In one embodiment, upon reply, the access server 554 deletes the cached packet copy.

Scheduled Alias Resolution

Network devices become unavailable for various reasons such as busy, failure, or overload. Also, service provider need to utilize network resources to improve efficiency and avoid network device latency. In voice telephony signaling networks, an SS7 SCP or an automatic call distributor (ACD) distributes calls to end user call centers. The SCP receives a 800 TCAP query and performs a database lookup to translate the 800 telephone number into a destination telephone number. The SCP may use the requester information and the time of day to perform the database lookup. Some problems with this system are SS7 signaling must be used and the system is limited by voice network constraints. Also, the phone numbers only allow numeric numbers for aliases. In data networks, prior art known as Object Request Brokers (ORB) in a Common Object Request Broker Architecture (CORBA) advertise process resources to a requester. The ORB also registers multiple instances of the same type of process resource.

Figure 54:
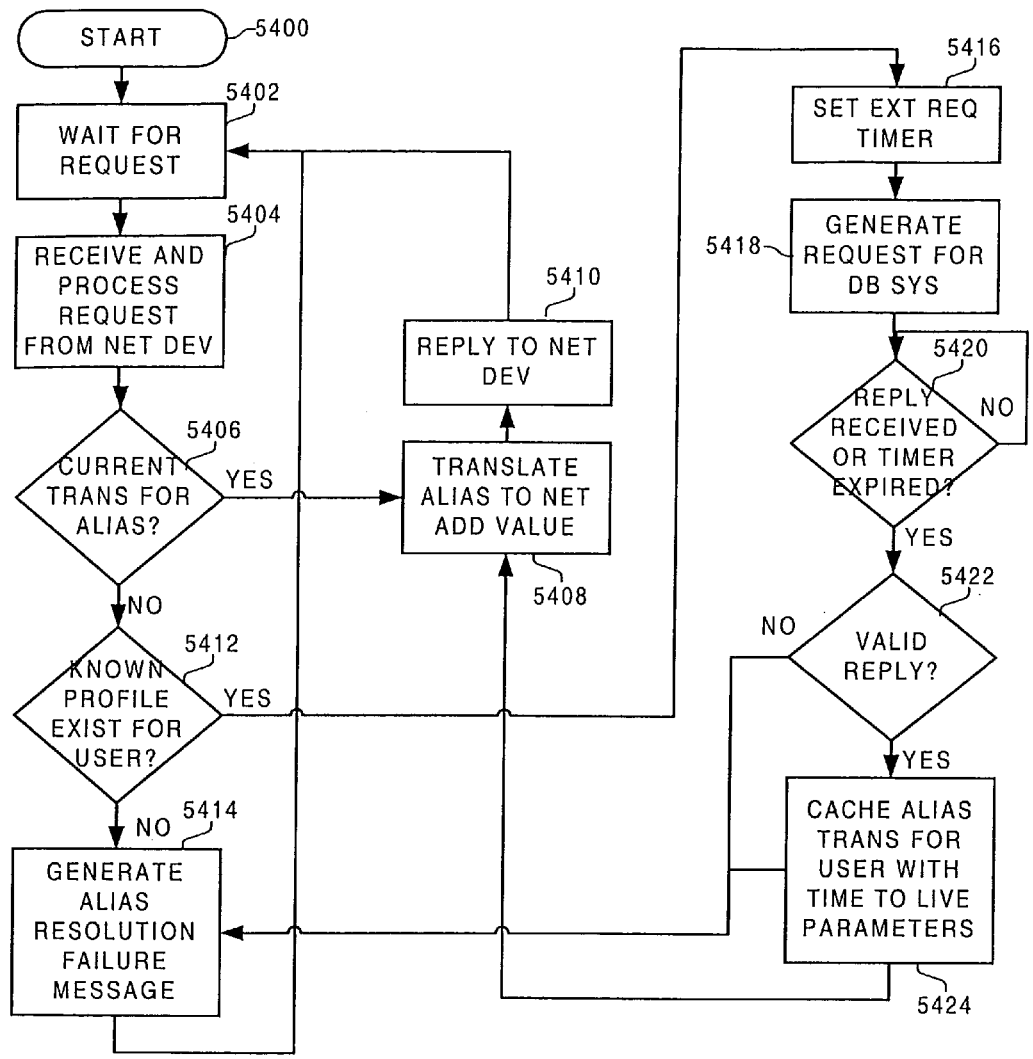
FIG. 54 illustrates a flowchart for an access server for schedule alias resolution in an example of the invention.
Figure 55:
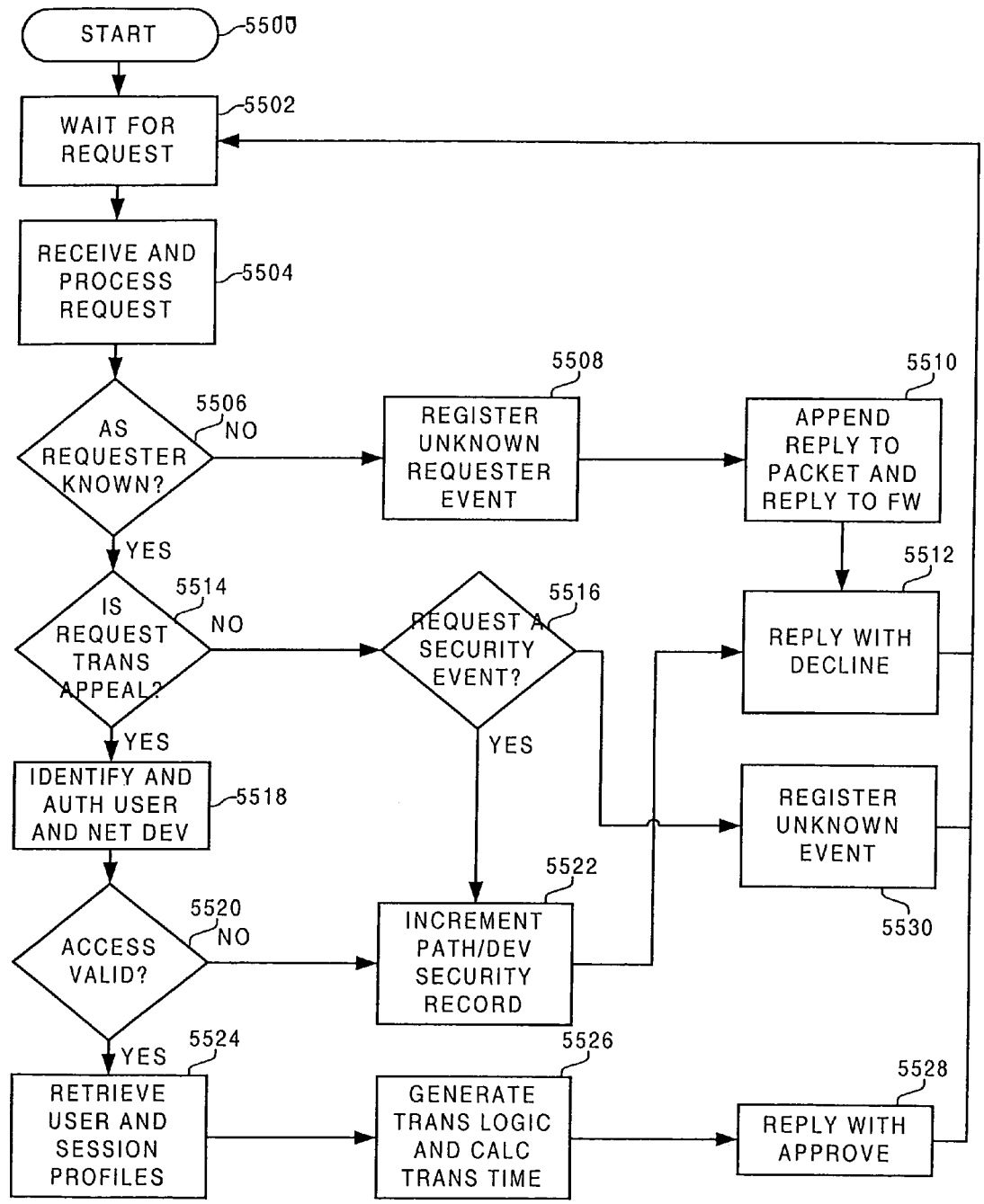
FIG. 55 illustrates a flowchart for a database system for scheduled alias resolution in an example of the invention.

FIGS. 5, 54, and 55 disclose one embodiment for scheduled alias resolution in an example of the invention. In this embodiment, an alias, domain name/local name, network address, or macro for a network resource is translated to another alias for another network resource based on a configurable schedule. Advantageously, load balancing of network devices is improved by scheduling different alias resolutions for different times/conditions. One problem with CORBA is the requester and resources must implement CORBA interfaces. Scheduled alias resolution is compatible with existing data network DNS implementations. Also, the load balancing, security, and failover may be based on the user access profile and the network device state.

FIG. 54 depicts a flowchart for the access server 554 for schedule alias resolution in an example of the invention. FIG. 54 begins in step 5400. In step 5402, the access server 554 waits for the next request. The access server 554 then receives and processes a the request from the network device 512 in step 5404. In this embodiment, the information including an alias is in the form of a request. In step 5406, the access server 554 checks if a current translation for the alias exists. If a current translation for the alias exists, the access server 554 translates the alias to the appropriate network address for a network device in user network 560 in step 3608. The access server 554 then replies to the network device 512 in step 5410 before returning to step 5402.

If a current translation for the alias does not exist, the access server 554 checks if a known access profile exists in the database system 522 exists for this user in step 5412. If a known access profile does not exist in the database system 522 for the user, the access server 554 generates and transmits an alias resolution failure message to the network device 512 in step 5414 before returning to step 5402. If a known access profile does exist in the database system 522 for the user, the access server 554 sets an external request timer in step 5416. The access server 554 then generates and transmits an alias translation request to the database system 522 in step 5418. The access server 554 then checks if a reply is received or the external request timer is expired in step 5420. If the reply is not received or the external request timer is not expired, the access server 554 returns to step 5420. If the reply is received or the external request timer is expired, the access server 554 checks if the reply was valid in step 5422. If the reply is invalid, the access server 554 returns to step 5414. If the reply is valid, the access server 554 then caches the alias translation for this user with time to live parameters in step 5424 before returning to step 5408.

FIG. 55 depicts a flow chart for the database system 522 for scheduled alias resolution in an example of the invention. FIG. 55 begins in step 5500. In step 5502, the database system 522 waits for a request. The database system 522 then receives and processes the request from the access server 554 in step 5504. In step 5506, the database system 522 then checks if the access server requester is known in step 5506. If the access server requester is not known, the database system 522 then registers an unknown requester event in step 5508. The database system 522 appends the reply to the packet and transmits the reply to the access server 554 in step 5510. The database system 522 replies with a decline message to the access server 554 in step 5512 before returning to step 5502.

If the access server requester is known, the database system 522 then checks whether the request is a translation appeal in step 5514. If the request is not a translation appeal, the database system 522 checks if the request is a security event in step 5516. If the request is a security event, the database system 522 increments a path/device security record in step 5522 before returning to step 5512. If the request is not a security event, the database system 522 registers an unknown event in step 5530 before returning to step 5502. If the request is a translation appeal, the database system 522 identifies and authenticates the user and the network device 512 in step 5518. If the access is not valid, the database system 522 returns to step 5522. If the access is valid, the database system 522 retrieves the user and network device's 512 profiles in step 5524. The database system 522 then generates the translation logic and calculates the translation time to live in step 5526. The database system 522 then appends the translation logic and the translation time to a reply to the access server 554. The database system 522 then replies with an approve message to the access server 554 in step 5528.

Forwarding

Figure 56:
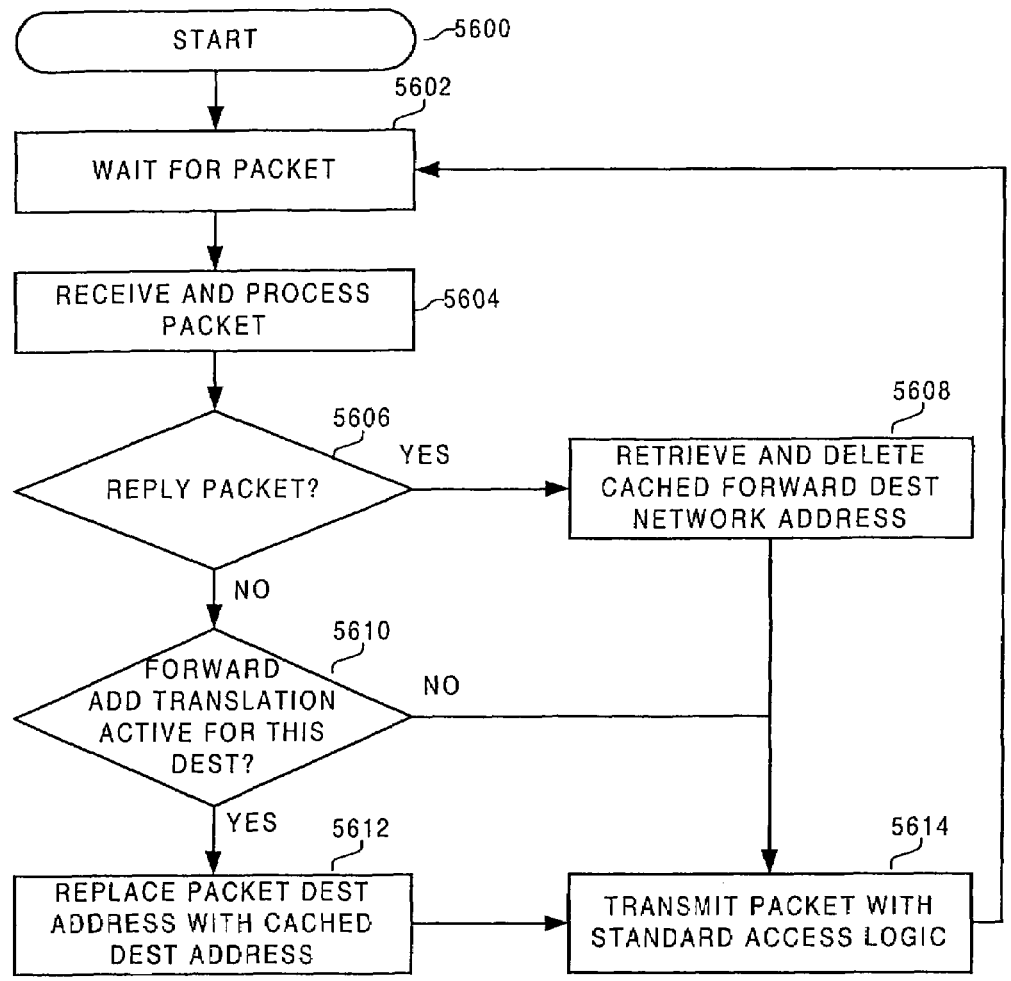
FIG. 56 illustrates a flowchart for an access server for destination controlled forwarding in an example of the invention.
Figure 57:
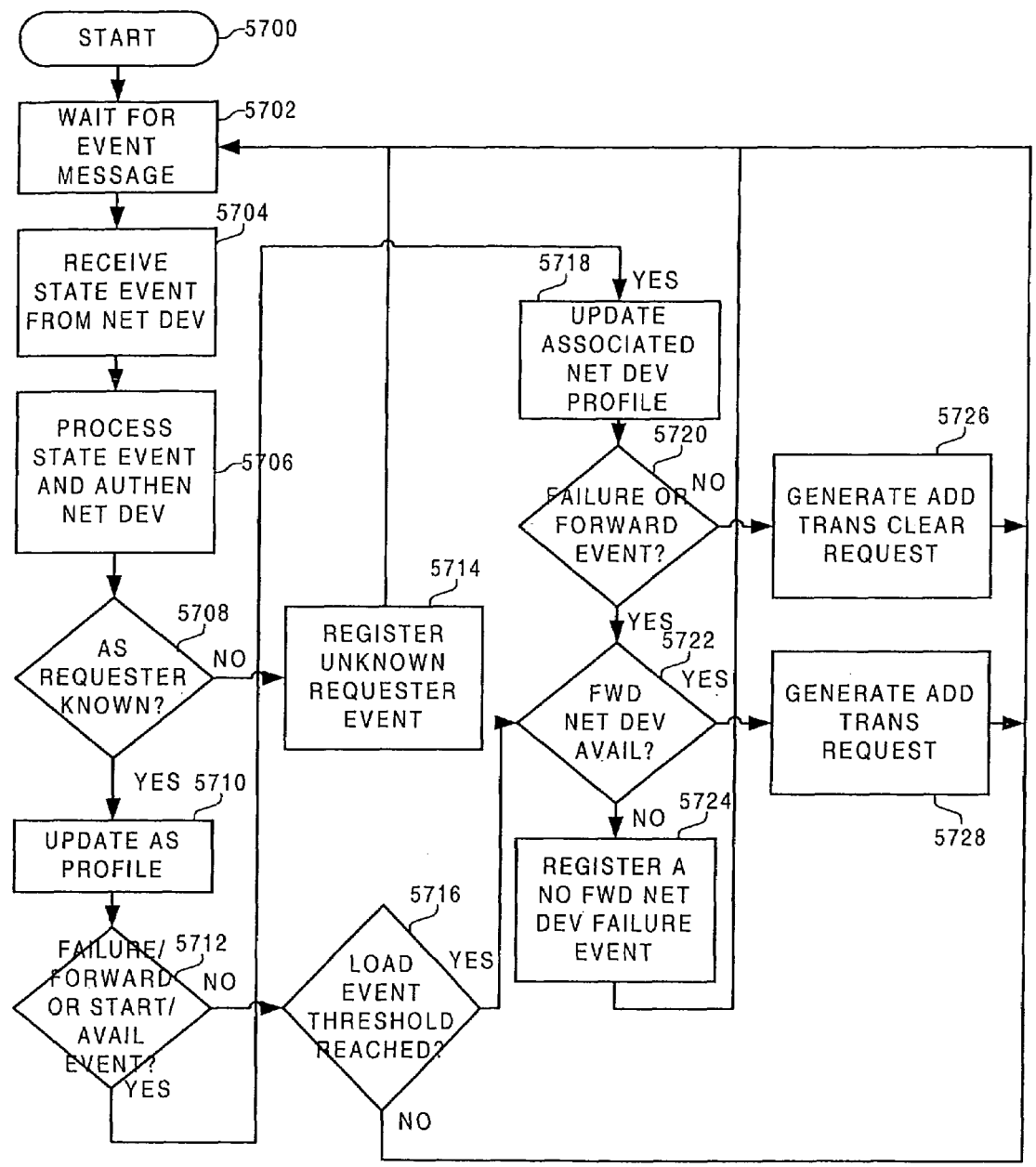
FIG. 57 illustrates a flowchart for a database system for destination controlled forwarding in an example of the invention.

In a PSTN, a person may forward calls from their original phone number to another phone number where the person may be reached. Unfortunately, the PSTN handling of call forwarding has not been applied to network devices in a data network. FIGS. 5, 56 and 57 disclose one embodiment for destination controlled forwarding in an example of the invention. An access server 554 forwards the packets for a destination network device 562 that is unavailable to a secondary network device 564. Requests for the destination network device 562 are translated to the secondary network device 564.

FIG. 56 depicts a flowchart for the access server 554 for destination controlled forwarding in an example of the invention. FIG. 56 begins in step 5600. In step 5602, the access server 554 waits for the next packet from either the service network 530 or the service network 540. The access server 554 then receives and processes the packet in step 5604. In this embodiment, the access server 554 receives and processes information in the form of a packet. The access server 554 then checks if the packet is a reply in step 5606. If the packet is a reply, the access server 554 retrieves and deletes the cached destination network address in step 5608 before proceeding to step 5614.

If the packet is not a reply, the access server 554 checks if an address translation is active for the destination network device 562 in step 5610. If an address translation is not active for the destination network device 562, the access server 554 transmits the packet with standard access logic to the destination network device 562 in step 5614 before returning to step 5602. If an address translation is active for the destination network device 562, the access server 554 processes the packet to replace the destination network address with the secondary network address that is cached for the destination network address for destination controlled forwarding in step 5612. The access server 554 then transmits the packet with standard access logic to the secondary network device 564 in step 5614 before returning to step 5602.

FIG. 57 depicts a flowchart for the database system 522 for destination controlled forwarding in an example of the invention. FIG. 57 begins in step 5700. In step 5702, the database system 522 waits for a state event message from a network device in the user network 560. The database system 522 receives a state event message from the destination network device 562 or a network device timer expires in step 5704.

The database system 522 processes the state event message and authenticates the destination network device 562 in step 5706. In step 5708, the database system 522 checks if the access server requester is known. If the access server requester is not known, the database system 522 generates and transmits an unknown requester event before returning to step 5702. If the access server requester is known, the database system 522 retrieves and updates the access server's 554 profile with availability and performance statistics in step 5710. The database system 522 then checks if the state event message is a failure/forward or start/available event in step 5712.

If the state event message is not a failure/forward or start/available event, the database system 522 checks if the busy load event threshold for the destination network device 562 is reached in step 5716. If the load event threshold is not reached, the database system 522 returns to step 5702. If the load event threshold is reached, the database system 522 proceeds to step 5722.

If the state event message is a failure/forward or start/available event, the database system 522 retrieves and updates the secondary network device's 564 profile in step 5718. In step 5720, the database system 522 checks if the state event message is a failure/forward event. If the state event message is not a failure/forward event, the database system 522 generates and transmits an address translation clear request message to the access server 554 in step 5726 before returning to step 5702. If the state event is a start event, then a new availability profile is generated. If the state event message is a failure/busy event, the database system 522 proceeds to step 5722.

In step 5722, the database system 522 checks if the secondary network device 564 is available. If the secondary network device 564 is available, the database system 522 generates and transmits an address translation request message to the access server 554 to change packets' destination network address to the secondary network address if a busy translation exists in the destination network device's 562 profile in step 5728 before returning to step 5702. If the secondary network device 564 is not available, the database system 522 registers a no secondary network device failure event and transmit a busy message to the user in step 5724 before returning to step 5702. In one embodiment, the database system 522 uses the availability database system 594 to perform the operations disclosed in FIG. 57.

Network Endpoint Availability Management

Figure 58:
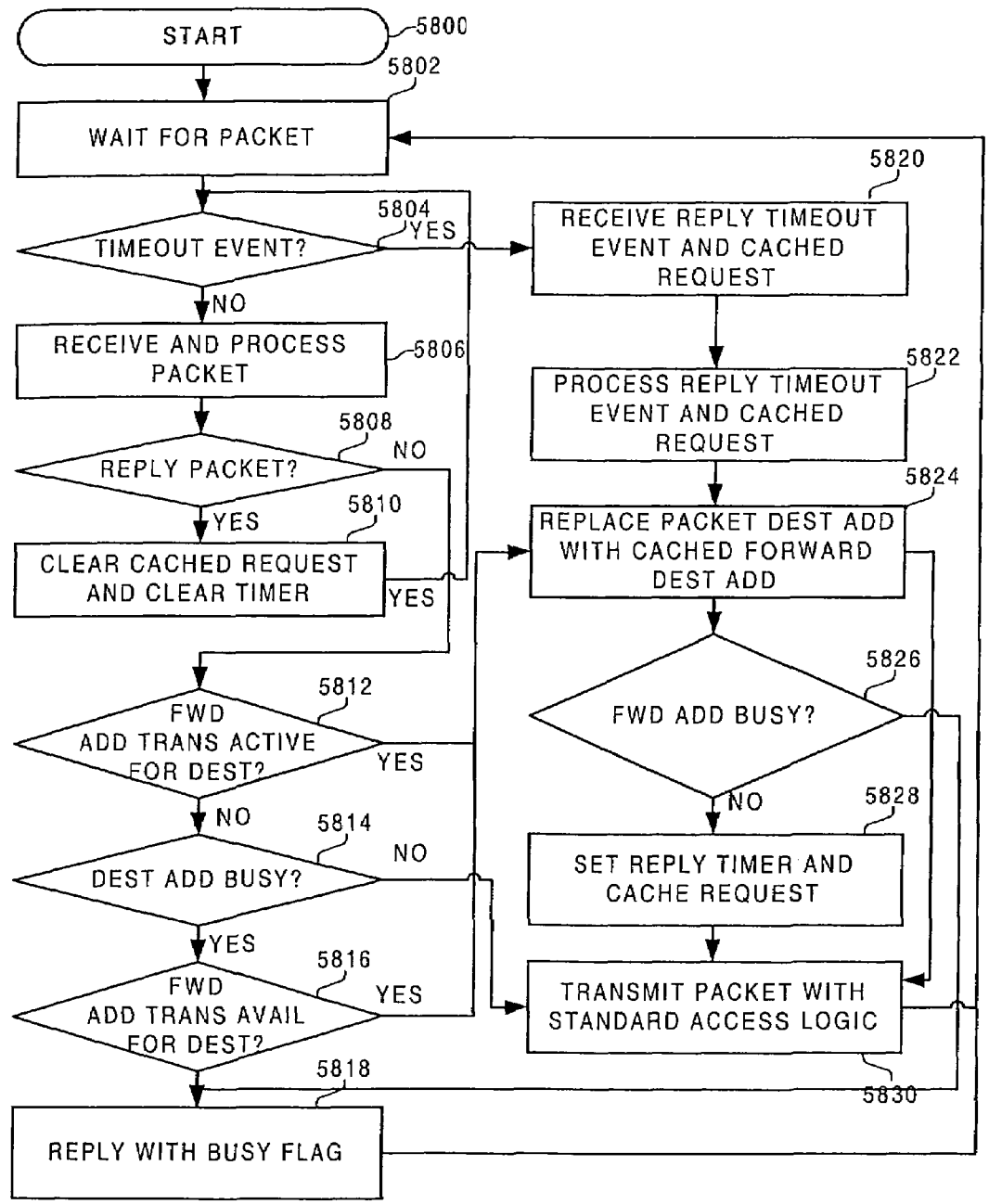
FIG. 58 illustrates a flowchart for an access server for network endpoint availability management in an example of the invention.
Figure 59:
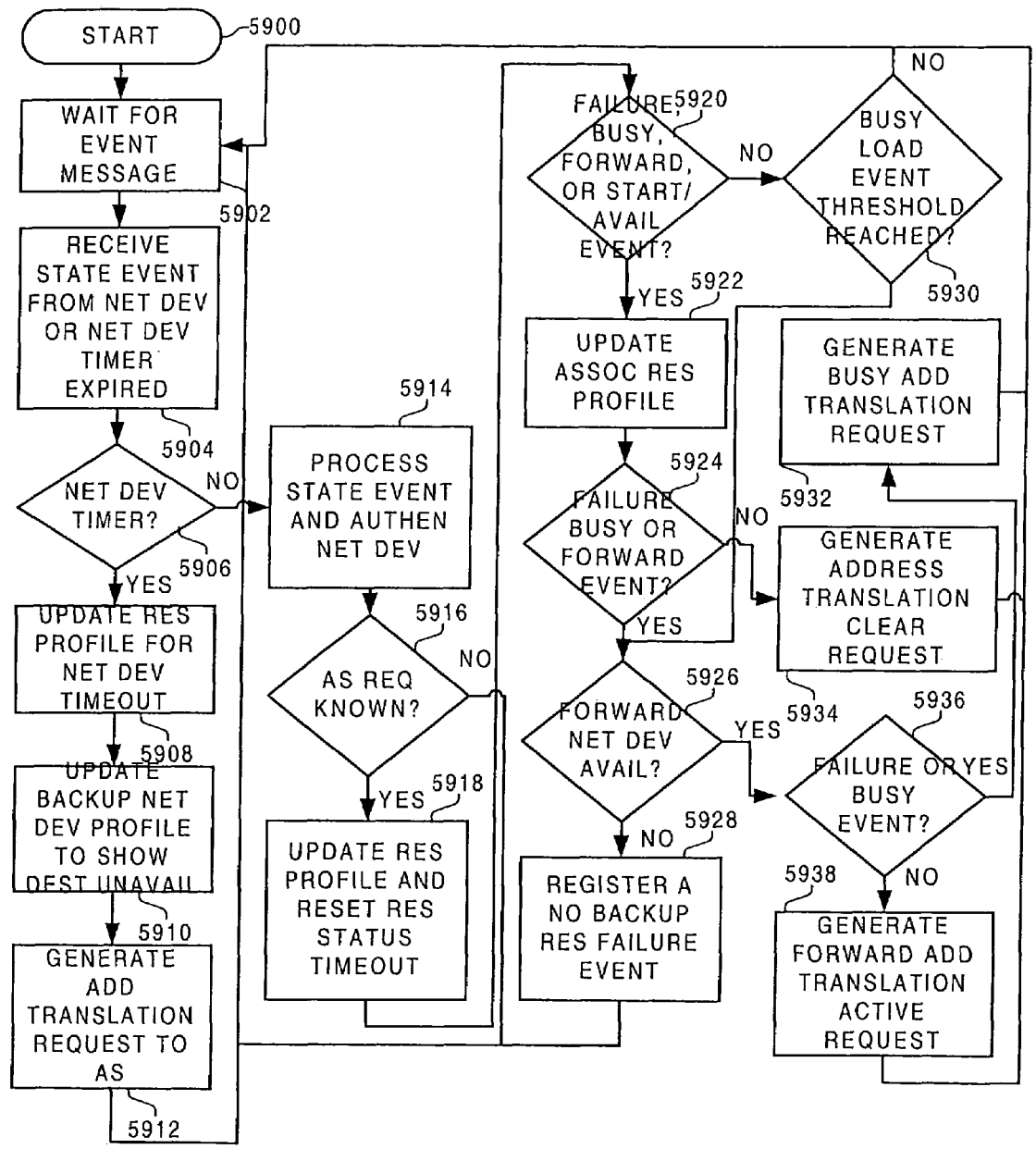
FIG. 59 illustrates a flowchart for a database system for network endpoint availability management in an example of the invention.

FIGS. 5, 58, and 59 disclose one embodiment for network endpoint availability management in an example of the invention. The features of failover, busy, busy flag, timeout, and forwarding are combined into this embodiment. FIG. 58 depicts a flowchart for the access server 554 network endpoint availability management in an example of the invention. FIG. 58 begins in step 5800. In step 5802, the access server 554 waits for the next packet or event. The access server 554 then checks whether a reply timeout event is received in step 5804.

If a reply timeout event is not received, the access server 554 then receives a data packet and processes the packet in step 5806. In this embodiment, the access server 554 receives and processes information in the form of a packet. In step 5808, the access server 554 checks if the packet is a reply. If the packet is a reply, the access server 554 clears the cached request and clears a reply timer in step 5810 before returning to step 5804. If the packet is not a reply, the access server 554 checks if an address translation is active for the destination network device 562 in step 5812. If an address translation is active for the destination network device 562, the access server 554 proceeds to step 5824. If an address translation is not active for the destination network device 562, the access server 554 checks if the destination address is busy. If the destination address is not busy, the access server 554 proceeds to step 5830. If the destination address is not busy, the access server 554 checks if a forward address translation is available in step 5814. If the forward address translation is not available, replies to the user with a busy flag in step 5818 before returning to step 5802. If the forward address translation is available, the access server 554 proceeds to step 5824.

If a reply timeout event is received, the access server 554 receives the reply timeout event and the cached request in step 5820. The access server 554 then processes the reply timeout event and the cached request in step 5822. In step 5824, the access server 554 then replaces the packet's destination network address with the cached secondary network address. The access server 554 then transmits the packet to the secondary network device 564 with the standard access logic in step 5824.

In step 5826, the access server 554 checks if the forward address is busy. If the forward address is busy, the access server 554 returns to step 5818. If the forward address is not busy, the access server 554 sets a reply timer and caches the request in step 5828. In step 5830, the access server 554 then transmits the packet with standard access logic before returning to step 5802.

FIG. 59 depicts a flowchart for the database system 522 for network endpoint availability management in an example of the invention. FIG. 59 begins in step 5900. In step 5902, the database system 522 waits for a state event message from a network device in the user network 560. The database system 522 receives the state event message from the destination network device 562 or the network device timer expired in step 5904. The database system 522 checks if the network device timer expired in step 5906.

If the network device timer expired, the database system 522 retrieves and updates the destination network device's 562 profile with availability and performance statistics to reflect a network device timeout such as the network device being busy or unavailable in step 5908. The database system 522 then retrieves and updates and the secondary network device's 564 profile to indicate that the destination network device 562 is busy or unavailable in step 5910. The database system 522 also resets the network device timer. In step 5912, the database system 522 generates and transmits an address translation request message to the access server 554 to change packets' destination network address to the secondary network address.

If the network device timer has not expired, the database system 522 processes the state event message and authenticates the destination network device 562 in step 5914. In step 5916, the database system 522 checks if the access server requester is known. If the access server requester is not known, the database system 522 generates and transmits an unknown resource event before returning to step 5902. If the access server requester is known, the database system 522 retrieves and updates the access server's 554 profile with availability, activity logs, and performance statistics in step 5918. The database system 522 then checks if the state event message is a failure, busy, forward or start/available event in step 5920.

If the state event message is not a failure, busy, forward or start/available event, the database system 522 checks if the busy load event threshold for the destination network device 562 is reached in step 5930. If the load event threshold is not reached, the database system 522 returns to step 5102. If the load event threshold is reached, the database system 522 proceeds to step 5926.

If the state event message is a failure, busy, forward, or start/available event, the database system 522 retrieves and updates the destination network device 562 and secondary network device's 564 profile in step 5922. In step 5124, the database system 522 checks if the state event message is a failure, busy, or forward event. If the state event message is not a failure/busy event, the database system 522 generates and transmits an address translation clear request to the access server 554 if a busy translation exists in step 5934 before returning to step 5902. If the state event message is a failure, busy, or forward event, the database system 522 proceeds to step 5926.

In step 5926, the database system 522 checks if a secondary network device 564 is available for forwarding. If a secondary network device 564 is available, the database system 522 checks if the state event message is a failure or busy event in step 5936. If the state event message is a failure or busy event, the database system 522 generates and transmits a busy address translation request message to the access server 554 in step 5932 before returning to step 5902. If the state event message is not a failure or busy event, the database system 522 generates and transmits a forward address translation request message to the access server 554 to change packets' destination network address to the secondary network address in step 5938 before returning to step 5902. If the secondary network device 564 is not available, the database system 522 registers a no secondary network device failure event and transmit a busy message to the user in step 5928 before returning to step 5902. In one embodiment, the database system 522 uses the availability database system 594 to perform the operations disclosed in FIG. 59.

Access Network Audit Server—FIGS. 5, 60, 61, 62, and 63
Service Capability Monitor FIGS. 5, 60, 61, 62, and 63 disclose one embodiment for service capability monitor in an example of the invention. In a prior system, Java applet technology and Sun's JINI project delivers communication and state mechanisms from the function provider to the function requesters. Java applet technology allows a mechanism for device control without any coordinating control agent. JINI provides a registry which maintains capabilities like a CORBA ORB as a means for primitive control. One problem is that JINI focuses on the distribution of mechanisms instead of the interworking of mechanisms in a standardized way. In this embodiment of service capability control, a network access provider monitors the validity and state of the application level request to a network service provider. The network access provider monitors performance of their network and the service provider's network service requiring an understanding of the other provider's service requested. Access providers such as Internet service providers could mitigate their liability and increase the service's performance by extending their service view to the user base. Specific service environment access points may be monitored and service access rights and restrictions may be enforced. This embodiment provides an interworking mechanism that provides a dynamic interface to a service based network. The monitoring interface must be dynamic because different service have different potential states, different legal and illegal state transitions, and different communication mechanisms.

Figure 60:
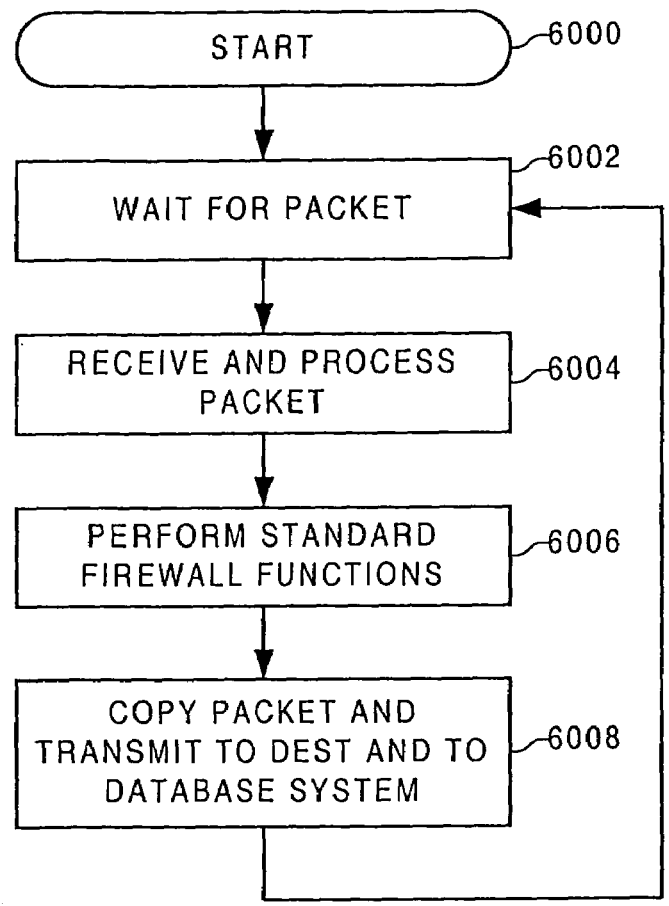
FIG. 60 illustrates a flowchart for a firewall/router for service capability monitor in an example of the invention.

FIG. 60 depicts a flowchart for a firewall 526 for service capability monitor in an example of the invention. FIG. 60 begins in step 6000. In step 6002, the firewall 526 waits for a packet. The firewall 526 then receives and processes a packet from the network device 512 in step 6004. In step 6006, the firewall 526 performs standard firewall functions. The firewall 526 then copies the packets and transmits the packet to the destination and the database system 522 in step 6008 before returning step 6002.

Figure 61:
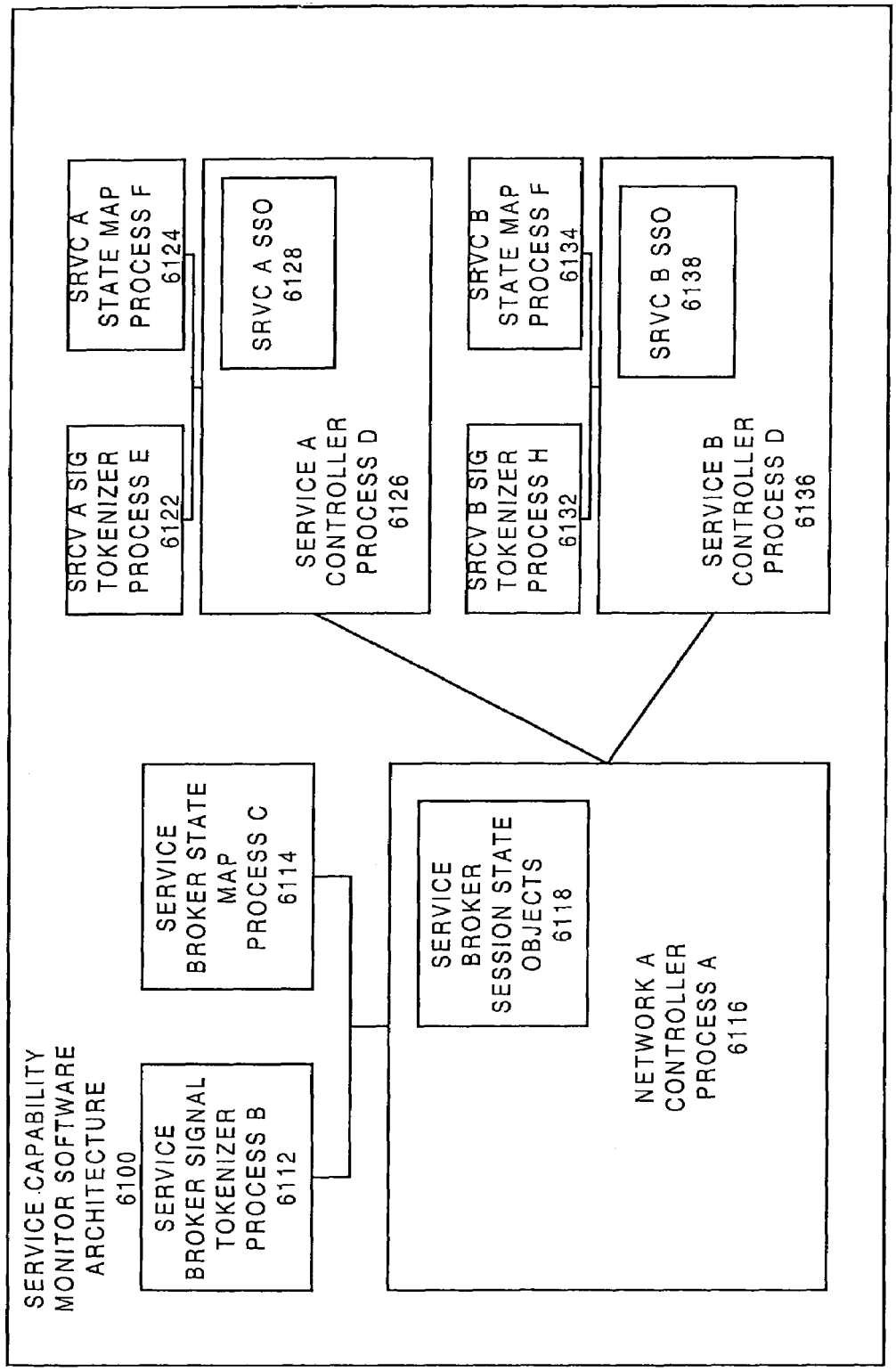
FIG. 61 illustrates a service capability monitor software architecture for a service capability monitor in an example of the invention.

FIG. 61 depicts a service capability monitor software architecture for a service capability monitor in an example of the invention. A service capability monitor software architecture 6100 comprises a service broker tokenizer process B 6112, a service broker state map process C 6114, a network A controller process A 6116, a service A signal tokenizer process E 6122, a service A state map process F 6124, a service A controller process D 6126, a service B signal tokenizer process H 6132, a service B state map process F 6134, and a service B controller process D 6136. The network A controller process A 6116 includes a service broker session state objects 6118. The service A controller process D 6126 includes a service A session state objects 6128. The service B controller process D 6136 includes a service B session state object 6138.

The network A controller process A 6116 is connected to the service broker tokenizer process B 6112, the service broker state map process C 6114, the service A controller process D 6126, and the service B controller process D 6136. The service A controller process D 6126 is connected to the service A signal tokenizer process E 6122 and the service A state map process F 6124. The service B controller process D 6136 is connected to the service B signal tokenizer process H 6132 and the service B state map process F 6134.

Figure 62:
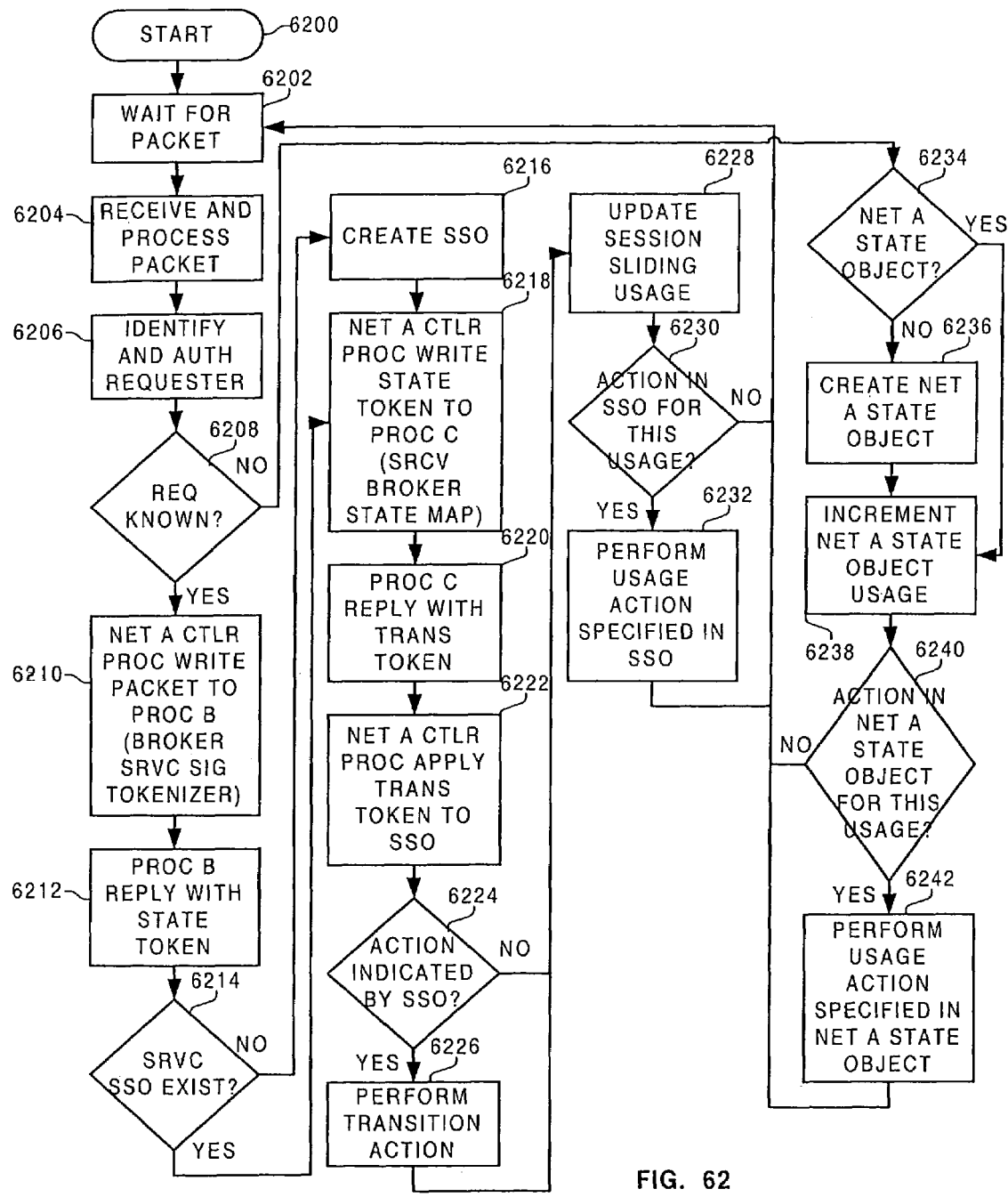
FIG. 62 illustrates a flowchart for the network logic for service capability monitor in an example of the invention.

FIG. 62 depicts a flowchart for the network logic for service capability monitor in an example of the invention. FIG. 62 begins in step 6200. In step 6202, the database system 522 waits for the packet. The database system 522 then receives and processes the packet from the firewall 526 in step 6204. The database system 522 then identifies and authorizes the requester in step 6206. The database system 522 checks if the requester is known in step 6208.

If the requester is known, the network A controller process 6116 writes the packet to process B—service broker signal tokenizer process 6112 in step 6210. The process B 6112 then replies with the function token and parameters to the process A 6116 in step 6212. The database system 522 then checks if a service session state object (SSO) 6118 exists for this session in step 6214. If the SSO 6118 does not exist, the database system 522 creates a SSO 6118 for this session and initializes the current state in step 6216. If the SSO 6118 exists, the database system 522 then proceeds to step 6218. In step 6218, process A 6116 writes the state token and current state to process C—service broker state map process 6114 in step 6218. The process C 6114 then replies with a transition token and parameters to the process A 6116 in step 6220. The process A 6116 applies the transition token and the parameters to the SSO 6118 to update the current state and setting actions in step 6222.

In step 6224, the database system 522 checks if there is an action indicated by the SSO 6118. If there is not an action indicated by the SSO 6118, the database system 522 proceeds to step 6228. If there is an action indicated by the SSO 6118, the database system 522 performs the transition action specified by the SSO 6118 in step 6226. In step 6228, the database system 522 updates the session sliding usage accumulators. The database system 522 then checks if there is an action in the SSO 6118 for this usage in step 6230. If there is no action, the database system 522 returns to step 6202. If there is an action in the SSO 6118, the database system 522 performs the usage action specified in the SSO 6118 before returning to step 6202.

If the requester is not known, the database system 522 checks if there is a network A state object in step 6234. If there is a network state object, the database system 522 proceeds to step 6238. If there is no network state object, the database system 522 creates a network A state object and initializes the current state in step 6236. In step 6238, the database system 522 increments network A state object usage for this event. The database system 522 then checks if there is an action in the network A state object for this usage in step 6240. If there is no action in the network A state object for this usage, the database system 522 returns to step 6202. If there is an action in the network A state object for this usage, the database system 522 performs the usage action specified in the network A state object in step 6242 before returning to step 6242.

Figure 63:
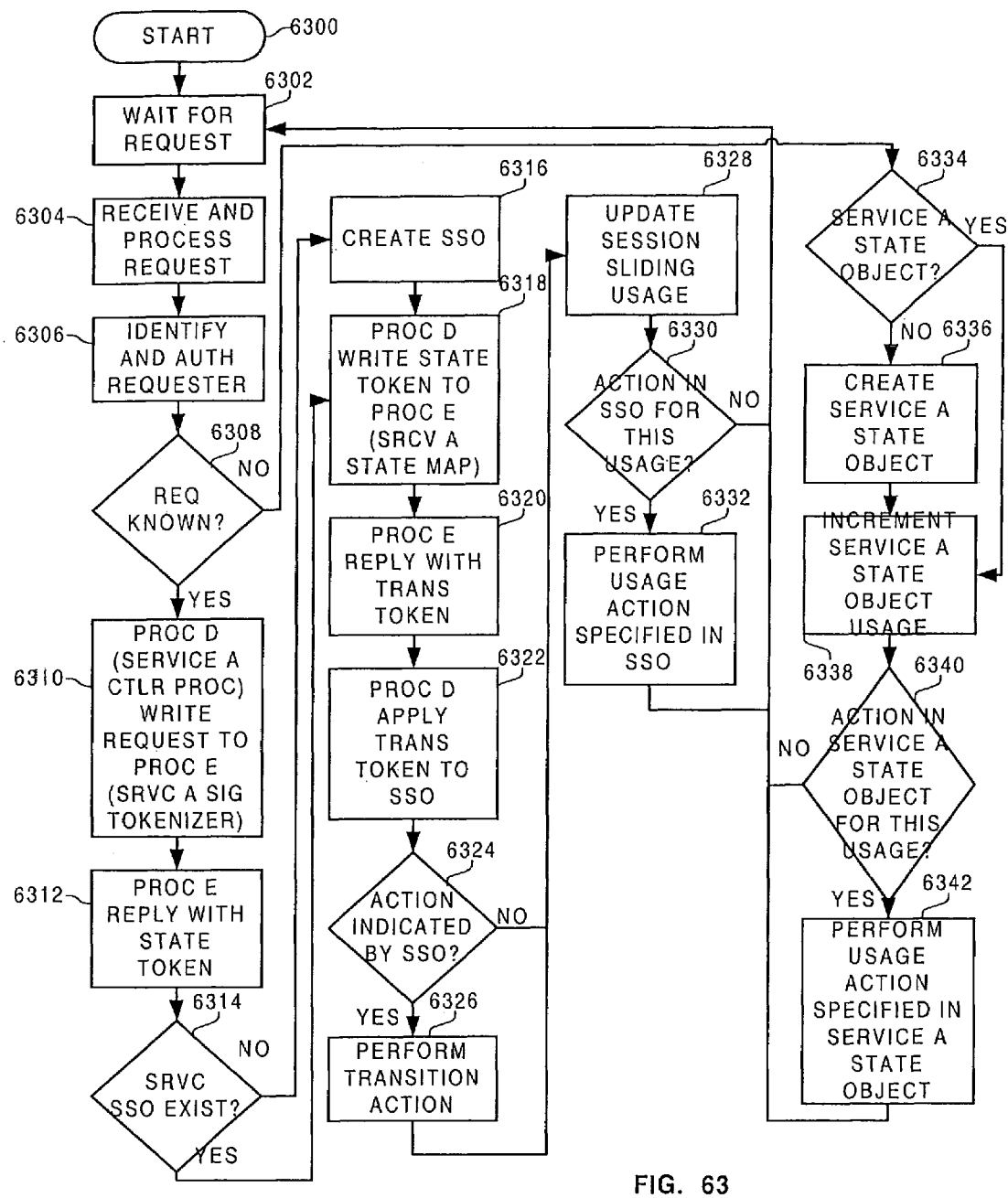
FIG. 63 illustrates a flowchart for the service logic for service capability monitor in an example of the invention.

FIG. 63 depicts a flowchart for the service logic for service capability monitor in an example of the invention. FIG. 63 begins in step 6300. In step 6302, process D service A controller process 6126 waits for the packet. The process D 6126 then receives and processes the packet from the process A network A controller 6116 in step 6304. The process D 6126 then identifies and authorizes the requester in step 6306. The process D 6126 checks if the requester is known in step 6308.

If the requester is known, the process D 6126 writes the request to process E-service A signal tokenizer process 6122 in step 6310. The process E 6122 then replies with the state token and parameters to the process D 6126 in step 6312. The database system 522 then checks if a service session state object (SSO) 6128 exists for this session in step 6314. If the SSO 6128 does not exist, the database system 522 creates a SSO 6128 for this session and initializes the current state in step 6316. If the SSO 6118 exists, the database system 522 then proceeds to step 6318. In step 6218, the process D 6126 writes the state token and current state to process F—service state map process 6124 in step 6318. The process F 6124 then replies with a transition token and parameters to the process D 6126 in step 6320. The process D 6126 applies the transition token and the parameters to the SSO 6128 to update the current state and setting actions in step 6322.

In step 6324, the database system 522 checks if there is an action indicated by the SSO 6128. If there is not an action indicated by the SSO 6128, the database system 522 proceeds to step 6328. If there is an action indicated by the SSO 6128, the database system 522 performs the transition action specified by the SSO 6128 in step 6326. In step 6328, the database system 522 updates the session sliding usage accumulators. The database system 522 then checks if there is an action in the SSO 6128 for this usage in step 6330. If there is no action, the database system 522 returns to step 6302. If there is an action in the SSO 6128, the database system 522 performs the usage action specified in the SSO 6128 before returning to step 6302.

If the requester is not known, the database system 522 checks if there is a service A state object in step 6334. If there is a service state object, the database system 522 proceeds to step 6338. If there is no service state object, the database system 522 creates a service A state object and initializes the current state in step 6336. In step 6338, the database system 522 increments service A state object usage for this event. The database system 522 then checks if there is an action in the service A state object for this usage in step 6340. If there is no action in the service A state object for this usage, the database system 522 returns to step 6302. If there is an action in the service A state object for this usage, the database system 522 performs the usage action specified in the service A state object in step 6342 before returning to step 6342.

EXAMPLE

The following is one example of the access communication system that integrates many of the features described in the various embodiments of the inventions above. In the example below, a subscriber called Bank has many employees. The Bank has access to the network architecture 500 through an access provider called AccProv1. In this example, a bank employee is retrieving a stock quote from the yahoo.com website and then switches to request a streaming video from the yahoo.com website. Yahoo's web-server is running in the user network 562. Yahoo has access to the network architecture 500 through an access provider called AccProv2.

A system administrator for AccProv1 configures and optionally starts an access execution environment for the subscriber Bank in the local database system 570. The system administrator also starts a subscriber proxy for the Bank that runs in the access execution environment for the Bank. The subscriber proxy includes transport handlers, configuration handlers, and security handlers. The AccProv1 system administrator starts access execution environments for the maximum number of concurrent users in the local database system 570. The system administrator also starts generic proxies for users in the local database system 570. These generic proxies become user proxies after the user access profile is retrieved for the user.

The system administrator for AccProv2 starts an access execution environment for a service for Yahoo in the local database system 590. The system administrator also starts a service proxy for Yahoo's service that runs in the access execution environment for Yahoo. A system administrator for the Bank then sets up the user access profiles for each employee by inheriting attributes for the user access profile from capability classes or groups that the user belongs to. The user access profile includes the network shell for the user.

The Bank employee then logs on to the access server 524 using a user ID the Bank system administrator set up. Besides user ID, a user may logon to the access server 524 using a prepaid account code, a bank card number, an access card account code, or a user ID including a delimiter for user access mobility. Upon connection, the access server 524 creates a device session in an access execution environment for the user. Then in response to the user logon, the database system 522 retrieves the user access profile for the Bank employee. For a prepaid account code, a bank card number, an access card account code, and a user ID with a delimiter, the database system 522 may retrieve the user access profile from a database system external to the local database system 570. Also, the database system 522 may retrieve the user access profile from a database system external to the local database system 570 for global authentication.

Once the user access profile is retrieved, the access server 524 creates a user session in the access execution environment for the user and binds the device session with the user session. The configuration handler of the user proxy includes the network shell retrieved with the user access profile. The access server 524 then generates and transmits a list of available services in a service based directory to the Bank employee based on the user access profile.

The Bank employee then selects a service to check a stock quote for IBM by transmitting a request for service to the access server 524. The request for service may be in the form of a selection from the service based directory or an alias for alias translation for the network shell using domain name scoping or inband DNS lookup. The access server 524 processes and transfers the request for service to the user proxy for the Bank employee. The user proxy transfers the request to the service proxy for Yahoo. The service proxy processes and transfers the request for service to Yahoo's web server. The database system 522 translates the service request for Yahoo to a private fulfillment address for one of Yahoo's web servers. The access server 554 then determines if a private destination address is available. If the private destination address is unavailable, the access server 554 could perform many actions including forwarding the request to another Yahoo web server or replying with a busy flag. The access server 524 also binds the user session and the device session with the selected service session by exchanging reference ID's.

The Bank employee then requests another stock quote for Oracle. The access server 524 then determines this stock quote was already cached based on the user's predictable pattern of requesting quotes for this company or a group of software companies. These prior requests for stock quotes of software companies by the Bank employee were audited to derive the Bank employee's predictable pattern. Alternatively, the request for the stock quote for Oracle could have been setup by the user in a script of commands to cache the quote in advance.

The Bank employee then requests a streaming video from Yahoo. The access server 524 switches the access for a premiere access based on the request for streaming video from the Bank employee. Alternatively, Yahoo initiates a switch of access for toll-free Internet service to the Bank employee who is a preferential customer. In order to be able to run the streaming video, the database system 522 also inherits user profile information from a class for streaming video user and updates the user access profile with the user profile information. The user proxy transfers the request for streaming video to the subscriber proxy. The subscriber proxy transfers the request to the service proxy. The service proxy then transfers the request to the Yahoo for one of their streaming video servers. Yahoo's streaming video server then provides the streaming video to the Bank employee.

CONCLUSION

The access network operates as described in response to instructions that are stored on storage media. The instructions are retrieved and executed by a processor in the access network. Typically, the processor resides in a server or database. Some examples of instructions are software, program code, and firmware. Some examples of storage media are memory devices, tape, disks, integrated circuits, and servers. The instructions are operational when executed by the processor to direct the network to operate in accord with the invention. The term "processor" refers to a single processing device or a group of inter-operational processing devices. Some examples of processors are computers, integrated circuits, and logic circuitry. Those skilled in the art are familiar with instructions, processors, and storage media.

Those skilled in the art will appreciate variations of the above-described embodiments that fall within the scope of the invention. As a result, the invention is not limited to the specific examples and illustrations discussed above, but only by the following claims and their equivalents.

I claim:

1. A method of operating an access system including an access server to provide access between user systems and a plurality of service networks that provide services to users, the method comprising:

receiving a first alias selection from a first user using a first network device into the access server;

retrieving a first customized list of aliases for the first user wherein the first list of aliases are associated with actions;

determining the action associated with the first alias selection from the customized list of aliases for the first user;

translating the first alias selection into a first command string for the action for the first user;

processing the first command string to execute the action for the first user in a one of the plurality of service networks;

receiving a second alias selection from a second user using a second network device into the access server;

retrieving a second customized list of aliases for the second user wherein the second list of aliases are associated with actions;

determining the action associated with the second alias selection from the customized list of aliases for the second user;

translating the second alias selection into a second command string for the action for the second user; and processing the second command string to execute the action for the second user in the one service network wherein the action for the send user is the same as the action for the first user and wherein the first alias selection is not the same as the second alias selection.

2. The method of claim 1 wherein the action comprises a program.

3. The method of claim 1 wherein the action comprises a macro.

4. The method of claim 1 wherein the action comprises a service.

5. An access system for providing access between user systems and a plurality of service networks that provide services to users, the access system comprising:
- a first network device configured to select a first alias from a first graphically presented network shell, transmit a packet including the first alias selection to an access server from the network device;
- a second network device configured to select a second alias from a second graphically presented network shell, transmit a packet including the second alias selection to an access server from the network device;
- the access server connected to the user systems and the plurality of communication networks and configured to receive the first alias selection from the first user, retrieve a first customized list of aliases for the first user wherein the first list of aliases are associated with actions, process the first alias selection to determine the action associated with the first alias selection from the first customized list of aliases, translate the first alias selection into a first command string for the action for the first user, process the first command string to execute the action for the first user in a one of the plurality of service networks, receive the second alias selection from the second user, retrieve a second customized list of aliases for the second user wherein the second list of aliases are associated with actions, process the second alias selection to determine the action associated with the second alias selection from the second customized list of aliases, translate the second alias selection into a second command string for the action for the second user, process the second command string to execute the action for the second user in the one service network wherein the action for the second user is the same as the action for the first user and wherein the first alias selection is not the same as the second alias selection; and
- a database system connected to the access server.

6. The access system of claim 5 wherein the action comprises a program.

7. The access system of claim 5 wherein the action comprises a macro.

8. The access system of claim 5 wherein the action comprises a service.

9. A software product for providing access between a user system and a plurality of service networks that provide services to a user, the software product comprising:
- access server software operational when executed by a processor to direct the processor to receive a first alias selection from a first user using a first network device into the access server, retrieve a first customized list of aliases for the first user wherein the first list of aliases are associated with actions, determine the action associated with the first alias selection from the customized list of aliases for the first user, translate the first alias selection into a first command string for the action for the first user, process the first command string to execute the action for the first user in a one of the plurality of service networks, receive a second alias selection from a second user using a second network device into the access server, retrieve a second customized list of aliases for the second user wherein the second list of aliases are associated with actions, determine the action associated with the second alias selection from the customized list of aliases for the second user, translate the second alias selection into a second command string for the action for the second user, and process the second command string to execute the action for the second user in the one service network wherein the action for the second user is the same as the action for the first user and wherein the first alias selection is not the same as the second alias selection;
- said access server software located on a computer-readable software storage medium operational to store the access server software.

10. The software product of claim 9 wherein the action comprises a program.

11. The software product of claim 9 wherein the action comprises a macro.

12. The software product of claim 9 wherein the action comprises a service.

* * * * *